United States Patent
Lim et al.

(10) Patent No.: US 12,232,119 B2
(45) Date of Patent: Feb. 18, 2025

(54) METHOD AND DEVICE FOR TRANSMITTING AND RECEIVING UPLINK SIGNAL IN WIRELESS COMMUNICATION SYSTEM SUPPORTING COOPERATIVE COMMUNICATION

(71) Applicant: Samsung Electronics Co., Ltd., Gyeonggi-do (KR)

(72) Inventors: Seongmok Lim, Gyeonggi-do (KR); Hyoungju Ji, Gyeonggi-do (KR); Taehyoung Kim, Gyeonggi-do (KR); Jinyoung Oh, Gyeonggi-do (KR); Youngrok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 426 days.

(21) Appl. No.: 17/547,755

(22) Filed: Dec. 10, 2021

(65) Prior Publication Data

US 2022/0201679 A1     Jun. 23, 2022

(30) Foreign Application Priority Data

Dec. 16, 2020 (KR) .................. 10-2020-0176878
Jan. 20, 2021 (KR) .................. 10-2021-0008384

(51) Int. Cl.
*H04W 72/21* (2023.01)
*H04B 7/06* (2006.01)
(Continued)

(52) U.S. Cl.
CPC .......... *H04W 72/21* (2023.01); *H04B 7/0695* (2013.01); *H04W 8/12* (2013.01);
(Continued)

(58) Field of Classification Search
None
See application file for complete search history.

(56) References Cited

U.S. PATENT DOCUMENTS

| | | | |
|---|---|---|---|
| 9,462,504 B2 | 10/2016 | Stephens et al. | |
| 9,801,140 B2 | 10/2017 | Yi et al. | |
| (Continued) | | | |

FOREIGN PATENT DOCUMENTS

| | | |
|---|---|---|
| KR | 10-2021-0101002 | 8/2021 |
| WO | WO 2017/196612 | 11/2017 |

OTHER PUBLICATIONS

U.S. Appl. No. 62/970,572, filed Feb. 5, 2020 (Year: 2020).*
(Continued)

*Primary Examiner* — Jay L Vogel
(74) *Attorney, Agent, or Firm* — The Farrell Law Firm, P.C.

(57) ABSTRACT

A method and device are provided for transmitting/receiving a UL signal in a wireless communication system supporting cooperative communication. A method for communication by a UE includes transmitting, to a base station, UE capability information for changing at least one of a UL beam, a transmit power, or a frequency, receiving information about an offset in a time domain from the base station, based on the UE capability information, and in case that the offset in the time domain is greater than or equal to a time for a change according to a UE capability, transmitting a UL signal to a plurality of TRPs by changing at least one of the UL beam, the transmit power, and the frequency.

16 Claims, 34 Drawing Sheets

(51) Int. Cl.
*H04W 8/12* (2009.01)
*H04W 72/23* (2023.01)
*H04W 72/51* (2023.01)
*H04W 8/24* (2009.01)

(52) U.S. Cl.
CPC ........... *H04W 72/23* (2023.01); *H04W 72/51* (2023.01); *H04W 8/24* (2013.01)

(56) References Cited

U.S. PATENT DOCUMENTS

| | | |
|---|---|---|
| 2015/0223180 A1 | 8/2015 | Non |
| 2019/0268862 A1 | 8/2019 | Dai et al. |
| 2020/0229104 A1* | 7/2020 | MolavianJazi ..... H04W 52/146 |
| 2021/0250944 A1 | 8/2021 | Ji et al. |
| 2022/0159742 A1* | 5/2022 | Xu ......................... H04W 24/10 |
| 2022/0201619 A1* | 6/2022 | Yao ..................... H04W 52/242 |
| 2023/0077264 A1* | 3/2023 | Gao ....................... H04L 5/0098 |
| 2023/0137292 A1* | 5/2023 | Zhang ................. H04W 72/563 |
| | | 370/329 |

OTHER PUBLICATIONS

U.S. Appl. No. 63/115,406, filed Nov. 18, 2020 (Year: 2020).*
International Search Report dated Mar. 22, 2022 issued in counterpart application No. PCT/KR2021/018670, 8 pages.

\* cited by examiner

Transient time, SRS sounded on the same antenna with PUSCH/PUCCH ~ 905

Transient time, SRS sounded on the different antenna with PUSCH/PUCCH ~ 910

Transient time, with PUSCH/PUCCH/SRS ~ 1005

Transient time between long and short subslots ~ 1010

| | | | | | | | |
|---|---|---|---|---|---|---|---|
| R | Serving Cell ID (1300) | | | BWP ID (1305) | | | Oct 1 |
| R | PUCCH Resource ID (1310) | | | | | | Oct 2 |
| R | R | ClosedLoop Index (1320) | Pathloss Reference RS ID (1321) | P0 PUCCH ID (1322) | | | Oct 3 |
| R | R | ClosedLoop Index (1330) | Pathloss Reference RS ID (1331) | P0 PUCCH ID (1332) | | | Oct 4 |

FIG.13A

| | | | | | | | |
|---|---|---|---|---|---|---|---|
| R | Serving Cell ID (1350) | | | | BWP ID (1355) | | Oct 1 |
| R | PUCCH Resource ID (1360) | | | | | | Oct 2 |
| R | R | R | R | ClosedLoop Index (1370) | P0 PUCCH ID (1371) | | Oct 3 |
| R | R | Pathloss Reference RS ID (1372) | | | | | Oct 4 |
| R | R | R | R | ClosedLoop Index (1380) | P0 PUCCH ID (1381) | | Oct 5 |
| R | R | Pathloss Reference RS ID (1382) | | | | | Oct 6 |

FIG.13B

METHOD AND DEVICE FOR TRANSMITTING AND RECEIVING UPLINK SIGNAL IN WIRELESS COMMUNICATION SYSTEM SUPPORTING COOPERATIVE COMMUNICATION

CROSS-REFERENCE TO RELATED APPLICATION(S)

This application is based on and claims priority under 35 U.S.C. § 119 to Korean Patent Application Nos. 10-2020-0176878 and 10-2021-0008384, which were filed in the Korean Intellectual Property Office on Dec. 16, 2020, and Jan. 20, 2021, respectively, the entire disclosure of each of which is incorporated herein by reference.

BACKGROUND

1. Field

The disclosure relates generally to a method and device for transmitting and receiving an uplink (UL) signal in a wireless communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

As various services may be provided with the development of wireless communication systems as described above, needs exist for a scheme for changing beams and a scheme for adjusting transmit power for a user equipment (UE) to smoothly transmit a UL control signal to each transmission reception point (TRP) in a network cooperative communication system.

SUMMARY

Accordingly, an aspect of the disclosure is to provide a method and a device for efficiently transmitting/receiving a UL signal in a wireless communication system supporting cooperative communication.

Another aspect of the disclosure is to provide a method and a device for efficiently, repeatedly transmitting/receiving a UL signal in a wireless communication system supporting cooperative communication.

Another aspect of the disclosure is to provide a method and a device for efficiently transmitting/receiving a UL signal using an offset in a time domain in a wireless communication system supporting cooperative communication.

Another aspect of the disclosure is to provide a method and a device for changing at least one of a UL beam, a transmit power, and a frequency during an offset in a time domain according to UE capability in a wireless communication system, and transmitting/receiving a UL signal.

In accordance with an aspect of the disclosure, a method is provided for communication by a base station in a wireless communication system supporting cooperative communication. The method includes receiving, from a UE, UE capability information for changing at least one of an uplink beam, a transmit power, or a frequency, determining an offset in a time domain for transmission of an uplink signal based on the UE capability information, and transmitting, to the UE, information about the determined offset.

In accordance with another aspect of the disclosure, a method is provided for communication by a UE in a wireless communication system supporting cooperative communication. The method includes transmitting, to a base station, UE capability information for changing at least one of an uplink beam, a transmit power, or a frequency, receiving, from the base station, information about an offset in a time domain, based on the UE capability information, and in case that the offset in the time domain is greater than or equal to a time for the changing according to a UE capability, transmitting a UL signal to a plurality of TRPs by changing at least one of the uplink beam, the transmit power, and the frequency.

In accordance with another aspect of the disclosure, a base station is provided for use in a wireless communication system supporting cooperative communication. The base station includes a transceiver, and a processor configured to receive, from a UE, through the transceiver, UE capability information for changing at least one of an uplink beam, a transmit power, or a frequency, determine an offset in a time domain for transmission of an uplink signal based on the UE capability information, and transmit, to the UE, through the transceiver, information about the determined offset.

In accordance with another aspect of the disclosure, a UE is provided for use in a wireless communication system supporting cooperative communication. The UE includes a transceiver, and a processor configured to transmit, to a base station, through the transceiver, UE capability information for changing at least one of an uplink beam, a transmit power, or a frequency, receive, from the base station, through the transceiver, information about an offset in a time domain, based on the UE capability information, and in case that the offset in the time domain is greater than or equal to a time for the changing according to a UE capability, transmit, through the transceiver, an uplink signal to a plurality of TRPs by changing at least one of the uplink beam, the transmit power, and the frequency.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIGS. 13A and 13B illustrate a new MAC CE to activate a PUCCH transmit power control parameter according to an embodiment;

DETAILED DESCRIPTION

Figure 1:
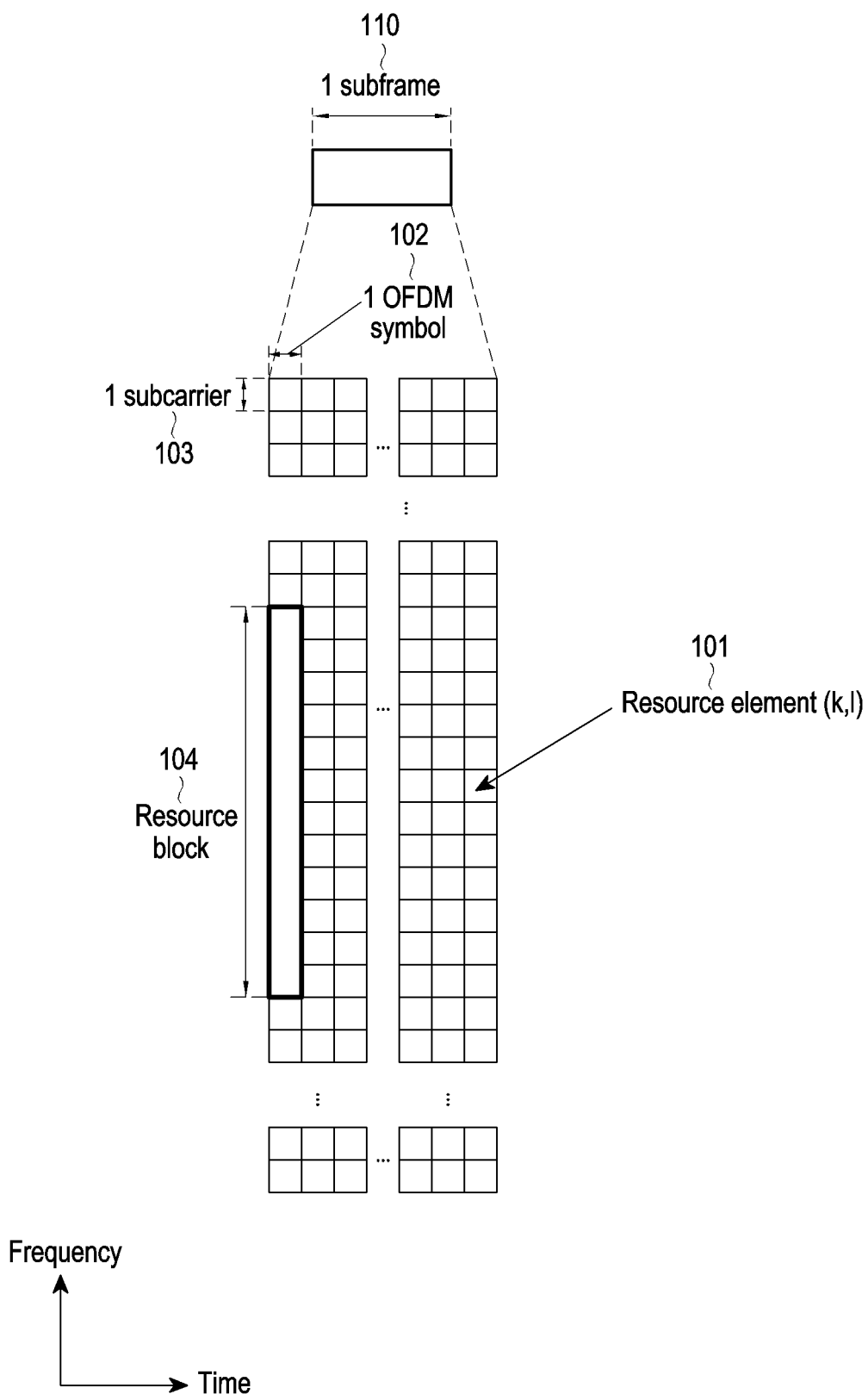
FIG. 1 illustrates a basic structure of a time-frequency radio resource domain, according to an embodiment.

Hereinafter, various embodiments of the disclosure are described in detail with reference to the accompanying drawings. Hereinafter, for methods and devices proposed in embodiments, embodiments are described as example methods for transmitting a UL control signal to each TRP in a network cooperative communication system. However, without being limited to each embodiment, combinations of all or some of one or more embodiments proposed herein may be used for data channels, control channels, and reference signal (RS) transmission/reception methods corresponding to other additional services.

Further, embodiments may be modified in such a range as not to significantly depart from the scope of the disclosure under the determination by one of ordinary skill in the art and such modifications may be applicable.

When determined to make the subject matter of the disclosure unclear, the detailed description of the known art or functions may be omitted.

The terms as used herein are defined considering the functions in the disclosure and may be replaced with other terms according to the intention or practice of the user or operator. Therefore, the terms should be defined based on the overall disclosure.

For the similar reasoning, some elements may be exaggerated or schematically shown. The size of each element does not necessarily reflect the real size of the element. The same reference numeral may also be used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure.

The blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate a system for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, in some replacement execution examples, the functions mentioned in the blocks may occur in different orders. For example, two blocks that are consecutively shown may be performed substantially simultaneously or in a reverse order depending on corresponding functions.

As used herein, the term "unit" may refer to a software element or a hardware element such as a field-programmable gate array (FPGA) or an application specific integrated circuit (ASIC). A unit plays a certain role. However, the term "unit" is not limited as meaning a software or hardware element.

A unit may be configured in a storage medium that may be addressed or may be configured to reproduce one or more processors. For example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables.

A function provided in an element or a unit may be combined with additional elements or may be split into sub elements or sub units. Further, an element or a unit may be implemented to reproduce one or more central processing units (CPUs) in a device or a security multimedia card. A "unit" may include one or more processors.

Herein, a base station may be an entity allocating a resource to a UE and may include a gNode B (gNB), an evolved Node B (eNode B or eNB), a Node B, a wireless access unit, a base station controller, a transmit point (TP), a TRP, or a node over a network. The base station may be a network entity including an integrated access and backhaul-donor (IAB-donor), which is a gNB providing network access to UEs through a network of backhaul and access links in a new radio (NR) system, and an IAB-node, which is a RAN node supporting NR backhaul links to the IAB-donor or another IAB-node and supporting NR access links to UEs. The UE is wirelessly connected through the IAB-node and may transmit/receive data to and from the IAB-donor connected with at least one IAB-node through the backhaul link.

A UE may include a terminal, a mobile station (MS), a cellular phone, a smartphone, a computer, or a multimedia system capable of performing communication functions, but is not limited to the above examples.

The disclosure relates to a 5G communication system for supporting a higher data rate than that of a 4G communication system. The disclosure can be applied for intelligent services based on 5G communication technology and Internet of things (IoT) related technology (e.g., smart homes, smart buildings, smart cities, smart cars or connected cars, healthcare, digital education, retail businesses, security and safety related services, etc.).

Further, the embodiments may be modified in such a range as not to significantly depart from the scope of the disclosure under the determination by one of ordinary skill in the art and such modifications may be applicable to other communication systems, such as LTE or LTE-advanced (LTE-A).

For ease of description, some of the terms and names defined in the 3rd generation partnership project (3GPP) LTE standards may be used. However, the disclosure is not limited by such terms and names and may be likewise applicable to systems conforming to other standards.

Wireless communication systems evolve beyond voice-centered services to broadband wireless communication systems to provide high data rate and high-quality packet data services, such as 3GPP high speed packet access (HSPA), LTE or evolved universal terrestrial radio access (E-UTRA)), LTE-A, LTE-pro, 3GPP2 high rate packet data (HRPD), ultra-mobile broadband (UMB), and Institute of Electrical and Electronics Engineers (IEEE) 802.16e communication standards.

As a representative example of such a broadband wireless communication system, an LTE system adopts orthogonal frequency division multiplexing (OFDM) for downlink (DL) and single carrier frequency division multiple access (SC-FDMA) for UL. The UL may refer to a radio link in which the UE transmits data or control signals to the base station (e.g., eNode B), and the DL refers to a radio link through which the base station transmits data or control signals to the UE. Such a multiple access scheme allocates and operates time-frequency resources carrying data or control information per user not to overlap, i.e., to maintain orthogonality, thereby differentiating each user's data and/or control information.

Post-LTE communication systems, e.g., 5G communication systems, should simultaneously support various requirements from users and service providers. Services considered for 5G communication systems include enhanced mobile broadband (eMBB), massive machine type communication (MMTC), and ultra-reliability low latency communication (URLLC).

eMBB is intended to provide a further enhanced data transmission rate as compared with LTE, LTE-A, or LTE-pro. For example, eMBB for 5G communication systems should provide a peak data rate of 20 Gbps on DL and a peak data rate of 10 Gbps on UL in terms of one base station.

5G communication systems should also provide an increased user perceived data rate while simultaneously providing such peak data rate. To meet such requirements, various transmit (TX)/receive (RX) techniques, as well as MIMO, may need to further be enhanced. While LTE adopts a TX bandwidth up to 20 MHz in the 2 GHz band to transmit signals, a 5G communication system employs a broader frequency bandwidth in a frequency band ranging from 3 GHz to 6 GHz or more than 6 GHz in order to meet the data rate required for 5G communication systems.

Further, attention is being drawn to BWP technology that divides a whole carrier frequency band into several frequency bands that may be supported for the base station for each UE, when the base station supports a broad bandwidth of frequencies. That is, if the base station supports the BWP and the bandwidth capability of a specific UE is small, the BWP may support a small frequency band for the UE, and it is possible to reduce the energy consumption of the UE while reducing the frequency band by changing the BWP. There is also an effect of supporting various services for one UE without latency through changing BWPs while supporting a different frame structure in each of several BWPs. BWP technology may be applied to control channels or data channels one-to-one corresponding between a predetermined UE and base station. Further, for data channels and control channels to transmit common signals transmitted from the base station to multiple UEs in the system, e.g., a synchronization signal, a physical broadcast channel (PBCH), and system information, BWP may also be applied to reduce the energy of the base station by transmission only through the BWP where such a control channel and data channel has been configured.

Further, mMTC is intended to support application services, such as IoT in the 5G communication system. To efficiently provide IoT, mMTC should support massive UEs in the cell, enhance the coverage of the UE and the battery time, and reduce UE costs. IoT UEs may be attached to various sensors or devices to provide communication functionality, and thus, mMTC should support a number of UEs in each cell (e.g., 1,000,000 UEs/km$^2$). Since mMTC-supportive UEs, by the nature of service, are often located in shadow areas not covered by the cell, such as the basement of a building, it requires much broader coverage as compared with other services that the 5G communication system provides. mMTC-supportive UEs, due to the need for being low cost and the likely difficulty in frequently changing batteries, should have a relatively long battery life, e.g., 10 years to 15 years.

URLLC is a mission-critical, cellular-based wireless communication service. URLLC may be used in remote control for robots or machinery, industrial automation, unmanned aerial vehicles, remote health care, or emergency alert. As such, URLLC should provide very low-latency and very high-reliability communication. For example, URLLC-supportive services should meet an air interface latency of less than 0.5 milliseconds simultaneously with a packet error rate of $10^{-5}$ or less. Thus, for URLLC-supportive services, the 5G communication system is required to provide a relatively shorter transmit time interval (TTI) than those for other services, while securing reliable communication links by allocating a broad resource in the frequency band.

The above-described three services of the 5G communication system, i.e., eMBB, URLLC, and mMTC, may also be multiplexed and transmitted in one system. In this case, the services may adopt different TX/RX schemes and TX/RX parameters to meet their different requirements. For the definitions of technical terms used herein, the relevant 3GPP standards may be referenced.

FIG. 1 illustrates a basic structure of a time-frequency radio resource domain, according to an embodiment.

Referring to FIG. 1, the horizontal axis refers to the time domain, and the vertical axis refers to the frequency domain. In the time and frequency domains, the basic unit of the resource may be defined with one OFDM symbol (or discrete Fourier transform spread OFDM (DFT-s-OFDM) symbol) 102 on the time axis (which may also be referred to as a time domain) and one subcarrier 103 on the frequency axis (which may also be referred to as a frequency domain). In the frequency domain $N_{SC}^{RB}$ (e.g., 12) consecutive resource elements (REs) may constitute one RB 104. $N_{symb}^{subframe}$ consecutive OFDM symbols in the time domain may constitute one subframe 110.

In FIG. 1, $n_{symb}^{subframe,\mu}$ is the number of OFDM symbols per subframe 110 for subcarrier spacing setting ($\mu$). A more detailed description of the resource structure used in the 5G system may be found in TS 38.211 section 4 standard.

Figure 2:
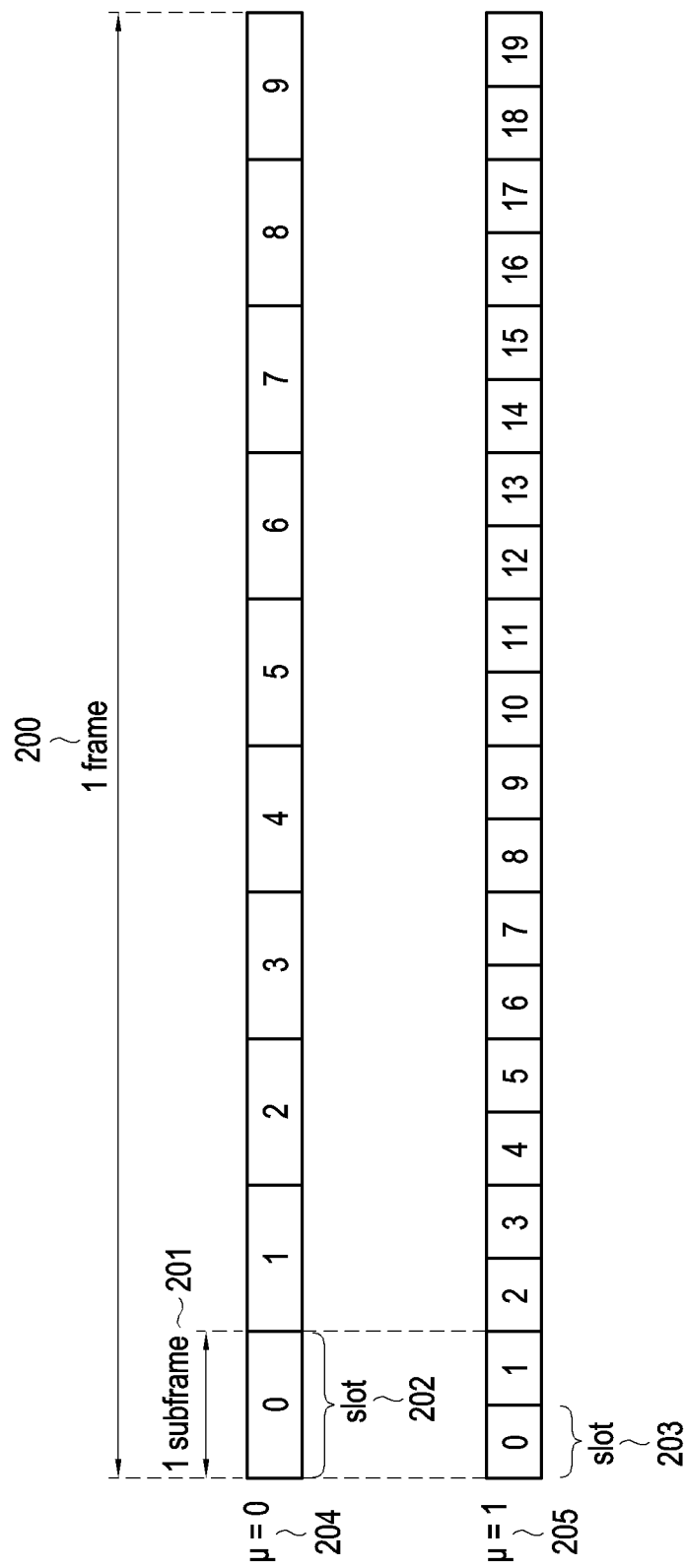
FIG. 2 illustrates a slot structure according to an embodiment.

FIG. 2 illustrates a slot structure according to an embodiment.

Referring to FIG. 2, a frame 200, which may be defined as 10 ms, may consist of a total of 10 subframes 201, which may be defined as 1 ms each. One slot 202 or 203 may be defined as 14 OFDM symbols (that is, the number ($N_{symb}^{slot}$) of symbols per slot=14). One subframe 201 may be composed of one or more slots 202 and 203, and the number of slots 202 and 203 per subframe 201 may differ depending on $\mu$ (204 or 205), which is a set value for the subcarrier spacing.

In FIG. 2, a slot structure of $\mu=0$ (204) and a slot structure of $\mu=1$ (205) are shown as the set subcarrier spacing values. When $\mu=0$ (204), one subframe 201 consists of one slot 202, and when $\mu=1$ (205), one subframe 201 consists of two slots (203). In other words, according to the set subcarrier spacing value $\mu$, the number ($N_{slot}^{subframe,\mu}$) of slots per subframe may vary, and accordingly, the number ($N_{slot}^{frame,\mu}$) of slots per frame may differ. According to each subcarrier spacing $\mu$, $N_{slot}^{subframe,\mu}$ and $N_{slot}^{frame,\mu}$ may be defined in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
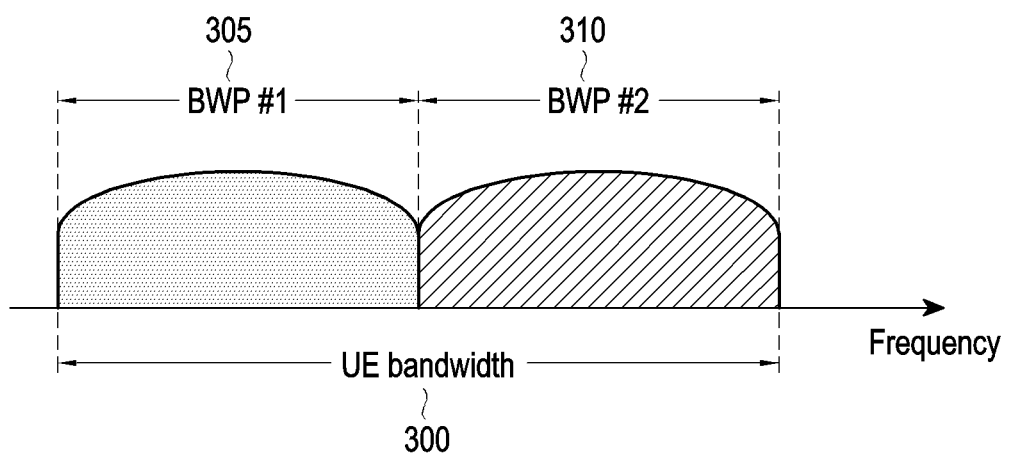
FIG. 3 illustrates a configuration of a bandwidth part (BWP) according to an embodiment.

FIG. 3 illustrates a configuration for a BWP according to an embodiment.

Referring to FIG. 3, a UE bandwidth 300 is divided into two BWPs, e.g., BWP #1 (BWP #1) 305 and BWP #2 (BWP #2) 310. The base station may configure one or more BWPs in the UE and may configure the information shown in Table 2 below for each BWP.

TABLE 2

| BWP ::= | SEQUENCE { |
|---|---|
| bwp-id | BWP-Id, |
| (Bandwidth part identifier) | |
| locationAndBandwidth | INTEGER (1..65336), |
| (Bandwidth part location) | |
| subcarrierSpacing | ENUMERATED { n0, n1, n2, n3, n4, n5 }, |
| (Subcarrier Spacing) | |
| cyclicPrefix | ENUMERATED ( extended ) |
| (Cyclic prefix) | |
| } | |

However, without being limited thereto, various other BWP-related parameters may be configured to the UE. The base station may transfer the information, to the UE, through higher layer signaling, e.g., radio resource control (RRC) signaling. At least one BWP among one or more configured BWPs may be activated. Whether to activate the configured BWP may be transferred from the base station to the UE, semi-statically, through RRC signaling, or dynamically, through DL control information (DCI).

Before being RRC connected, the UE may be configured with an initial BWP for initial access by the base station via a master information block (MIB). More specifically, the UE may receive configuration information for a search space and CORESET in which physical DL control channel (PDCCH) may be transmitted to receive system information (e.g., remaining system information (RMSI) or system information block (SIB) 1) for initial access through the MIB in the initial access phase. Each of the control region and search space configured with the MIB may be regarded as identity (ID) 0. The base station may provide the UE with configuration information, such as frequency allocation information, time allocation information, and numerology for control region #0, via the MIB. Further, the base station may provide the UE with configuration information for an occasion and a monitoring period for control region #0, i.e., configuration information for search space #0, via the MIB. The UE may regard the FR set as control region #0 obtained from the MIB, as the initial BWP for initial access. In this case, the ID of the initial BWP may be regarded as 0.

The configuration of the BWP supported by the 5G communication system described above may be used for various purposes.

When the bandwidth supported by the UE is smaller than the system bandwidth, this may be supported through the BWP configuration. For example, as the base station configures the UE with the frequency position (configuration information 2) of the BWP, the UE may transmit/receive data in a specific frequency position in the system bandwidth.

For the purpose of supporting different numerologies, the base station may configure the UE with a plurality of BWPs. For example, to support data transmission/reception using a subcarrier spacing of 15 kHz and a subcarrier spacing of 30 kHz for a UE, the base station may configure the UE with two bandwidths, as subcarrier spacings of 15 kHz and 30 kHz. The different BWPs may be frequency division multiplexed and, when data is transmitted/received at a specific subcarrier spacing, the BWP configured as the corresponding subcarrier spacing may be activated.

To reduce power consumption of the UE, the base station may configure the UE with BWPs having different sized bandwidths. For example, when the UE supports a bandwidth exceeding a very large bandwidth, e.g., a bandwidth of 100 MHz, and transmits/receives data using all of the bandwidth, significant power consumption may occur. In particular, it is very inefficient in terms of power consumption to monitor an unnecessary DL control channel using a large bandwidth of 100 MHz when there is no traffic. To reduce power consumption of the UE, the base station may configure a BWP of a relatively small bandwidth to the UE, e.g., a BWP of 20 MHz, in the UE. In a no-traffic situation, the UE may perform monitoring in the 20 MHz bandwidth and, if data occurs, the UE may transmit/receive data in the 100 MHz bandwidth according to an instruction from the base station.

In a method for configuring a BWP, UEs before RRC connected may receive configuration information for an initial bandwidth via an MIB in the initial access phase. More specifically, the UE may be configured with a control region (which may be interchangeably used with control resource set or CORESET) for the DL control channel where the DCI scheduling the system information block (SIB) may be transmitted from the MIB of the PBCH. The bandwidth of the configured by the MIB may be regarded as the initial BWP, and the UE may receive the PDSCH, which transmits the SIB, via the configured initial BWP. The initial BWP may be utilized for other system information (OSI), paging, and random access as well as for receiving SIB.

If the UE is configured with one or more BWPs, the base station may indicate, to the UE, a change in BWP using the BWP indicator in the DCI. As an example, when the currently activated BWP of the UE is BWP #1 305 in FIG. 3, the base station may indicate, to the UE, BWP #2 310 with the BWP indicator in the DCI, and the UE may change the BWP to BWP #2 702, indicated with the BWP indicator in the received DCI.

As described above, since DCI-based BWP changing may be indicated by the DCI scheduling a PDSCH or a physical UL shared channel (PUSCH), the UE, if receiving a BWP change request, should be able to receive or transmit the PDSCH or the PUSCH, scheduled by the DCI, in the changed BWP without trouble. To that end, the standard specified requirements for delay time $T_{BWP}$ required upon changing BWP, which may be defined as follows.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.

Note 2:
If the BWP switch involves changing of SCS, the BWP switch delay is determined by the larger one between the SCS before BWP switch and the SCS after BWP switch.

The requirement for delay of BWP change supports type 1 or type 2 according to the capability of the UE. The UE may report a supportable BWP delay time type to the base station.

Figure 4:
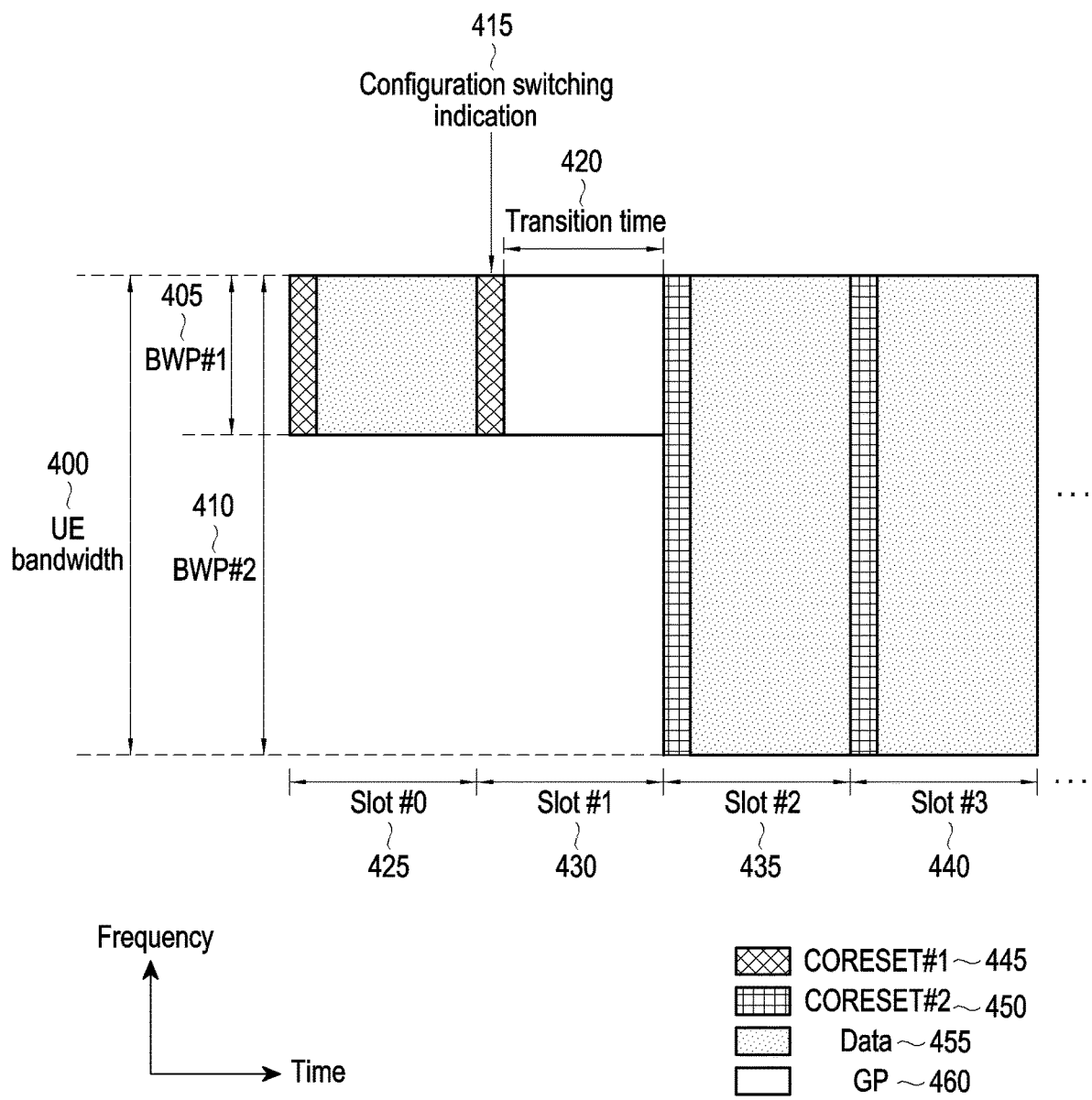
FIG. 4 illustrates a method for changing a BWP according to an embodiment.

FIG. 4 illustrates a method for changing BWPs according to an embodiment.

Referring to FIG. 4, if the UE receives, in slot n, DCI including a BWP change indicator according to the above-described requirements for BWP change delay time (415), the UE may change to the new BWP, indicated by the BWP change indicator, at a time no later than slot n+$T_{BWP}$, and may perform transmission/reception on the data channel scheduled by the DCI in the new BWP 410.

When scheduling a data channel with the new BWP 410, the base station may determine a time domain resource allocation (TDRA) for the data channel, considering the BWP change delay time ($T_{BWP}$) 420 of the UE. That is, when scheduling a data channel with the new BWP 410, in a method for determining a TDRA for the data channel, the base station may schedule a corresponding data channel in slots 435 and 440 after the BWP change delay time. Thus, the UE may not expect that the DCI indicating the BWP change indicates a slot offset (K0 or K2) smaller than the BWP change delay time ($T_{BWP}$) 420. K0 denotes the slot offset in the DL, and K2 denotes the slot offset in the UL.

If the UE has received the DCI (e.g., DCI format 1_1 or 0_1) indicating the BWP change, the UE may not perform transmission or reception during the time period from the third symbol of the slot in which the PDCCH including the DCI has been received to the start point of the slot indicated by the slot offset (K0 or K2) value indicated by the TDRA indicator field in the DCI. For example, if the UE receives the DCI indicating a BWP change in slot n, and the slot offset value indicated by the DCI is K, the UE may not perform transmission or reception from the third symbol of slot n to a symbol before slot n+K (i.e., the last symbol of slot n+K−1).

The UE may be configured with one or more BWPs by the base station and may further be configured with parameters (e.g., UL/DL link data channel and control channel-related configuration information) to be used for transmission/reception for each configured BWP. For example, when the UE is configured with BWP #1 305 and BWP #2 310 as illustrated in FIG. 3, the UE may be configured with transmission reception parameter #1 for BWP #1 and transmission reception parameter #2 for BWP #2 310. When BWP #1 305 is active, the UE may perform transmission/reception with the base station based on transmission reception parameter #1 and, when BWP #2 310 is active, the UE may perform transmission/reception with the base station based on transmission reception parameter #2. The transmission reception parameters may be referred to as configuration information or control information for BWP.

More specifically, the following parameters may be configured to the UE by the base station.

For the UL BWP, the following information may be configured.

As shown in Table 4 above, the UE may be configured, by the base station, with cell-specific (or cell common or common) transmission-related parameters (e.g., a random access channel (RACH), a PUCCH, a UL data channel (PUSCH)-related parameters) (corresponding to BWP-UplinkCommon). Further, the UE may be configured, by the base station, with UE-specific (or dedicated) transmission-related parameters (e.g., a PUCCH, a PUSCH, a non-authorized-based UL transmission (grant PUSCH), sounding RS (SRS)-related parameters) (corresponding to BWP-UplinkDedicated).

For the DL BWP, the following information may be configured.

TABLE 5

BWP-Downlink ::=                                        SEQUENCE {
  bwp-Id (bandwidth part identifier) BWP-Id,
  bwp-Common (cell-specific or common parameter) BWP-

TABLE 4

BWP-Uplink ::=                                          SEQUENCE {
  bwp-Id (bandwidth part identifier)           BWP-id,
  bwp-Common (cell-specific or common parameter)   BWP-
UplinkCommon
OPTIONAL, -- Cond SetupOtherBWP
  bwp-Dedicated (UE-specific parameter)        BWP-
UplinkDedicated
OPTIONAL, -- Cond SetupOtherBWP
  ...
}
BWP-UplinkCommon ::=                                    SEQUENCE {
  genericParameters (common parameter) BWP,
  rach-ConfigCommon (random access-related common parameter)
SetupRelease { RACH-ConfigCommon }
OPTIONAL, -- Need M
  pusch-ConfigCommon (PUSCH-related common parameter)
SetupRelease { PUSCH-ConfigCommon }
OPTIONAL, -- Need M
  pucch-ConfigCommon (PUCCH-related common parameter)
SetupRelease { PUCCH-ConfigCommon }
OPTIONAL, -- Need M
  ...
}
BWP-UplinkDedicated ::=                                 SEQUENCE {
  pucch-Config (PUCCH-related UE-specific parameter)
SetupRelease { PUCCH-Config }
OPTIONAL, -- Need M
  pusch-Config (PUSCH-related UE-specific parameter)
SetupRelease { PUSCH-Config }
OPTIONAL, -- Need M
  configuredGrantConfig (configured grant-related parameter)
SetupRelease { ConfiguredGrantConfig }
OPTIONAL, -- Need M
  srs-Config ( SRS-related parameter) SetupRelease
{ SRS-Config }                                          OPTIONAL,
-- Need M
  beamFailureRecoveryConfig (beam failure recovery-related parameter)
SetupRelease { BeamFailureRecoveryConfig }
OPTIONAL, -- Coud SpCellOnly
  ...
}

TABLE 5-continued

```
DownlinkCommon
OPTIONAL,   -- Cond SetupOtherBWP
  bwp-Dedicated (UE-specific parameter) BWP-DownlinkDedicated
OPTIONAL,   -- Cond SetupOtherBWP
  . . .
}
BWP-DownlinkCommon ::=        SEQUENCE {
  genericParameters (common parameter) BWP,
  pdcch-ConfigCommon (PDCCH-related common parameter)
SetupRelease { PDCCH-ConfigCommon }
OPTIONAL,   -- Need M
  pdsch-ConfigCommon (PDSCH-related common parameter)
SetupRelease { PDSCH-ConfigCommon }
OPTIONAL,   -- Need M
  . . .
}
BWP-DownlinkDedicated ::=      SEQUENCE {
  pdcch-Config (PDCCH-related UE-specific parameter) SetupRelease
{ PDCCH-Config }
OPTIONAL,   -- Need M
  pdsch-Config (PDSCH-rslated UE-specific parameter) SetupRelease
{ PDSCH-Config }
OPTIONAL,   -- Need M
  sps-Config (SRS-related parameter) SetupRelease { SPS-Config }
OPTIONAL,   -- Need M
  radioLinkMonitoringConfig (RLM-related parameter) SetupRelease
{ RadioLinkMonitoringConfig }
OPTIONAL,   -- Need M
  . . .
}
```

As shown in Table 5 above, the UE may be configured, by the base station, with cell-specific (or cell common or common) reception-related parameters (e.g., a PDCCH, a DL data channel (PDSCH)-related parameters) (corresponding to BWP-DownlinkCommon). Further, the UE may be configured, by the base station, with UE-specific (or dedicated) reception-related parameters (e.g., a PDCCH, a PDSCH, a non-authorized DL data transmission (e.g., semi-persistent scheduled PDSCH), radio link monitoring (RLM)-related parameters) (corresponding to BWP-UplinkDedicated).

Figure 5:
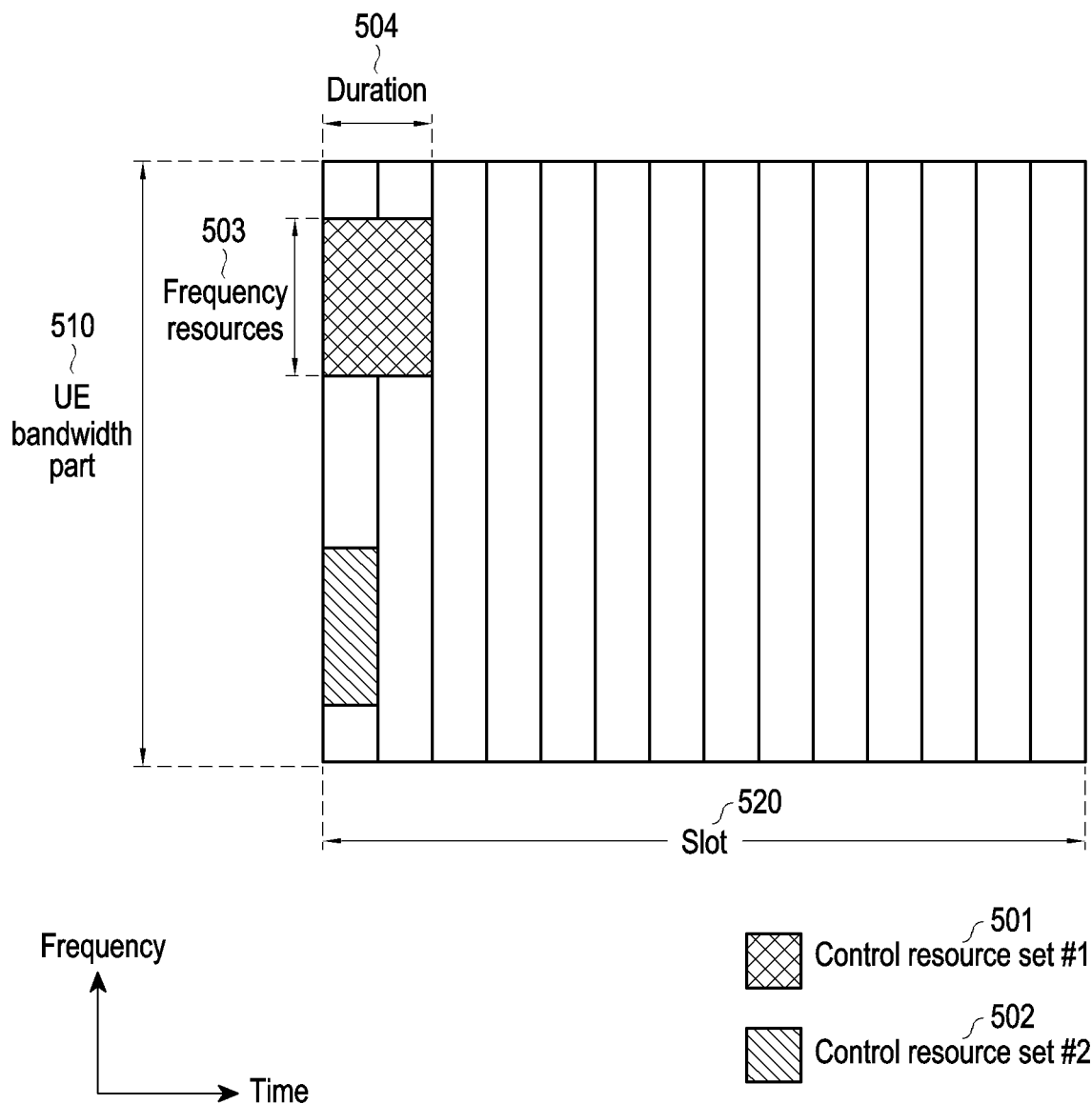
FIG. 5 illustrates a control resource set (CORESET) in which a download control channel is transmitted according to an embodiment.

FIG. 5 illustrates a CORESET in which a download control channel is transmitted according to an embodiment.

Referring to FIG. 5, two CORESETs (CORESET #1 501 and CORESET #2 502) are configured in one slot 520 on the time axis, and a UE BWP 510 is configured on the frequency axis. The CORESETs 501 and 502 may be configured to a particular frequency resource 503 in the overall system BWP 510 on the frequency axis. The CORESETs 501 and 502 may be configured with one or more OFDM symbols on the time axis, which may be defined as CORESET duration 504. CORESET #1 501 may be configured as a CORESET length of two symbols, and CORESET #2 502 may be configured as a CORESET length of one symbol.

The CORESET in the above-described 5G system may be configured to the UE, by the base station, through higher layer signaling (e.g., system information, an MIB, RRC signaling) (hereinafter, "higher layer"). Configuring a UE with a CORESET includes providing the UE with information such as an ID of the CORESET, a frequency position of the CORESET, and a symbol length of the CORESET. For example, information provided to configure the CORESET is shown in Table 6.

TABLE 6

| | |
|---|---|
| ControlResourceSet ::= | SEQUENCE { |
| controlResourceSetId (control resource set identifier) ControlResourceSetId, | |
| frequencyDomainResources (frequency domain resource allocation information) BIT STRING (SIZE (45)), | |
| duration (time domain resource allocation information) INTERGER (1..maxCoReSetDuration), | |
| cce-REG-MappingType (CCE-to-REG mapping scheme) CHOICE { | |
| interleaved | SEQUENCE { |
| reg-BundleSize (REG bundle size) ENUMERATED { n2, n3, n6}, | |
| precoderGranularity { sameAsREG-bundle, allContiguousRBs }, | ENUMERATED |
| interleaverSize (inter-leaver size) ENUMERATED { n0, n3, n6}, | |
| shiftIndex (interleaver shift) INTEGER(0..maxNrofPhysicalResourceBlocks-1) Need S }, | OPTIONAL -- |
| nonInterleaved }, | NULL |
| tci-StatesPDCCH (QCL configuration information) SEQUENCE(SIZE (1,.maxNrofTCI-StatesPDCCH)) OF TCI-StateId OPTIONAL, | |
| tci-PresentInDCI { enabled } } | ENUMERATED |

In the 5G system, the CORESET may include NRB-CORESET RBs in the frequency domain and may include $N_{symb}CORESET \in \{1,2,3\}$ symbols on the time axis. One CCE may include 6 resource element groups (REGs), and the REG may be defined as 1 RB during 1 OFDM symbol. In one CORESET, REGs may be indexed in a time-first order, starting with REG index 0 from the first OFDM symbol of the CORESET, the lowest RB.

In a 5G system, an interleaved scheme and a non-interleaved scheme are supported as transmission schemes for a PDCCH. The base station may configure a UE to perform interleaving transmission or non-interleaving transmission for each CORESET, through higher layer signaling. Interleaving may be performed in each REG bundle unit. A REG bundle may be defined as a set of one or multiple REGs. The UE may determine a control channel element (CCE)-to-REG mapping scheme in the corresponding CORESET, as shown in Table 7 below, based on whether to perform interleaving or non-interleaving transmission, configured by the base station.

TABLE 7

The CCE-to-REG mapping for a control-resource set can be interleaved or non-interleaved and is described by REG bundles:
- REG bundle i is defined as REGs $\{iL, iL + 1, \ldots, iL + L - 1\}$ where L is the REG bundle size, $i = 0, 1, \ldots, N_{REG}^{CORESET}/L - 1$, and $N_{REG}^{CORESET} = N_{REG}^{CORESET} N_{symb}^{CORESET}$ is the number of REGs in the CORESET
- CCE j consists of REG bundles $\{f(6j/L), f(6j/L+ 1), \ldots, f(6j/L + 6/L - 1)\}$ where $f(\bullet)$ is an interleaver For non-interleaved CCE-to-REG mapping, $L = 6$ and $f(x) = x$.
For interleaved CCE-to-REG mapping, $L \in \{2, 6\}$ for $N_{symb}^{CORESET} = 1$ and $L \in \{N_{symb}^{CORESET}, 6\}$ for $N_{symb}^{CORESET} \in \{2, 3\}$. The interleaver is defined by $$f(x) = (rC + c + n_{shift}) \bmod (N_{symb}^{CORESET}/L)$$
$$x = cR + r$$
$$r = 0, 1, \ldots, R - 1$$
$$c = 0, 1, \ldots, C - 1$$
$$C = N_{REG}^{CORESET}/(LR)$$

where $R \in \{2, 3, 6\}$.

The basic unit of a DL control channel, i.e., a REG, may include all of the REs to which the DCI is mapped and the region to which the demodulation RS (DMRS), which is an RS for decoding the REs, is mapped. Three DMRS REs may be included in one REG. The number of CCEs to transmit a PDCCH may be 1, 2, 4, 8, or 16 depending on the aggregation level (AL), and different numbers of CCEs may be used to implement link adaptation of DL control channel. For example, if AL=L, one DL control channel may be transmitted via L CCEs.

The UE should detect a signal while being unaware of information for a DL control channel, and for blind decoding, a search space is defined to indicate a set of CCEs. The search space may include a set of candidate control channels constituted of CCEs that the UE should attempt to decode on the given aggregation level, and since there are several aggregation levels to bundle up, e.g., 1, 2, 4, 8, or 16 CCEs, the UE has a plurality of search spaces. A search space set (Set) may be defined as a set of search spaces at all set aggregation levels.

Search spaces may be classified into common search spaces and UE-specific search spaces. A predetermined group of UEs or all of the UEs may search for the common search space of the PDCCH to receive cell-common control information, e.g., a paging message, or dynamic scheduling for system information. For example, the UE may receive PDSCH scheduling allocation information for transmitting an SIB including cell service provider information by searching for the common search space of the PDCCH. For a common search space, since a certain group of UEs or all of the UEs should receive the PDCCH, the common search space may be defined as a set of CCEs previously agreed on.

Scheduling allocation information for a UE-specific PDSCH or PUSCH may be received by searching for the UE-specific search space of a PDCCH. The UE-specific search space may be UE-specifically defined with a function of various system parameters and the identification information (e.g., an ID) for the UE.

In a 5G system, the parameters for the search space for the PDCCH may be configured to the UE, by the base station, through higher layer signaling (e.g., an SIB, an MIB, or RRC signaling). For example, the base station may configure the UE with the number of PDCCH candidates at each aggregation level L, a monitoring period for search space, a monitoring occasion of a symbol unit in a slot for a search space, a search space type (e.g., a common search space or a UE-specific search space), a combination of a radio network temporary identifier (RNTI) and a DCI format to be monitored in the search space, and a CORESET index to be monitored in the search space. For example, parameters for the search space for the PDCCH may include the information shown in Table 8.

TABLE 8

```
SearchSpace ::=                               SEQUENCE {
-- Identify of the search space, SearchSpaceID = 0 identifies the
SearchSpace configured via PBCH (MIB) or ServingCellConfigCommon.
     searchSpaceId (search space identifier) SearchSpaceId,
     controlResourceSetId (control resource set identifier)
ControtResourceSetId
OPTIONAL,     -- Cond SetupOnly
     monitoringSlotPeriodicityAndOffset (monitoring slot level
period) CHOICE {
     sl1                             NULL,
     sl2                             INTEGER (0 . . . 1),
     sl4                             INTEGER (0 . . . 3).
     sl5                             INTEGER (0 . . . 4),
     sl8                             INTEGER (0 . . . 7),
     sl10                            INTEGER (1 . . . 9),
     sl16                            INTEGER (1 . . . 15),
     sl20                            INTEGER (0 . . . 19)
}
duration (monitoring length)         INTEGER (2 . . . 2559)
monitoringSymbolsWithinSlot (monitoring symbol in slot) BIT
STRING (SIZE (14))
     nrofCandidates (number of PDCCH candidate groups for aggregation
level)
     SEQUENCE {
         aggregationLevel1           ENUMERATED {n0, n1,
n2, n3, n4, n5, n6, n8},
         aggregationLevel2           ENUMERATED {n0, n1,
n2, n3, n4, n5, n6, n8,},
         aggregationLevel4           ENUMERATED {n0, n1,
n2, n3, n4, n5, n6, n8},
         aggregationLevel8           ENUMERATED {n0, n1,
n2, n3, n4, n5, n6, n8},
         aggregationLevel16          ENUMERATED {n0, n1,
n2, n3, n4, n5, n6, n8},
     }
```

TABLE 8-continued

```
searchSpaceType (search space type)   CHOICE {
-- Configures this search space as common search space (CSS) and DCI
formats to monitor.
common (common search space)          SEQUENCE {
}
ue-Specific (UE-specific search space) SEQUENCE {
-- Indicates whether the UE monitors in this USS for DCI formats 0-0
and 1-0 or for formats 0-1 and 1-1.
formats                               ENUMERATED
{formats 0-0-And-1-0, formats 0-1-And-1-1},
...
}
```

According to the configuration information, the base station may configure one or more search space sets to the UE. The base station may configure search space set 1 and search space set 2 to the UE. Search space set 1 may be configured so that the UE monitors DCI format A, scrambled with X-RNTI, in the common search space, and search space set 2 may be configured so that the UE monitors DCI format B, scrambled with Y-RNTI, in the UE-specific search space. In the X-RNTI and Y-RNTI, "X" and "Y" may correspond to one of various RNTIs.

According to the above-described configuration information, one or more search space sets may be present in a common search space or a UE-specific search space. For example, search space set #1 and search space set #2 may be configured as the common search space, and search space set #3 and search space set #4 may be configured as the UE-specific search space.

In the common search space, a combination of DCI format and RNTI, as follows, may be monitored, but is not limited to the examples described below.

DCI format 0_0/1_0 with a cyclic redundancy check (CRC) scrambled by a cell (C)-RNTI, a configured scheduling (CS)-RNTI, a semi-persistent (SP)-channel state information (CSI)-RNTI, a random access (RA)-RNTI, a temporary cell (TC)-RNTI, a paging (P)-RNTI, a system information (SI)-RNTI DCI format 2_0 with a CRC scrambled by a slot format indicator (SFI)-RNTI DCI format 2_1 with a CRC scrambled by an interruption (INT)-RNTI DCI format 2_2 with a CRC scrambled by a TPC-PUSCH-RNTI, TPC-PUCCH-RNTI DCI format 2_3 with a CRC scrambled by a TPC-SRS-RNTI In the UE-specific search space, a combination of a DCI format and an RNTI, as follows, may be monitored, but is not limited to the examples described below.

DCI format 0_0/1_0 with a CRC scrambled by a C-RNTI, a CS-RNTI, a TC-RNTI

DCI format 1_0/1_1 with a CRC scrambled by a C-RNTI, a CS-RNTI, a TC-RNTI

The specified RNTIs may be defined and used as follows.
C-RNTI: for scheduling a UE-specific PDSCH
TC-RNTI: for scheduling UE-specific PDSCH
CS-RNTI: for scheduling a semi-statically configured UE-specific PDSCH
RA-RNTI: for scheduling a PDSCH in the random access phase
P-RNTI: for scheduling a PDSCH where paging is transmitted
SI-RNTI: for scheduling a PDSCH where system information is transmitted
INT-RNTI: for informing whether to puncture the PDSCH (notifies the UE of interrupted transmission on the PDSCH)
Transmit power control for a PUSCH RNTI (TPC-PUSCH-RNTI): for indicating power control command for a PUSCH
Transmit power control for a PUCCH RNTI (TPC-PUCCH-RNTI): for indicating power control command for a PUCCH
Transmit power control for an SRS RNTI (TPC-SRS-RNTI): for indicating a power control command for an SRS The above-described DCI formats may follow the definitions shown in Table 9 below.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE, |
| 2_2 | Transmission of TPC commands for PUCCH and PUSCH |
| 2_3 | Transmission of a group of TPC commands for SRS transmissions by one or more UEs |

For example, the base station may use DCI format 0_0 or DCI format 0_1 to allocate a PUSCH to one cell.

DCI format 0_0 includes the following information when transmitted with a CRC scrambled by at least one of a C-RNTI, a CS-RNTI, or a modulation coding scheme (MCS)C-RNTI (MCS-C-RNTI):

Identifier for DCI formats (1 bit): A DCI format indicator, which is always set to 0.

Frequency domain resource assignment (determines payload according to the frequency axis resource assignment): indicates the frequency axis resource assignment. $\lceil \log_2(N_{RB}^{UL,BWP}(N_{RB}^{UL,BWP}+1)/2 \rceil$ is the size of the active UL BWP.

Time domain resource assignment (4 bits): indicates time domain resource assignment.

Frequency hopping flag (1 bit): indicates whether the PUSCH allocated by the corresponding DCI is hopped on the frequency axis.

MCS (5 bits): indicates the modulation order and coding rate used for a PUSCH transmission.

New data indicator (NDI) (1 bit) field: indicates whether a PUSCH is an initial transmission or a retransmission depending on whether it is toggled.

Redundancy version (RV) (2 bits): indicates the RV used for a PUSCH transmission.

HARQ process number (4 bits): indicates the HARQ processor number used for a PUSCH transmission.

Transmit Power Control (TPC) command for scheduled a PUSCH (2 bits): An indicator for adjusting the transmission strength of the PUSCH allocated by the DCI.

UL/supplementary UL (SUL) indicator (1 bit): indicates whether to perform an SUL transmission on a PUSCH allocated by the corresponding DCI. When transmission using the SUL is not performed, the bit length of the corresponding area is 0 bits.

DCI format 0_1 includes the following information when transmitted along with the CRC scrambled by at least one of a C-RNTI, a CS-RNTI, an SP-CSI-RNTI, or an MCS-C-RNTI.

Identifier for DCI formats (1 bit): is a DCI format indicator, which is always set as 0.

Carrier indicator (0 or 3 bits): indicates the component carrier (CC) (or cell) where the PUSCH allocated by the corresponding DCI is transmitted.

UL/SUL indicator (0 or 1 bit): indicates whether to perform SUL transmission on a PUSCH allocated by the corresponding DCI.

BWP indicator (0, 1 or 2 bits): indicates the BWP through which the PUSCH allocated by the corresponding DCI is transmitted.

Frequency domain resource assignment (determines payload according to the frequency axis resource assignment): indicates the frequency axis resource assignment. $N_{RB}^{DL,BWP}$ is the size of the active DL BWP.

Time domain resource assignment (0 or 1 or 2 or 3 or 4 bits): indicates a time domain resource assignment.

Frequency hopping flag (0 or 1 bit): indicates whether the PUSCH allocated by the corresponding DCI is hopped on the frequency axis.

MCS (5 bits): indicates the modulation order and coding rate used for PUSCH transmission.

NDI (1 bit) field: indicates whether PUSCH is initial transmission or retransmission depending on whether it is toggled.

RV (2 bits): indicates the RV used for a PUSCH transmission.

HARQ process number (4 bits): indicates the HARQ processor number used for a PUSCH transmission.

1st DL assignment index (DAI) (1 or 2 bits): indicates a DAI for HARQ-ACK codebook generation.

2nd DAI (0 or 2 bits): indicates DAI for HARQ-ACK codebook generation.

TPC command for scheduled a PUSCH (2 bits): An indicator for adjusting the transmission strength of the PUSCH allocated by the DCI.

SRS resource indicator (depending on the SRS usage configuration): indicates the transmission precoding configuration of the PUSCH allocated by the corresponding DCI through the SRS resource.

Precoding information and number of layers (0 or 1 or 2 or 3 or 4 or 5 or 6 bits): indicates the transmission precoding information and the number of transmission layers of the PUSCH allocated by the corresponding DCI.

Antenna port (2 or 3 or 4 or 5 bits): indicates the transmission DMRS port and code division multiplexing (CDM) group without data of the PUSCH allocated by the corresponding DCI.

SRS request (2 or 3 bits): indicates the SRS resource requesting transmission through the corresponding DCI.

CSI request (0 or 1 or 2 or 3 or 4 or 5 or 6 bits): indicates the CSI report trigger state that requests transmission through the corresponding DCI.

Code block group (CBG) transmission information (0 or 2 or 4 or 6 or 8 bits): An indicator indicating whether to transmit CBGs in the PUSCH allocated through the corresponding DCI.

Phase tracking RS (PTRS)-DMRS association (0 or 2 bits): indicates a port connection relationship between the PTRS of the PUSCH allocated by the corresponding DCI and the DMRS.

Beta_offset indicator (0 or 2 bits): indicates the offset value used when multiplexing HARQ-ACK or a CSI report to a PUSCH.

DMRS sequence initialization(0 or 1 bit): An indicator for DMRS scrambling ID selection.

UL-shared channel (SCH) indicator (0 or 1 bit): indicates whether the PUSCH allocated by the corresponding DCI includes the UL-SCH.

For example, the base station may use DCI format 1_0 or DCI format 1_1 to allocate (schedule) a PDSCH to one cell.

DCI format 1_0 includes the following information when transmitted along with the CRC scrambled by a C-RNTI, a CS-RNTI, or an MCS-C-RNTI:

Identifier for DCI formats (1 bit): A DCI format indicator, which is always set to 1.

Frequency domain resource assignment $\lceil \log_2(N_{RB}^{DL,BWP})N_{RB}^{DL,BWP}+1)/2 \rceil$ (bits): indicates frequency axis resource allocation. When DCI format 1_0 is monitored in the UE specific search space, $N_{RB}^{DL,BWP}$ is the size of the active DL BWP, otherwise $N_{RB}^{DL,BWP}$ is the size of the initial DL BWP. For a detailed method, refer to the frequency axis resource allocation.

When all frequency domain resource assignment areas are set to 1, DC format 1_0 indicates a command for the random access procedure, and all remaining areas are set as follows.

Random access preamble index (6 bits): indicates the index of the preamble for performing random access.

UL/SUL indicator (1 bit): If the values of the random access preamble index areas are not all set to 0 and the UE has set the higher layer parameter ServingCellConfig set to supplementaryUplink, the corresponding area indicates the UL carrier for transmitting the PRACH.

SS/PBCH index (6 bits): If all values of the random access preamble index areas are not set to 0, the corresponding area indicates the SS/PBCH (i.e., the synchronization signal block (SSB)) for PRACH transmission.

PRACH Mask index (4 bits): If all values of the random access preamble index areas are not set to 0, the corresponding area indicates the RACH period associated with the SS/PBCH indicated by the SS/PBCH index.

If all bits of the frequency domain resource assignment are not set to 1, the remaining area are set as follows.

Time domain resource assignment (4 bits): indicates time domain resource assignment as described above.

Virtual RB (VRB)-to-physical RB (PRB) mapping (1 bit): 0 indicates non-interleaved, 1 indicates interleaved VRB-to-PRB mapping.

MCS (5 bits): indicates the modulation order and coding rate used for PDSCH transmission.

NDI (1 bit) field: indicates whether a PDSCH is an initial transmission or a retransmission depending on whether it is toggled.

RV (2 bits): indicates the RV used for PDSCH transmission.

HARQ process number (4 bits): indicates the HARQ processor number used for PDSCH transmission.

DAI (2 bits): A DAI indicator

TPC command for scheduled PUCCH (2 bits): A PUCCH power control indicator

PUCCH resource indicator (3 bits): A PUCCH resource indicator, which indicates one of eight resources configured by a higher layer.

PDSCH-to-HARQ_feedback timing indicator (3 bits): A HARQ feedback timing indicator that indicates one of eight feedback timing offsets set by a higher layer.

DCI format 1_1 includes the following information when transmitted along with the CRC scrambled by a C-RNTI, a CS-RNTI, or an MCS-C-RNTI:

Identifier for DCI formats (1 bit): A DCI format indicator, which is always set to 1.
Carrier indicator (0 or 3 bits): indicates the CC (or cell) where the PDSCH allocated by the corresponding DCI is transmitted.
BWP indicator (0, 1 or 2 bits): indicates the BWP through which the PDSCH allocated by the corresponding DCI is transmitted.
Frequency domain resource assignment (determines payload according to the frequency axis resource assignment): indicates the frequency axis resource assignment. $N_{RB}^{DL,BWP}$ is the size of the active DL BWP. For a detailed method, refer to the frequency axis resource allocation.
Time domain resource assignment (0 or 1 or 2 or 3 or 4 bits): indicates time domain resource assignment as described above.
VRB-to-PRB mapping (0 or 1 bit): 0 indicates non-interleaved, 1 indicates interleaved VRB-to-PRB mapping. This is 0 bit when frequency axis resource allocation is set to resource type 0.
PRB bundling size indicator (0 or 1 bit): When the higher layer parameter prb-BundlingType is not set or is set to 'static', this is 0 bit, and when it is set to 'dynamic', this is 1 bit.
Rate matching indicator (0 or 1 or 2 bits): indicates the rate matching pattern.
Zero power (ZP) CSI-RS trigger (0 or 1 or 2 bits): An indicator for triggering an aperiodic ZP CSI-RS.
For transport block (TB) 1:
MCS (5 bits): indicates the modulation order and coding rate used for PDSCH transmission.
NDI (1 bit) field: indicates whether PDSCH is initial transmission or retransmission depending on whether it is toggled.
RV (2 bits): indicates the RV used for PDSCH transmission.
For TB 2:
MCS (5 bits): indicates the modulation order and coding rate used for PDSCH transmission.
NDI (1 bit) field: indicates whether a PDSCH is an initial transmission or a retransmission depending on whether it is toggled.
RV (2 bits): indicates the RV used for PDSCH transmission.
HARQ process number (4 bits): indicates the HARQ processor number used for PDSCH transmission.
DAI (0 or 2 or 4 bits): A DAI indicator
TPC command for scheduled PUCCH (2 bits): A PUCCH power control indicator
PUCCH resource indicator (3 bits): A PUCCH resource indicator that indicates one of eight resources configured by a higher layer.
PDSCH-to-HARQ_feedback timing indicator (0, 1, 2, or 3 bits): A HARQ feedback timing indicator, which indicates one of eight feedback timing offsets set by a higher layer.
Antenna port (4 or 5 or 6 bits): indicates DMRS port and CDM group without data.
Transmission configuration indication (TCI) (0 or 3 bits): a TCI indicator.
SRS request (2 or 3 bits): an SRS transmission request indicator.
CBG transmission information (0 or 2 or 4 or 6 or 8 bits): An indicator indicating whether to transmit code block groups in the allocated PDSCH. 0 indicates that the CBG is not transmitted, and 1 indicates that the CBG is transmitted.
CBG flushing out information (0 or 1 bit): An indicator indicating whether previous CBGs are contaminated—0 indicates a previous CBG may have been contaminated, and 1 indicates that a previous CBG may be used when receiving retransmissions (combinable).
DMRS sequence initialization (1 bit): An indicator for DMRS scrambling ID selection.

For example, the base station may use DCI format 2_2 to transmit a TPC command group for PUCCH and PUSCH transmission to one or more UEs.

DC format 2_2 includes the following information when transmitted together with the CRC scrambled by TPC-PUSCH-RNTI or TPC-PUCCH-RNTI:
block number 1, block number 2, . . . block number N The higher layer parameter tpc-PUSCH or tpc-PUCCH determines indexes to a number of blocks for UL of one cell, and each block includes the following fields.
Closed loop indicator—0 or 1 bit
For DCI format 2_2 detected by a TPC-PUSCH-RNTI, if the UE is not configured with the higher layer parameter two PUSCH-PC-AdjustmentStates, this area is 0 bits. The UE assumes that each block in DCI format 2_2 is 2 bits; otherwise, this area is 1 bit, and the UE assumes that each block in DCI format 2_2 is 3 bits.

The number of bits in Format 2_2 may be less than or equal to the payload size of format 1_0 monitored in the common search space in the same support cell. If the number of bits in format 2_2 is smaller than the payload size of format 1_0, 0s are added to format 2_2 until it equals the payload size of format 1_0.

The number of DCIs with different sizes that the UE may receive per slot in the corresponding cell is up to 4. The number of DCIs with different sizes, scrambled with the C-RNTI, that the UE may receive per slot in the corresponding cell is up to 3.

In a 5G system, the search space of the aggregation level L in the CORESET p and the search space set s may be expressed as shown in Equation (1).

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad (1)$$

L: Aggregation level
$n_{CI}$: Carrier index
$N_{CCE,p}$: Total number of CCEs present in CORESET p
$n_{s,f}^\mu$: Slot index
$M_{p,s,max}^{(L)}$: Number of PDCCH candidate groups of aggregation level L
$m_{s,n_{CI}} = 0, \ldots, M_{p,s,max}^{(L)} - 1$: PDCCH candidate group index of aggregation level L
i=0, . . . , L−1
nRNTI: UE identifier
$Y_{p,n_{s,f}^\mu}$ may be 0 in the case of the common search space. For a UE-specific search space, $Y_{p,n_{s,f}^\mu}$ may be a value that changes depending on the UE's identification information (e.g., a C-RNTI or an ID configured to the UE by the base station) and the time index.

The base station may configure and indicate a TCI state between two different RSs or channels via proper signaling, announcing a quasi co-location (QCL) relationship between the different RSs or channels. When different RSs or channels are QCLed, in estimating a channel via a reference RS antenna port A (reference RS #A) and an RS antenna port B (target RS #B), which have a QCL relationship, the UE is allowed to apply all or some of large-scale channel parameters estimated from antenna port A to channel measurement from antenna port B. QCL may require associating different parameters depending on contexts, such as 1) time tracking influenced by average delay and delay spread, 2) frequency tracking influenced by Doppler shift and Doppler spread, 3) radio resource management (RRM) influenced by average gain, and 4) beam management (BM) influenced by a spatial parameter. NR supports four types of QCL relationships as shown in Table 10 below.

TABLE 10

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

A spatial RX parameter may collectively refer to all or some of various parameters, such as angle of arrival (AoA), power angular spectrum (PAS) of AoA, angle of departure (AoD), PAS of AoD, transmit/receive channel correlation, transmit/receive beamforming, spatial channel correlation, etc.

The QCL relationship may be configured to the UE through the RRC parameter TCI-State and QCL-Info as shown in Table 11 below.

TABLE 11

```
TCI-State ::=                           SEQUENCE {
    tci-StateId (ID of TCI state)       TCI-StateId,
    qcl-Type1                           QCL-Info,
    (QCL information of first reference RS of RS (target RS) referencing
the TCI state ID)
    qcl-Type2                           QCL-info
    OPTIONAL,    -- NeedR
    (QCL information of second reference RS of RS (target RS)
referencing the TCI state ID)
    ...
}
QCL-Info ::=                            SEQUENCE {
    cell                                ServCellIndex
OPTIONAL,    -- Need R
    (serving cell index of reference RS indicated by QCL information)
    bwp-Id                              BWP-Id
OPTIONAL, -- Cond CSI-RS-Indicated
    (BWP index of reference RS indicated by QCL information)
    referenceSignal                     CHOICE {
        csi-rs                          NZP-CSI-RS-
ResourceId,
        ssb                             SSB-Index
    (one of CSI-RS ID or SSB ID indicated by QCL information)
    },
    qcl-Type                            ENUMERATED {typeA,
typeB, typeC, typeD},
    ...
}
```

As shown above in Table 11, the base station may configure the UE with one or more TCI states, indicating up to two QCL relationships (qcl-Type1 and qcl-Type2) for the RS referencing the ID of the TCI state, i.e., the target RS. In this case, the QCL information (QCL-Info) included in each TCI state includes the serving cell index and BWP index of the reference RS indicated by the QCL information, type and ID of the reference RS, and the QCL type as shown in Table 10 above.

A method for configuring spatial relation information (SpatialRelationInfo), which indicates UL beam information between a UE and a base station in a 5G communication system is described below in detail.

The base station may establish a relationship between the UL channel or signal A (the channel or signal referencing the SpatialRelationInfo) and another DL channel or signal or UL channel or signal B (the referenceSignal included in the SpatialRelationInfo configuration) through proper signaling (SpatialRelationInfo). Based thereupon, the UE uses the beam direction, which is used for receiving or transmitting the channel or signal B, for transmitting the channel or signal A.

The configuration of the spatial relation information (SpatialRelationInfo) may be changed according to the type of the UL channel or signal referencing it. For example, the SpatialRelationInfo referenced by the SRS resource may include referenceSignal information for determining the PUCCH transmission beam as shown in Table 12.

TABLE 12

```
SRS-SpatialRelationInfo ::=     SEQUENCE {
    servingCellId               ServCellIndex
OPTIONAL,    -- Need S
    (serving cell index: serving cell index of reference RS indieaed by
the
spatial relation information)
        referenceSignal         CHOICE {
            ssb-Index           SSB-Index,
            csi-RS-Index        NZP-CSI-RS-
ResourceId,
            srs                 SEQUENCE {
                resourceId      SRS-ResourceId,
                uplinkBWP       BWP-Id
            }
        }( One of CSI-RS ID, SSB ID, or SRS resource ID indicated by the
spatial relation information)
}
```

As described above, the TCI state may be used for DL channel beam indication (indication of a UE's reception space filter value/type), and space-related information (SpatialRelationInfo) may be used for UL channel beam indication (indication of the UE's transmission space filter value/type). However, the disclosure is not limited to depending on the type of UL/DL and may be expanded between each other in the future. For example, a conventional DL TCI state may be expanded to a UL TCI state by a method of adding a UL channel or signal to the type of target RS capable of referencing the TCI state or adding a UL channel or signal to the type of the referenceSignal (or reference RS) included in the QCL-Info or TCI state. Further, various expanding methods, such as DL-UL joint TCI state, exist, but not all of the methods are described to focus on the subject matter of the description.

The base station may configure the UE with at least one SRS configuration for each UL BWP to transfer configuration information for SRS transmission and may configure the UE with at least one SRS resource set for each SRS configuration. For example, the base station and the UE may exchange the following signaling information to transfer information regarding the SRS resource set.

srs-ResourceSetId: An SRS resource set index
   srs-ResourceIdList: A set of SRS resource indexes referenced by an SRS resource set
   resourceType: A time-axis transmission configuration of the SRS resource referenced by an SRS resource set. This may be periodic, semi-persistent, or aperiodic. When set to periodic or semi-persistent, associated CSI-RS information may be provided depending on the use of the SRS resource set. If set to aperiodic, an aperiodic SRS resource trigger list and slot offset information may be provided, and associated CSI-RS information may be provided depending on the use of the SRS resource set.

usage: A configuration for the use of the SRS resource referenced by the SRS resource set and may be 'beamManagement,' 'codebook,' 'nonCodebook,' or 'antennaSwitching.' alpha, p0, pathlossReferenceRS, srs-PowerControlAdjustmentStates: This provides a parameter configuration for adjusting the transmit power of the SRS resource referenced by the SRS resource set.

The UE may understand that the SRS resource included in the set of SRS resource indexes referenced by the SRS resource set follows the information configured in the SRS resource set.

Further, the base station and the UE may exchange higher layer signaling information to transfer individual configuration information for the SRS resource. For example, the individual configuration information for the SRS resource may include time-frequency axis mapping information in the slot of the SRS resource, which may include information for frequency hopping within or between slots of the SRS resource.

As another example, the individual configuration information for the SRS resource may include the time axis(time domain) transmission configuration of the SRS resource and may be periodic, semi-persistent, or aperiodic. This may pose a limitation to have the same time axis transmission configuration as the SRS resource set including the SRS resource. If the time axis transmission configuration of the SRS resource is set to periodic or semi-persistent, the time axis transmission configuration may further include the SRS resource transmission period and slot offset (e.g., periodicityAndOffset).

As another example, the individual configuration information for the SRS resource may include a configuration for the UE's spatial domain transmission filter transmitting the SRS resource, which may be provided through the spatial relation information for an SRS. When the spatial relation information included in the individual configuration information for the SRS resource references the index of the SSB or CSI-RS resource, the UE may appreciate that the same spatial domain transmission filter as the spatial domain receive filter used when receiving the referenced CSI-RS or SSB is used. Alternatively, when the spatial relation information references a different SRS resource index, the UE may appreciate that the spatial domain transmission filter used when transmitting the referenced SRS resource is used.

The base station may trigger activation or deactivation for an SRS transmission to the UE, through RRC signaling or higher layer signaling, including MAC CE signaling, or L1 signaling (e.g., DCI).

For example, the base station may activate or deactivate periodic SRS transmission through higher layer signaling to the UE. The base station may instruct to activate the SRS resource set in which the resourceType is set to periodic, through higher layer signaling, and the UE may transmit the SRS resource referenced by the activated SRS resource set. The time-frequency axis resource mapping in the slot of the transmitted SRS resource follows the resource mapping information configured in the SRS resource, and the slot mapping including the transmission period and the slot offset follows the periodicityAndOffset configured in the SRS resource. Further, the spatial domain transmission filter applied to the transmitted SRS resource may reference the spatial relation information configured in the SRS resource or may reference the associated CSI-RS information configured in the SRS resource set including the SRS resource. The UE may transmit the SRS resource within the UL BWP activated for the periodic SRS resource activated through higher layer signaling.

The base station may activate or deactivate a semi-persistent SRS transmission, through higher layer signaling, to the UE. The base station may instruct to activate the SRS resource set through MAC CE signaling, and the UE may transmit the SRS resource referenced by the activated SRS resource set. The SRS resource set activated through MAC CE signaling may be limited to the SRS resource set in which the resourceType is set to semi-persistent. The time-frequency axis resource mapping in the slot of the transmitted SRS resource follows the resource mapping information configured in the SRS resource, and the slot mapping including the transmission period and the slot offset follows the periodicityAndOffset configured in the SRS resource. Further, the spatial domain transmission filter applied to the transmitted SRS resource may reference the spatial relation information configured in the SRS resource or may reference the associated CSI-RS information configured in the SRS resource set including the SRS resource. If spatial relation information is configured in the SRS resource, rather than following it, the configuration information for the spatial relation information transferred through MAC CE signaling, which activates the semi-persistent SRS transmission, may be referenced to determine the spatial domain transmission filter. The UE may transmit the SRS resource within the UL BWP activated for the semi-persistent SRS resource activated through higher layer signaling.

The base station may trigger the aperiodic SRS transmission through DCI to the UE. The base station may indicate an aperiodic SRS resource trigger through the SRS request field of the DCI. The UE may understand that the SRS resource set including the aperiodic SRS resource trigger indicated through the DCI in the aperiodic SRS resource trigger list among the configuration information of the SRS resource set has been triggered. The UE may transmit the SRS resource referenced by the triggered SRS resource set. The time-frequency axis resource mapping in the slot of the transmitted SRS resource follows the resource mapping information configured in the SRS resource. Further, the slot mapping of the transmitted SRS resource may be determined through a slot offset between a PDCCH including the DCI and the SRS resource, and it may reference the value(s) included in the slot offset set configured in the SRS resource set. Specifically, as the slot offset between the PDCCH including the DCI and the SRS resource, the value indicated by the time domain resource assignment field of the DCI among the offset value(s) included in the slot offset set configured in the SRS resource set may be applied. Further, the spatial domain transmission filter applied to the transmitted SRS resource may reference the spatial relation information configured in the SRS resource or may reference the associated CSI-RS information configured in the SRS resource set including the SRS resource. The UE may transmit an SRS resource within the UL BWP activated for aperiodic SRS resource triggered through DCI.

When the base station triggers aperiodic SRS transmission to the UE through the DCI, the UE may require a minimum time interval between the transmitted SRS and the PDCCH including the DCI triggering the aperiodic SRS transmission in order to apply the configuration information for the SRS resource and transmit the SRS. The time interval for the SRS transmission of the UE may be defined as the number of symbols between a last symbol of the PDCCH including the DCI triggering aperiodic SRS transmission and a first symbol mapped with a first SRS resource transmitted among the transmitted SRS resource(s). The minimum time interval may be determined with reference to a PUSCH preparation procedure time for the UE to prepare the PUSCH transmission. Further, the minimum time interval may have a different value depending on the use of the SRS resource set including the transmitted SRS resource. For example, the minimum time interval may be determined as $N_2$ symbols, which are defined based on the UE processing capability by referring to the UE's PUSCH preparation procedure time. Further, when the use of the SRS resource set is set to 'codebook' or 'antennaSwitching' considering the use of the SRS resource set including the transmitted SRS resource, the minimum time interval may be determined as $N_2$, and when the use of SRS resource set is set to 'nonCodebook' or 'beamManagement,' the minimum time interval may be determined as $N_2+14$ symbols. The UE may transmit an aperiodic SRS when the time interval for SRS transmission is greater than or equal to the minimum time interval and may disregard DCI triggering an aperiodic SRS when the time interval for SRS transmission is less than the minimum time interval.

In NR, the base station may schedule the UE to transmit the PUSCH using DCI format 0_0 or DCI format 0_1. The time axis and frequency axis resource mapping information for the PUSCH transmitted by the UE may be obtained with reference to the values of the time domain resource assignment and frequency domain resource assignment fields of the DCI. The detailed mapping method may follow the time axis resource allocation method and frequency axis resource allocation method described above.

Further, the transmission precoding information, rank, and the number of transmission layers for the PUSCH transmitted by the UE may reference the configuration information for the SRS resource indicated through the SRS resource indicator (SRI) field of the DCI or follow the information indicated by the precoding information and number of layers field of the DCI. Specifically, when the base station schedules the UE to transmit the PUSCH using DCI format 0_0, the UE may transmit the PUSCH in a single layer without applying precoding. When the base station schedules the UE to transmit a codebook-based PUSCH using DCI format 0_1, the UE may determine the transmission precoding and the number of transmission layers according to the configuration information for the SRS resource indicated through the SRI field of DCI and the information indicated by the precoding information and number of layers field of DCI. When the base station schedules the UE to transmit a non-codebook-based PUSCH using DCI format 0_1, the UE may determine the transmission precoding and the number of transmission layers to be applied to the PUSCH according to the transmission precoding and the number of transmission layers applied when transmitting the SRS resource(s) indicated through the SRI field of the DCI and transmit the PUSCH.

The spatial domain transmission filter of the UE applied to the PUSCH transmitted by the UE may follow the value set in the SRS resource indicated through the SRI field of DCI or adopt a predetermined spatial domain transmission filter. When the base station schedules the UE to transmit the PUSCH using DCI format 0_0, the UE follows the activated spatial relation information of the PUCCH resource having the lowest index in the activated UL BWP of the serving cell. When the spatial relation information references the index of the SSB or CSI-RS resource, the UE may use the same spatial domain transmission filter as the spatial domain receive filter used when receiving the referenced CSI-RS or SSB.

Alternatively, when the spatial relation information references an SRS resource index, the UE may use the spatial domain transmission filter used when transmitting the referenced SRS resource. When the base station schedules the UE to transmit the PUSCH using DCI format 0_1, the UE follows spatial relation information or associated CSI-RS information configured by higher layer signaling in the SRS resource indicated through the SRI field of DCI. If spatial relation information is configured in the SRS resource, the UE may use the spatial domain transmission filter according to the above-described spatial relation information reference method. If spatial relation information is not configured in the SRS resource and CSI-RS or associated CSI-RS configuration information is included in the SRS resource set including the SRS resource, the UE may determine a spatial domain transmission filter by referencing the transmission precoding information calculated according to the associated CSI-RS information.

When the base station schedules the UE to transmit the PUSCH using DCI format 0_0 or DCI format 0_1, the UE may require a PUSCH preparation procedure time to apply the transmission precoding method, number of transmission layers, and spatial domain transmission filter to the transmission method (e.g., SRS resource) indicated through the DCI and transmit the PUSCH. Given this, the NR may define the PUSCH preparation procedure time. The PUSCH preparation procedure time of the UE may follow Equation (2) below.

$$T_{proc,2}=\max((N_2+d_{2,1})(2048+144)\cdot\kappa 2^{-\mu}\cdot T_c, d_{2,2}) \quad (2)$$

In Equation (2), each variable represents the following.

$N_2$: the number of symbols determined according to UE processing capability 1 or 2 and the numerology µ. When UE processing capability 1 is reported in the UE capability report, the number of symbols, $N_2$, may have a value as shown in Table 13 below.

TABLE 13

| µ | PUSCH preparation time $N_2$ [symbols] |
| --- | --- |
| 0 | 10 |
| 1 | 12 |
| 2 | 23 |
| 3 | 36 |

When UE processing capability 2 is reported, and is set through higher layer signaling to be able to use UE processing capability 2, the number of symbols, $N_2$, may have a value as shown in Table 14.

TABLE 14

| µ | PUSCH preparation time $N_2$ [symbols] |
| --- | --- |
| 0 | 5 |
| 1 | 5.5 |
| 2 | 11 for frequency range 1 |

$d_{2,1}$: The number of symbols set to 0, if the first symbol of the PUSCH is configured to consist only of a DM-RS, and 1, otherwise.

k: 64

µ: This follows a value for which $T_{proc,2}$ of $\mu_{DL}$ or $\mu_{UL}$ becomes larger. $\mu_{DL}$ indicates the numerology of the DL where the PDCCH including the DCI scheduling PUSCH is transmitted, and $\mu_{UL}$ indicates the numerology of the UL where the PUSCH is transmitted.

This has Tc: $1/(\Delta f_{max} \cdot N_f)$, $\Delta f_{max}=480 \cdot 10^3$ Hz, $N_f=4096$.

$d_{2,2}$: follows the BWP switching time, when the DCI scheduling PUSCH indicates BWP switching; otherwise, is 0.

Considering the time axis resource mapping information for the PUSCH scheduled through DCI and the effect of the timing advance (TA) between UL and DL, if the first symbol of the PUSCH starts before the first UL symbol for which the cyclic prefix (CP) starts $T_{proc,2}$ after the last symbol of the PDCCH including the DCI scheduling the PUSCH, the base station and the UE determine that the PUSCH preparation procedure time is not sufficient. Otherwise, the base station and the UE determine that the PUSCH preparation procedure time is sufficient. The UE may transmit the PUSCH only when the PUSCH preparation procedure time is sufficient, and may disregard DCI scheduling PUSCH when the PUSCH preparation procedure time is not sufficient.

In NR, the UE may transmit UL control information (UCI) to the base station through a PUCCH. The UCI may include at least one of the HARQ-ACK indicating whether demodulation/decoding is successful for the TB received by the UE, through the PDSCH, the scheduling request (SR) for the UE to request resource allocation from the PUSCH base station for UL data transmission, and CSI, which is information for reporting the channel state of the UE.

The PUCCH resource may be divided into a long PUCCH and a short PUCCH according to the length of the allocated symbol. In NR, a long PUCCH has a length of 4 symbols or more in the slot, and a short PUCCH has a length of 2 symbols or less in the slot.

The long PUCCH may be used to enhance UL cell coverage and thus may be transmitted in a DFT-S-OFDM scheme, which is single carrier transmission, rather than OFDM transmission. The long PUCCH supports transmission formats, such as PUCCH format 1, PUCCH format 3, and PUCCH format 4 depending on the number of supportable control information bits and whether UE multiplexing is supported through pre-discrete Fourier transform orthogonal cover code (pre-DFT OCC) support on the front end of an inverse fast Fourier transformation (IFFT), e.g., depending on the number of bits of control information and the number of allocated symbols.

PUCCH format 1 is a DFT-S-OFDM-based long PUCCH format capable of supporting up to 2 bits of control information and uses 1 RB of the frequency resource. The control information may include a combination or each of a HARQ-ACK and an SR. In PUCCH format 1, an OFDM symbol including a DMRS (or an RS), and an OFDM symbol including UCI are repeatedly configured.

For example, if the number of transmission symbols in PUCCH format 1 is 8 symbols and include a DMRS symbol, a UCI symbol, a DMRS symbol, a UCI symbol, a DMRS symbol, a UCI symbol, a DMRS symbol, and a UCI symbol, in order, from the start symbol of the eight symbols. The DMRS symbol is spread using orthogonal code (or orthogonal sequence or spreading code, w_i(m)), in the sequence corresponding to a length of 1 RB along the frequency axis in one OFDM symbol and, after being IFFTed, is transmitted.

The UCI symbol may be generated as follows. The UE may generate d(0) by performing binary phase-shift keying (BPSK) modulation on 1-bit control information and quadrature phase-shift keying (QPSK) modulation on 2-bit control information, scramble d(0) by multiplying the generated d(0) by a sequence corresponding to the length of 1 RB on the frequency axis, spread d(0) using an orthogonal code (or orthogonal sequence or spreading code, $w_{i(m)}$) in the scrambled sequence on the time axis, perform IFFT on d(0), and then transmit d(0).

The UE generates the sequence based on the configured ID and group hopping or sequence hopping configuration configured through the higher layer from the base station, cyclic-shifts the generated sequence with the initial cyclic shift value set through the higher layer, and generates the sequence corresponding to the length of one RB.

The spreading code $w_{i(m)}$ may be determined as $$w_i(m) = e^{\frac{j2\pi\phi(m)}{N_{SF}}}$$

the length ($N_{SF}$) of the spreading code is given.

Table 15 below shows an example of a spreading code for PUCCH format 1, $$w_i(m) = e^{\frac{j2\pi\phi(m)}{N_{SF}}}.$$

In Table 15 below, i is the index of the spreading code itself, and m is the index of elements of the spreading code. Here, the number in [ ] in Table 15 is $\phi(m)$. For example, when the length of the spreading code is 2 and the index i of the configured spreading code is 0, the spreading code $w_{i(m)}$ is $$w_i(0) = e^{\frac{j2\pi \cdot 0}{N_{SF}}} = 1,$$

$$w_i(1) = e^{\frac{j2\pi \cdot 0}{N_{SF}}} = 1$$

(so that $w_{i(m)}$=[1 1].

TABLE 15

| $N_{SF}$ | i = 0 | i = 1 | i = 2 | i = 3 | i = 4 | i = 5 | i = 6 |
|---|---|---|---|---|---|---|---|
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

PUCCH format 3 is a DFT-S-OFDM-based long PUCCH format that may support more than 2 bits of control information, and the number of RBs used may be set through the higher layer. The control information may include a combination or each of a HARQ-ACK, an SR, and CSI. In PUCCH format 3, the DMRS symbol position may be presented as shown in Table 16, depending on whether frequency hopping is performed within the slot and whether additional DMRS symbols are configured.

TABLE 16

| PUCCH format 3/4 Transmission length | DMRS position format 3/4 transmission | | | |
|---|---|---|---|---|
| | Additional DMRS not configured | | Additional DMRS configured | |
| | Frequency hopping not configured | Frequency hopping configured | Frequency hopping not configured | Frequency hopping configured |
| 4 | 1 | 0.2 | 1 | 0.2 |
| 5 | | 0, 3 | | 0, 3 |
| 6 | | 1, 6 | | 1, 6 |
| 9 | | 1, 6 | | 1, 6 |
| 10 | | 2, 7 | | 1, 3, 6, 8 |
| 11 | | 2, 7 | | 1, 3, 6, 9 |
| 12 | | 2, 8 | | 1, 4, 7, 10 |
| 13 | | 2, 9 | | 1, 4, 7, 11 |
| 14 | | 3, 10 | | 1, 5, 8, 12 |

For example, when the number of transmission symbols in PUCCH format 3 is 8 symbols, the DMRS is transmitted in the first symbol and the fifth symbol, starting the first start symbol of 0 in the 8 symbols. Table 15 may also be applied to the DMRS symbol position of PUCCH format 4 in the same manner.

PUCCH format 4 is a DFT-S-OFDM-based long PUCCH format capable of supporting more than 2 bits of control information and uses 1 RB of the frequency resource. The control information may include a combination or each of a HARQ-ACK, an SR, and CSI. The difference between PUCCH format 4 and PUCCH format 3 is that PUCCH format 4 may multiplex PUCCH format 4 of multiple UEs within one RB. It is possible to multiplex PUCCH format 4 of a plurality of UEs by applying pre-DFT OCC to control information on the front end of the IFFT. However, the number of symbols of transmittable control information for one UE is reduced according to the number of multiplexed UEs. The number of multiplexable UEs, i.e., the number of different available OCCs, may be 2 or 4, and the number of OCCs and an OCC index to be applied may be configured through the higher layer.

The short PUCCH may be transmitted in both a DL centric slot and a UL centric slot and, generally, is transmitted in a last symbol of the slot or in an OFDM symbol at the back (e.g., the last OFDM symbol or the second last OFDM symbol, or the last two OFDM symbols). It is also possible to transmit the short PUCCH in any position within the slot. The short PUCCH may be transmitted using one or two OFDM symbols. The short PUCCH may be used to shorten delay as compared to the long PUCCH when UL cell coverage is good and is transmitted in the CP-OFDM scheme.

The short PUCCH supports transmission formats, such as PUCCH format 0 and PUCCH format 2, according to the number of supportable control information bits.

PUCCH format 0 is a short PUCCH format capable of supporting up to 2 bits of control information and uses 1 RB of the frequency resource. The control information may include a combination or each of a HARQ-ACK and an SR. PUCCH format 0 transmits only a sequence mapped to 12 subcarriers on the frequency axis in one OFDM symbol, without transmitting a DMRS. The UE generates a sequence based on the configured ID and the group hopping or sequence hopping configuration configured through the higher layer from the base station, cyclic shifts the generated sequence with the final cyclic shift value obtained by adding a different cyclic shift value to the indicated initial cyclic shift value depending on the ACK or NACK, maps it to 12 subcarriers, and transmits it.

For example, when HARQ-ACK is 1 bit, the final cyclic shift (CS) is generated by adding 6 to the initial cyclic shift (CS) value for an ACK and adding 0 to the initial cyclic shift for a NACK, e.g., as shown in Table 17 below. The standard defines 0 as the cyclic shift value for a NACK and 6 as the cyclic shift value for an ACK. The UE generates PUCCH format 0 according to the value and transmits a one-bit HARQ-ACK.

TABLE 17

| One-bit HARQ-ACK | NACK | ACK |
|---|---|---|
| Final CS | (Initial CS + 0) mod 12 = Initial CS | (Initial CS + 6) mod 12 |

When the HARQ-ACK is 2 bits, 0 is added to the initial cyclic shift value if (NACK, NACK), 3 is added to the initial cyclic shift value if (NACK, ACK), 6 is added to the initial cyclic shift value if (ACK, ACK), and 9 is added to the initial cyclic shift value if (ACK, NACK) as shown in Table 18 below. The standard defines 0 as the cyclic shift value for (NACK, NACK), 3 as the cyclic shift value for (NACK, ACK), 6 as the cyclic shift value for (ACK, ACK), and 9 as the cyclic shift value for (ACK, NACK). The UE generates PUCCH format 0 according to the value and transmits the two-bit HARQ-ACK.

When the final cyclic shift (CS) value exceeds 12 by the cyclic shift (CS) value added to the initial cyclic shift value according to the ACK or NACK, the length of the sequence is 12. Thus, modulo 12 is applied to the final cyclic shift value.

TABLE 18

| two-bit HARQ-ACK | NACK, NACK | NACK, ACK | ACK, ACK | ACK, NACK |
|---|---|---|---|---|
| Final CS | (Initial CS + 0) mod 12 = Initial CS | Initial CS + 3) mod 12 | (Initial CS + 6) mod 12 | Initial CS + 9) mod 12 |

PUCCH format 2 is a short PUCCH format that supports more than 2 bits of control information, and the number of RBs used may be set through the higher layer. The control information may include a combination or each of a HARQ-ACK, an SR, and CSI. In PUCCH format 2, the position of the subcarrier where the DMRS is transmitted in one OFDM symbol is fixed to subcarriers having indexes of #1, #4, #7, and #10, when the index of the first subcarrier is #0. Control information is mapped to the remaining subcarriers, except for the subcarrier in which the DMRS is positioned, through a modulation process after channel coding.

For each of the above-described PUCCH formats, settable values and ranges thereof may be summarized as shown in Table 19 below. In Table 19, values that need not be set are indicated by N.A.

TABLE 19

|  |  | PUCCH Format 0 | PUCCH Format 1 | PUCCH Format 2 | PUCCH Format 3 | PUCCH Format 4 |
|---|---|---|---|---|---|---|
| Starting symbol | Configurability | ✓ | ✓ | ✓ | ✓ | ✓ |
|  | Value range | 0-13 | 0-10 | 0-13 | 0-10 | 0-10 |
| Number of symbols in a slot | Configurability | ✓ | ✓ | ✓ | ✓ | ✓ |
|  | Value range | 1, 2 | 4-14 | 1, 2 | 4-14 | 4-14 |
| Index for identifying starting PRB | Configurability | ✓ | ✓ | ✓ | ✓ | ✓ |
|  | Value range | 0-274 | 0-274 | 0-274 | 0-274 | 0-274 |
| Numbers of PRBs | Configurability | N.A. | N.A. | ✓ | ✓ | N.A. |
|  | Value range | N.A. | N.A. (Default is 1) | 1-16 | 1-16, 8-10 10, 12, 15, 16 | N.A. (Default is 1) |
| Enabling frequency hopping (intra-slot) | Configurability | ✓ | ✓ | ✓ | ✓ | ✓ |
|  | Value range | On/Off | On/Off (only for 2 symbol) | On/Off | On/Off (only for 2 symbol) | On/Off |
| Index of resource of $2^{nd}$ hop if intra-slot frequency hopping is enabled | Configurability | ✓ | ✓ | ✓ | ✓ | ✓ |
|  | Value range | 0-274 | 0-274 | 0-274 | 0-274 | 0-274 |
| Index of initial cyclic shift | Configurability | ✓ | ✓ | N.A. | N.A. | N.A. |
|  | Value range | 0-11 | 0-11 | N.A. | N.A. | N.A. |
| Index of time-domain OCC | Configurability | N.A. | ✓ | N.A. | N.A. | N.A. |
|  | Value range | N.A. | 0-6 | N.A. | N.A. | N.A. |
| Length of Pre-DFT OCC | Configurability | N.A. | N.A. | N.A. | N.A. | ✓ |
|  | Value range | N.A. | N.A. | N.A. | N.A. | 2, 4 |
| Index of Pre-DFT OCC | Configurability | N.A. | N.A. | N.A. | N.A. | ✓ |
|  | Value range | N.A. | N.A. | N.A. | N.A. | 0, 1, 2, 3 |

To enhance UL coverage, multi-slot repetition may be supported for PUCCH formats 1, 3, and 4 corresponding to the long PUCCH format, and PUCCH repetition may be configured for each PUCCH format.

The UE may repeatedly transmit the PUCCH including the UCI as many times as the number of slots configured through information about the number of slots, nrofSlots, which is higher layer signaling. For repeated PUCCH transmission, PUCCH transmission of each slot is performed using the same number of contiguous symbols, and the number of corresponding contiguous symbols may be set through the number-of-symbols information (nrofSymbols) in the higher layer signaling, i.e., PUCCH-format1 or PUCCH-format3 or PUCCH-format4. For repeated PUCCH transmission, PUCCH transmission of each slot may be performed using the same start symbol, and the corresponding start symbol may be configured through the starting symbol index information (startingSymbolIndex) for PUCCH-format1 or PUCCH-format3 or PUCCH-format4 in PUCCH configuration information (PUCCH-Config), which is higher layer signaling.

For repeated PUCCH transmission, if the UE is configured to perform frequency hopping in a PUCCH transmission in different slots, the UE may perform frequency hopping in units of slots. If the UE is configured to perform frequency hopping in a PUCCH transmission in different slots, the UE may start the PUCCH transmission from a first PRB index configured through startingPRB, which is higher layer signaling, in even-numbered slots and starts PUCCH transmission from the second PRB index configured through secondHopPRB, which is higher layer signaling, in odd-numbered slots.

Additionally, if the UE is configured to perform frequency hopping in a PUCCH transmission in different slots through the higher layer, the index of the slot in which the first PUCCH transmission is indicated to the UE is 0 and, for the set total number of repeated PUCCH transmissions, the number of repeated PUCCH transmissions is increased, regardless of whether PUCCH transmission is performed in each slot. If the UE is configured to perform frequency hopping in a PUCCH transmission in different slots, the UE does not expect that frequency hopping is configured in a slot during PUCCH transmission. If the UE is not configured to perform frequency hopping in a PUCCH transmission in different slots, but is configured to perform frequency hopping in a slot, the first and second PRB indexes are equally applied in the slot.

The base station may configure PUCCH resources for each BWP through a higher layer for a specific UE. An example of the corresponding configuration is shown in Table 20 below.

TABLE 20

```
PUCCH-Config ::=                              SEQUENCE {
    resourceSetToAddModList                   SEQUENCE (SIZE
(1 ... maxNrofPUCCH-ResourceSets)) OF PUCCH-ResourceSet
OPTIONAL, -- Need N
    resourceSetToReleaseList                  SEQUENCE (SIZE
(1 ... maxNrofPUCCH-ResourceSets)) OF PUCCH-ResourceSetId
OPTIONAL, -- Need N
    resourceToAddModList                      SEQUENCE (SIZE
(1 ... maxNrofPUCCH-Resources)) OF PUCCH-Resource
OPTIONAL, -- Need N
    resourceToReleaseList                     SEQUENCE (SIZE
(1 ... maxNrofPUCCH-Resources)) OF PUCCH-ResourceId
OPTIONAL -- Need N
    format1                                   SetupRelease
{ PUCCH-FormatConfig }
OPTIONAL, -- Need M
    format2                                   SetupRelease
{ PUCCH-FormatConfig }
OPTIONAL, -- Need M
    format3                                   SetupRelease
{ PUCCH--FormatConfig }
OPTIONAL, -- Need M
    format4                                   SetupRelease
{ PUCCH-FormatConfig }
OPTIONAL, -- Need M
    schedulingRequestResourceToAddModList  SEQUENCE (SIZE
(1 ... maxNrofSR-Resources)) OF SchedulingRequestResourceConfig
OPTIONAL, -- Need N
    schedulingRequestResourceToReleaseList  SEQUENCE (SIZE
(1 ... maxNrofSR-Resources)) OF SchedulingRequestResourceId
OPTIONAL, -- Need N
    multi-CSI-PUCCH-ResourceList              SEQUENCE (SIZE
(1 ... 2)) OF PUCCH-ResourceId
OPTIONAL, -- Need M
    dl-DataToUL-ACK                           SEQUENCE (SIZE
(1 ... 8)) OF INTEGER (0 ... 15)
OPTIONAL, -- Need M
    spatialRelationInfoToAddModList           SEQUENCE (SIZE
(1 ... maxNrofSpatialRelationInfos)) OF PUCCH-SpatialRelationInfo
OPTIONAL, -- Need N
    spatialRelationInfoToReleaseList          SEQUENCE (SIZE
(1 ... maxNrofSpatialRelationInfos)) OF PUCCH-SpatialRelationInfoId
OPTIONAL, -- Need N
    pucch-PowerControl                        PUCCH-PowerControl
OPTIONAL, -- Need M
    ...
}
```

According to Table 20, one or more PUCCH resource sets may be configured in the PUCCH resource configuration for a specific BWP, and a maximum payload value for UCI transmission may be configured in some of the PUCCH resource sets. One or more PUCCH resources may belong to each PUCCH resource set, and each PUCCH resource may belong to one of the above-described PUCCH formats.

With respect to the PUCCH resource set, the maximum payload value of the first PUCCH resource set may be fixed to 2 bits, so that the corresponding value may not be separately set through the higher layer. If the remaining PUCCH resource sets are configured, the index of the corresponding PUCCH resource set may be set in an ascending order according to the maximum payload value, and the maximum payload value may not be set in a last PUCCH resource set. An example of configuration information provided through the higher layer for the PUCCH resource set is shown in Table 21.

TABLE 21

```
-- A set with one or more PUCCH resources
PUCCH-ResourceSet ::=                         SEQUENCE {
    pucch-ResourceSetId                       PUCCH-
ResourceSetId,
    resourceList                              SEQUENCE (SIZE
(1 ... maxNrofPUCCH-ResourcesPerSet)) OF PUCCH-ResourceSetId,
    maxPayloadMinus1                          INTEGER
                                              (4 ... 256)
OPTIONAL   -- Need R
}
```

The resourceList parameter of Table 21 may include IDs of PUCCH resources belonging to the PUCCH resource set.

Upon an initial connection or when the PUCCH resource set is not configured, the PUCCH resource set as shown in Table 22 below, which includes a plurality of cell-specific PUCCH resources in the initial BWP, may be used. The PUCCH resource to be used for initial access in this PUCCH resource set may be indicated through SIB1.

TABLE 22

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The maximum payload of each PUCCH resource included in the PUCCH resource set may be 2 bits for PUCCH format 0 or 1, and for the remaining formats, it may be determined by the symbol length, the number of PRBs, and the maximum code rate. The above-described symbol length and number of PRBs may be set for each PUCCH resource, and the maximum code rate may be set for each PUCCH format.

For an SR transmission, the PUCCH resource for the SR corresponding to the schedulingRequestID may be configured through the higher layer as shown in Table 23 below. The PUCCH resource may be a resource belonging to PUCCH format 0 or PUCCH format 1.

TABLE 23

```
SchedulingRequestResourceConfig ::=   SEQUENCE {
    schedulingRequestResourceId
SchedulingRequestResourceId,
    schedulingRequestID               SchedulingRequestId,
    periodicityAndOffset              CHOICE {
        sym2                          NULL,
        sym6or7                       NULL,
        sl1                           NULL, -- Recurs in every slot
        sl2                           INTEGER (0 ... 1),
        sl4                           INTEGER (0 ... 3),
        sl5                           INTEGER (0 ... 4),
        sl8                           INTEGER (0 ... 7),
        sl10                          INTEGER (0 ... 9),
        sl16                          INTEGER (0 ... 15),
```

TABLE 23-continued

```
        sl20              INTEGER (0 . . . 19),
        sl40              INTEGER (0 . . . 39),
        sl80              INTEGER (0 . . . 79),
        sl160             INTEGER (0 . . . 159),
        sl320             INTEGER (0 . . . 319),
        sl640             INTEGER (0 . . . 639)
    }
OPTIONAL,     -- Need M
    resource                    PUCCH-ResourceId
OPTIONAL      --Need M
}
```

In the configured PUCCH resource, the transmission period and offset are set through the periodicityAndOffset parameter of Table 23. If there is UL data to be transmitted by the UE at the time corresponding to the set period and offset, the corresponding PUCCH resource is transmitted; otherwise, the corresponding PUCCH resource may not be transmitted.

For CSI transmission, a PUCCH resource for transmitting a periodic or semi-persistent CSI report through a PUCCH may be configured in the pucch-CSI-ResourceList parameter as shown in Table 24 below, through higher layer signaling. The parameter includes a list of PUCCH resources for each BWP for the cell or CC to transmit the corresponding CSI report. The PUCCH resource may be a resource belonging to PUCCH format 2, PUCCH format 3, or PUCCH format 4.

TABLE 24

```
CSI-ReportConfig ::=           SEQUENCE {
    reportConfigId             CSI-ReportConfigId,
    carrier                    ServCellIndex
OPTIONAL,     -- Need S
    ...
    reportConfigType           CHOICE {
        periodic               SEQUENCE {
            reportSlotConfig   CSI-
ReportPeriodicityAndOffset,
            pucch-CSI-ResourceList    SEQUENCE
(SIZE (1 . . . maxNrofBWPs)) OF PUCCH-CSI-Resource
        },
        semiPersistentOnPUCCH  SEQUENCE {
            reportSlotConfig   CSI-
ReportPeriodicityAndOffset,
            pucch-CSI-ResourceList    SEQUENCE
```

TABLE 24-continued

```
(SIZE (1 . . . maxNrotBWPs)) OF PUCCH-CSI-Resource
        },
    ...
}
```

For the PUCCH resource, the transmission period and offset are set through reportSlotConfig of Table 24.

For a HARQ-ACK transmission, the resource set of the PUCCH resource to be transmitted is first selected according to the payload of the UCI including the corresponding HARQ-ACK. That is, a PUCCH resource set having a minimum payload, which is not smaller than the UCI payload, is selected. The PUCCH resource in the PUCCH resource set may be selected through the PUCCH resource indicator (PRI) in the DCI scheduling the TB corresponding to the HARQ-ACK, and the PRI may be the PUCCH resource indicator specified in the above-mentioned DCI format 1_0 or 1_1. An example of the relationship between the PRI configured by higher signaling and the PUCCH resource selected from the PUCCH resource set is as shown in Table 25 below.

TABLE 25

| PUCCH resource indicator | PUCCH resource |
|---|---|
| '000' | $1^{st}$ PUCCH resource provided by pucch-ResourceId obtained from the $1^{st}$ value of resourceList |
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from $7^{th}$ value of resourceList |
| '111' | $8^{th}$ PUCCH resource provided by pucch-ResourceId obtained from the $8^{th}$ value of resourceList |

If the number of PUCCH resources in the selected PUCCH resource set is larger than 8, the PUCCH resource may be selected using Equation (3).

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil \\ \quad \text{if } \Delta_{PRI} < R_{PUCCH} \bmod 8 \\ \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil + R_{PUCCH} \bmod 8 \\ \quad \text{if } \Delta_{PRI} < R_{PUCCH} \bmod 8 \end{cases} \quad (3)$$

In Equation (3), $r_{PUCCH}$ denotes the index of the selected PUCCH resource in the PUCCH resource set, $R_{PUCCH}$ denotes the number of PUCCH resources belonging to the PUCCH resource set, $\Delta_{PRI}$ denotes the PRI value, $N_{CCE,p}$ denotes the total number of CCEs in CORESET p to which the received DCI belongs, and $n_{CCE,p}$ denotes the first CCE index for the received DCI.

The time when the corresponding PUCCH resource is transmitted is $K_1$ slots after the TB transmission corresponding to the HARQ-ACK. A candidate of the $K_1$ value may be configured through the higher layer, and more specifically, is configured in the dl-DataToUL-ACK parameter in PUCCH-Config as shown in Table 20 above. The $K_1$ value of one of the candidates may be selected by a PDSCH-to-HARQ feedback timing indicator in DCI for scheduling the TB, and this value may be a value specified in the above-described DCI format 1_0 or 1_1. The unit of the $K_1$ value may be a slot unit or a subslot unit. Here, a subslot is a unit having a length smaller than that of a slot, and one or more symbols may constitute one subslot. The subslot may also be referred to as a mini-slot.

The UE may transmit UCI through one or two PUCCH resources in one slot or subslot, and when UCI is transmitted through two PUCCH resources in one slot/subslot, i) each PUCCH resource does not overlap in symbol units, and ii) at least one PUCCH resource may be a short PUCCH. The UE may not expect to transmit a plurality of PUCCH resources for HARQ-ACK transmission within one slot.

When two or more PUCCH resources overlap, one of the overlapping PUCCH resources may be selected or a new PUCCH resource may be selected according to the above-described condition, i.e., the condition where the transmitted PUCCH resource should not overlap in symbol units. Further, the UCI payload transmitted through the overlapping PUCCH resource is wholly multiplexed and transmitted, or part thereof may be dropped. Below, a case where multi-slot repetition is not configured in the PUCCH resource (case 1) and a case where multi-slot repetition is configured (case 2) are described.

With respect to case 1, the case where the PUCCH resource overlaps is divided into case 1-1) where two or more PUCCH resources for HARQ-ACK transmission overlap, and case 1-2) which is the other cases.

Figure 6:
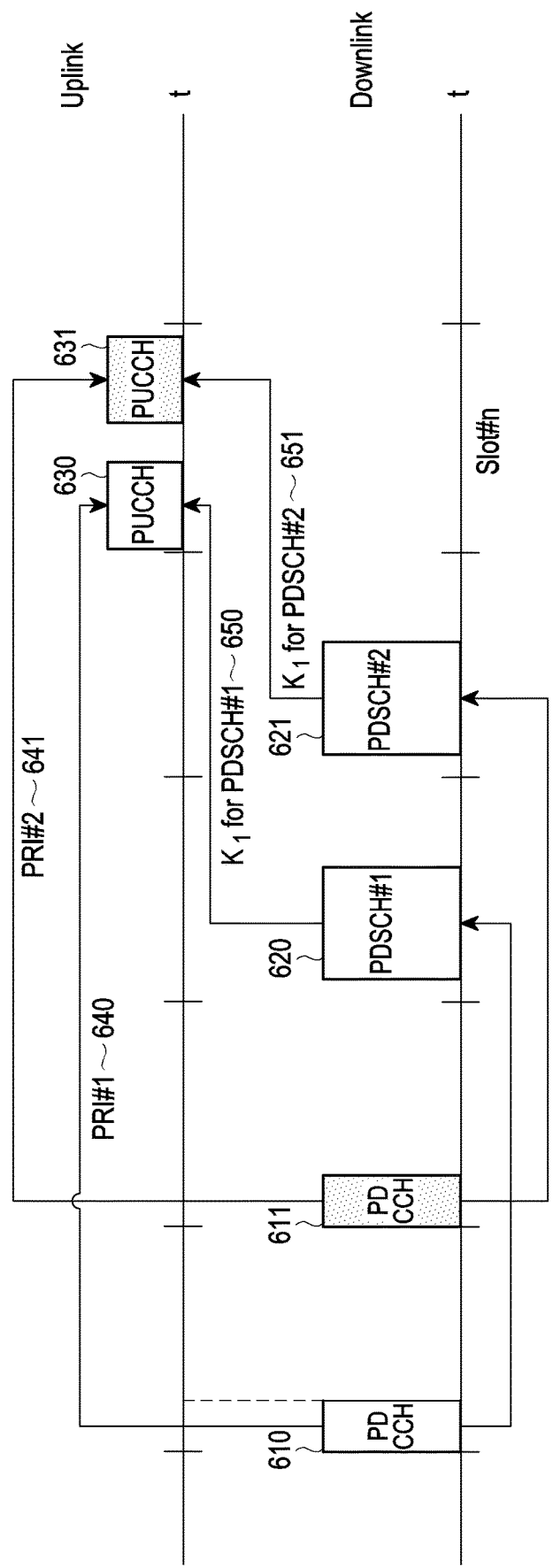
FIG. 6 illustrates multiple overlapping physical UL control channel (PUCCH) resources for a hybrid automatic repeat request-acknowledgement (HARQ-ACK) transmission for a physical downlink shared channel (PDSCH) when multi-slot repetition is not configured, according to an embodiment.

Case 1-1) is illustrated in FIG. 6.

FIG. 6 illustrates multiple overlapping PUCCH resources for a HARQ-ACK transmission for a PDSCH when a multi-slot repetition is not configured, according to an embodiment.

Referring to FIG. 6, for two or more different PDCCHs 610 and 611 for scheduling a PDSCH, if the transmission slots of the PUCCH resources corresponding to each PDCCH are the same, the corresponding PUCCH resources may be seen as overlapping each other. That is, when the UL slots corresponding to the $K_1$ values 650 and 651 indicated by multiple PDCCHs are the same, the PUCCH resources corresponding to the corresponding PDCCHs are considered to overlap each other.

Among the PUCCH resources indicated by the PRIs 640 and 641 in the PDCCHs, only the PUCCH resource 631 selected based on the PRI 641 corresponding to the PDCCH 611 transmitted at the latest time may be selected so that HARQ-ACK information may be transmitted on the PUCCH resource. Thus, HARQ-ACK information for the PDSCH 621 through the selected PUCCH resource 631 and HARQ-ACK information for another PUCCH 630 overlapping the PUCCH resource 631 both are encoded by a predefined HARQ-ACK codebook and then transmitted.

Next, a case where the PUCCH resource for HARQ-ACK transmission and/or the PUCCH resource for an SR and/or CSI transmission overlap or a case where multiple PUCCH resources for an SR and/or CSI transmission overlap, which correspond to case 1-2), are described. In the above-described case, a situation in which multiple PUCCH resources transmitted in the same slot overlap by one symbol or more on the time axis may be defined as the 'corresponding PUCCH resources overlap', and whether to multiplex the UCIs in the resources may be summarized as shown in Table 26 below.

TABLE 26

| PUCCH 1 PUCCH 2 | SR | HARQ-AOK | CSI |
|---|---|---|---|
| SR | — | Case 1-2-1 (Multiplex or not depending on PUCCH format) | Always multiplex |
| HARQ-ACK | | Always multiplex (HARQ-ACK codebook) | Case 1-2-2 (Multiplex or not by higher layer) |
| CSI | Always multiplex | Case 1-2-2 | Case 1-2-2 |

According to Table 26, in the case where the PUCCH resource where HARQ-ACK is transmitted overlap or the case where PUCCHs where an SR and CSI overlap, the UCIs are always multiplexed.

In the case where the PUCCH resources where the SR and the HARQ-ACK are transmitted overlap, i.e., in case 1-2-1 above, whether to multiplex the UCIs may be divided according to the format of the PUCCH resource, as follows.

SR on PUCCH format 0+HARQ-ACK on PUCCH format 1: The SR is dropped and only the HARQ-ACK is transmitted For the rest: Both the SR and the HARQ-ACK are multiplexed Further, in the remaining cases corresponding to case 1-2-2, i.e., when the PUCCH resources where an HARQ-ACK and a CSI are transmitted overlap or when multiple PUCCH resources where CSI is transmitted overlap, whether to multiplex the UCIs may follow the higher layer configuration. Further, configuring whether to multiplex the HARQ-ACK and the CSI and configuring whether to multiplex multiple CSI may be independently performed.

For example, whether the HARQ-ACK and the CSI are multiplexed may be configured through the simultaneous HARQ-ACK-CSI parameter for each of PUCCH formats 2, 3, and 4, and the corresponding parameters may be set to the same value for the PUCCH formats. If it is configured through the parameter not to perform multiplexing, only the HARQ-ACK is transmitted, and the overlapping CSI may be dropped. Further, whether multiple CSIs are multiplexed may be configured through the multi-CSI-PUCCH-ResourceList parameter in PUCCH-ConFIG. When the multi-CSI-PUCCH-ResourceList parameter is configured, multiplexing may be performed between CSIs; otherwise, only PUCCH corresponding to the CSI higher in priority according to the priority between the CSIs may be transmitted.

When UCI multiplexing is performed as described above, the selection method and multiplexing method for the PUCCH resource to transmit the corresponding UCI resource may vary depending on identification information for the overlapping UCI and the format of the PUCCH resource, which may be summarized as shown in Table 27 below.

TABLE 27

| PUCCH 1 / PUCCH 2 | SR (format 0/1) | HARQ-ACK Format 1 | HARQ-ACK Format 0/2/3/4 | CSI (format 2/3/4) |
|---|---|---|---|---|
| SR (format 0/1) | — | Option 1 | Option 2 | Option 3 |
| HARQ-AK Format 1 | Option 1 | Option 4 | Option 4 | Option 5 (grant-based) Option 6 (SPS) |
| Format 0/2/3/4 | Option 2 | Option 4 | Option 4 | Option 5 (grant-based) Option 6 (SPS) |
| CSI (format 2/3/4) | Option 3 | Option 5 (grant-based) Option 6 (SPS) | Option 5 (grant-based) Option 6 (SPS) | Option 7 |

In Table 27:

Option 1: The UE varies the PUCCH resource selection according to the SR value of the SR PUCCH resource overlapped with the HARQ-ACK PUCCH resource. If the SR value is positive, the PUCCH resource for SR is selected, and if the SR value is negative, the PUCCH resource for HARQ-ACK is selected. HARQ-ACK information is transmitted in the selected PUCCH resource.

Option 2: The UE multiplexes the HARQ-ACK information and the SR information to the PUCCH resource for HARQ-ACK transmission and transmits it.

Option 3: The UE multiplexes the SR information and CSI to the PUCCH resource for CSI transmission and transmits it.

Option 4: PUCCH resource transmission for HARQ-ACK overlapping-detailed operation is described in case 1-1) above.

Option 5: When the PUCCH resource for HARQ-ACK corresponding to the PDSCH and the PUCCH resource for CSI transmission overlap, and multiplexing between the HARQ-ACK and CSI is configured by the higher layer, the UE multiplexes the HARQ-ACK information and the CSI information to the PUCCH resource for the HARQ-ACK and transmits it.

Option 6: When the PUCCH resource for HARQ-ACK corresponding to semi-persistent scheduling (SPS) PDSCH and the PUCCH resource for CSI transmission overlap, and multiplexing between the HARQ-ACK and CSI is configured by the higher layer, the UE multiplexes HARQ-ACK information and CSI information to the PUCCH resource for CSI transmission and transmits it.

When a PUCCH resource list for multiplexing, i.e., multi-CSI-PUCCH-ResourceList, is configured through the higher layer, the UE selects one resource having the lowest index capable of all the multiplexed UCI payloads among the resources in the list and then transmits the UCI payload. If there is no resource capable of transmitting all of the multiplexed UCI payloads in the list, the UE selects a resource with the largest index and then transmits HARQ-ACK and as many CSI reports as are transmittable in the corresponding resource.

Option 7: When multiple PUCCH resources for CSI transmission overlap, and multiplexing between multiple CSI is configured through the higher layer, the UE selects a resource having the lowest index capable of all of the multiplexed UCI payloads in the PUCCH resource list for CSI multiplexing configured through the higher layer, i.e., multi-CSI-PUCCH-ResourceList, and then transmits the UCI payload. If there is no resource capable of transmitting all of the multiplexed UCI payloads in the list, the UE selects a resource with the largest index and then transmits as many CSI reports as are transmittable in the corresponding resource.

The above description focuses primarily on the case where two PUCCH resources overlap for ease of description. However, the above-described method may also be applied where three or more PUCCH resources overlap, in a similar manner. For example, when the SR+HARQ-ACK multiplexed PUCCH resource and the CSI PUCCH resource overlap, the HARQ-ACK and CSI multiplexing method may be applied.

If configured not to perform multiplexing between specific UCIs, according to the priority of HARQ-ACK>SR>CSI, the higher-priority UCI is transmitted, and the lower-priority UCI may be dropped. When configured not to perform multiplexing when multiple CSI PUCCH resources overlap, the PUCCH corresponding to the CSI having higher priority is transmitted, and the PUCCH corresponding to the other CSI may be dropped.

Case 2, i.e., the case where multi-slot repetition is configured, is divided into case 2-1) where two or more PUCCH resources for a HARQ-ACK transmission are positioned in the same start slot, and case 2-2 which is the other cases. Each case is illustrated in FIG. 7.

Figure 7:
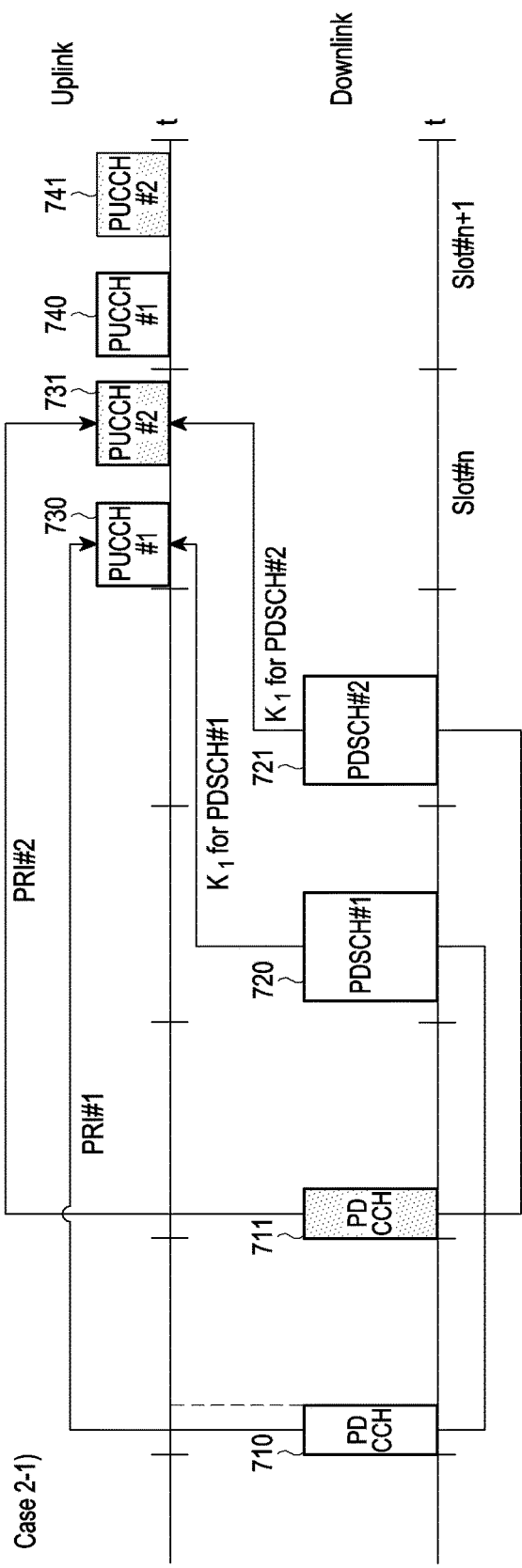
FIG. 7 illustrates overlapping PUCCH resources when multi-slot repetition is configured, according to an embodiment.
Figure 7:
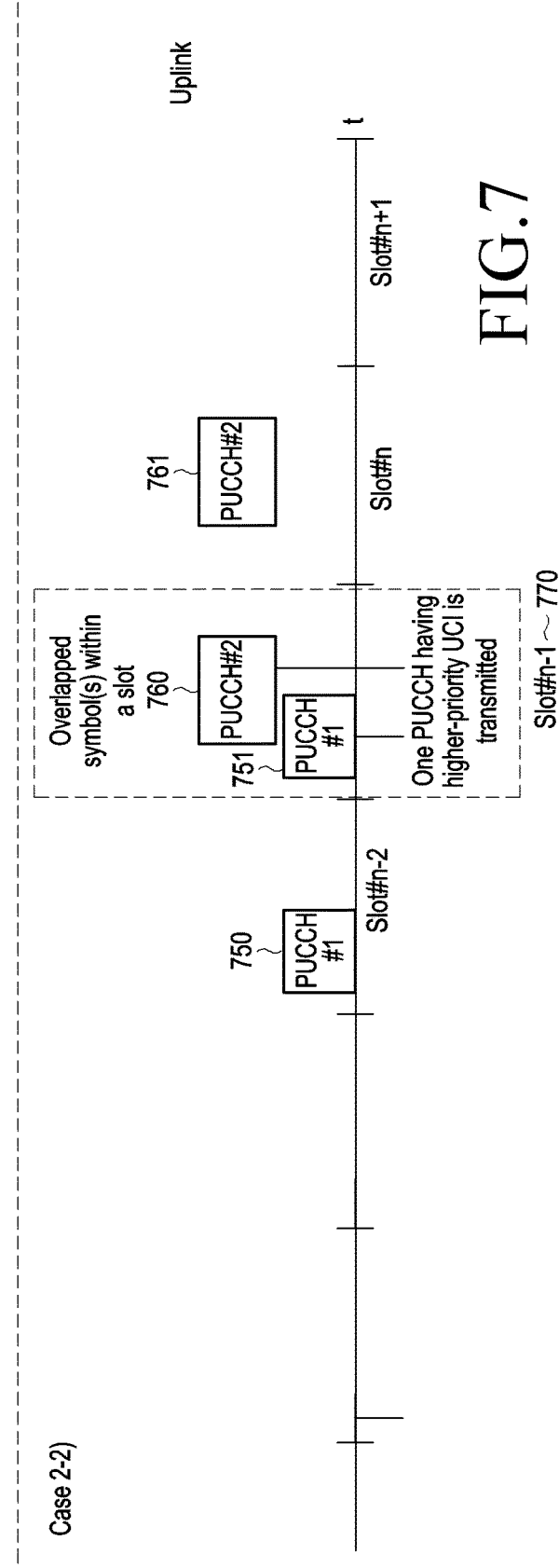

FIG. 7 illustrating PUCCH resources overlapping when a multi-slot repetition is configured according to an embodiment.

Referring to FIG. 7, in case 2-1), when multi-slot repetition is configured in the PUCCH resource for HARQ-ACK, i.e., when PUCCH #1 is repeatedly transmitted over multiple slots (730, 740) and PUCCH #2 is also repeatedly transmitted over multiple slots (731, 741), if the start slots of the two PUCCHs indicated by $K_1$ are the same, a single PUCCH resource (PUCCH transmitted at the latest time in one slot), i.e., PUCCH #2, may be selected as in case 1-1). Accordingly, HARQ-ACK information corresponding to PDSCH #1 and PDSCH #2 is multiplexed through the HARQ-ACK codebook and transmitted in the corresponding PUCCH.

Although an example in which multiple PUCCHs multi-slot repeated overlap has been described, the same method may be applied even where the PUCCH multi-slot repeated and the PUCCH transmitted in a single slot overlap.

Case 2-2) corresponds to when the PUCCH for HARQ-ACK transmission and the PUCCH for CSI transmission overlap in symbol units or when PUCCHs for multiple SRs or CSI transmission overlap in symbol units. That is, when PUCCH #1 is repeatedly transmitted over multiple slots (750, 751) and PUCCH #2 is also repeatedly transmitted over multiple slots (760, 761), this corresponds to the case where PUCCH #1 and PUCCH #2 overlap in one or more symbols in one slot 770.

Between the PUCCHs overlapping in one or more symbols in the slot 770, UCIs in the PUCCHs are compared for priority, and the higher-priority UCI is transmitted, and the other UCI is dropped in the slot. In this case, the inter-UCI priority follows HARQ-ACK>SR>CSI in order from the highest priority.

When a plurality of CSI PUCCH resources overlap, the PUCCH corresponding to the CSI having a higher priority is transmitted, and the PUCCH corresponding to the other CSI may be dropped in the corresponding slot. The above-described PUCCH or drop depending on priority is performed only in the slot where a symbol unit overlap occurs and is not performed in the other slots. That is, the PUCCH configured with multi-slot repetition may be dropped in the slot where a symbol unit overlap occurs but, in other slots, may be transmitted as configured.

Although an example in which multiple PUCCHs multi-slot repeated overlap has been described, the same method may be applied even where the PUCCH multi-slot repeated and the PUCCH transmitted in a single slot overlap.

If, during repeated transmission of $N_{PUCCH}^{repeat}>1$, the UE transmits a PUCCH in the first slot and transmits a PUSCH in the second slot, and the PUCCH transmission overlaps the PUSCH transmission in one or more slots, or when the UCIs in the PUSCHs in the overlapping slots are multiplexed, the PUCCH is transmitted, and the PUSCH is not transmitted in the slots where the PUCCH and PUSCH overlap.

In the single slot transmission and multi-slot repetition of the PUCCH, the above-described slot may be replaced with a mini-slot and used for a low-delay service, such as URLLC. The mini-slot (i.e., a subslot) has a shorter length on the time axis than the slot, and one mini-slot may consist of fewer than 14 symbols. For example, 2 or 7 symbols may constitute one mini-slot. When a mini-slot is configured through the higher layer, the unit, such as HARQ-ACK feedback timing K1 value or repeated transmission value, may be changed from slot to mini-slot. The mini-slot configuration may be applied to all PUCCH transmissions or may be limited to PUCCH transmission for a specific service. For example, while transmission in units of slots may be applied to PUCCH for eMBB service, transmission in units of mini-slots may be applied to PUCCH for URLLC service.

If the UE does not have a UE-specific configuration (dedicated PUCCH resource configuration) for the PUCCH resource configuration, the PUCCH resource set is provided through higher layer signaling, pucch-ResourceCommon, in which case a beam configuration for the PUCCH transmission follows the beam configuration used in PUSCH transmission scheduled through a random access response (RAR) UL grant. If the UE has a UE-specific configuration (dedicated PUCCH resource configuration) for PUCCH resource configuration, a beam configuration for PUCCH transmission is provided through pucch-spatialRelationInfoId, which is higher layer signaling as shown in Table 28 below. If the UE is configured with one pucch-spatialRelationInfoId, a beam configuration for PUCCH transmission of the UE is provided through one pucch-spatialRelationInfoId. If the UE is configured with a plurality of pucch-spatialRelationInfoIDs, the UE is instructed to activate one of the plurality of pucch-spatialRelationInfoIDs through the MAC CE. The UE may be configured with up to 8 pucch-spatialRelationInfoIDs through higher layer signaling and may be instructed to activate only one pucch-spatialRelationInfoID among them.

When the UE is instructed to activate any pucch-spatialRelationInfoID through the MAC CE, the UE applies pucch-spatialRelationInfoID activation through the MAC CE from the slot first appearing $3N_{slot}^{subframe,\mu}$ slots after the slot of HARQ-ACK transmission for the PDSCH transmitting the MAC CE including activation information for the pucch-spatialRelationInfoId. $\mu$ is the numerology applied to PUCCH transmission, and $N_{slot}^{subframe,\mu}$ denotes the number of slots per subframe in a given numerology. An example of higher layer configuration information for pucch-spatialRelationInfo is shown in Table 28. Herein, pucch-spatialRelationInfo may be interchangeably used with PUCCH beam information.

TABLE 28

| | |
|---|---|
| PUCCH-SpatialRelationInfo ::= | SEQUENCE { |
| pucch-SpatialRelationInfoId | PUCCH-SpatialRelationInfoId, |
| servingCellId | ServCellIndex |
| OPTIONAL, -- Need S | |
| referenceSignal | CHOICE { |
| ssb-Index | SSB-Index, |
| csi-RS-Index | NZP-CSI-RS-ResourceId, |
| srs | SEQUENCE { |
| | resource |
| SRS-ResourceId, | |
| uplinkBWP | BWP-Id |
| | } |
| }, | |
| pucch-PathlossReferenceRS-Id | PUCCH-PathlossReferenceRS-Id, |
| p0-PUCCH-Id | P0-PUCCH-Id, |
| closedLoopIndex | ENUMERATED { i0, i1 } |
| } | |
| PUCCH-SpatialRelationInfoId ::= | INTEGER |
| (1 ... maxNrofSpatialRelationInfos) | |

As shown in Table 28, one referenceSignal configuration may exist in a specific pucch-spatialRelationInfo configuration. The referenceSignal may be an ssb-Index indicating a specific SS/PBCH, or a csi-RS-Index indicating a specific CSI-RS, or an SRS indicating a specific SRS. If the referenceSignal is configured with the ssb-Index, the UE may set the beam used for receiving the SS/PBCH corresponding to the ssb-Index among the SSs/PBCHs in the same serving cell as a beam for the PUCCH transmission and, if the servingCellId is provided, set the beam used for receiving the SS/PBCH corresponding to the ssb-Index among the SSs/PBCHs in the cell indicated by the servingCellId, as a beam for the PUCCH transmission. If the referenceSignal is configured with the csi-RS-Index, the UE may set the beam used for receiving the CSI-RS corresponding to the csi-RS-Index among the CSI-RSs in the same serving cell as a beam for the PUCCH transmission and, if the servingCellId is provided, set the beam used for receiving the CSI-RS corresponding to the csi-RS-Index among the CSI-RSs in the cell indicated by the servingCellId, as a beam for the PUCCH transmission. If the referenceSignal is configured with the srs, the UE may set the transmission beam used for transmitting the SRS corresponding to the resource index provided in the higher layer signaling resource in the activated UL BWP and/or the same serving cell, as a beam for the PUCCH transmission or, if the servingCellID and/or uplinkBWP is provided, set the transmission beam used for transmitting the SRS corresponding to the resource index provided through the higher layer signaling resource in the UL BWP and/or the cell indicated by the uplinkBWP and/or the servingCellID, as a beam for the PUCCH transmission.

One pucch-PathlossReferenceRS-Id configuration may exist within a specific pucch-spatialRelationInfo configuration. PUCCH-PathlossReferenceRS of Table 29 below may be mapped with pucch-PathlossReferenceRS-Id of Table 28. Up to 4 may be configured through pathlossReferenceRSs in the higher layer signaling PUCCH-PowerControl of Table 29. PUCCH-PathlossReferenceRS is configured with ssb-Index if connected with SS/PBCH through referenceSignal of Table 29 and is configured with csi-RS-Index if connected with CSI-RS.

TABLE 29

```
PUCCH-PowerControl ::=                  SEQUENCE {
    deltaF-PUCCH-f0                     INTEGER (-16 . . . 15)
OPTIONAL, -- Need R
    deltaF-PUCCH-f1                     INTEGER (-16 . . . 15)
OPTIONAL, -- Need R
    deltaF-PUCCH-f2                     INTEGER (-16 . . . 15)
OPTIONAL, -- Need R
    deltaF-PUCCH-f3                     INTEGER (-16 . . . 15)
OPTIONAL, -- Need R
    deltaF-PUCCH-f4                     INTEGER (-16 . . . 15)
OPTIONAL, -- Need R
    p0-Set                              SEQUENCE (SIZE
(1 . . . maxNrofPUCCH-P0-PerSet)) OF P0-PUCCH
OPTIONAL, -- Need M
    pathlossReferenceRSs                SEQUENCE (SIZE
(1 . . . maxNrofPUCCH-PathlossReferenceR Ss)) OF PUCCH-
PathlossReferenceRS
OPTIONAL, -- Need M
    twoPUCCH-PC-AdjustmentStates        ENUMERATED
{twoStates}
OPTIONAL, -- Need S
    ...
}
P0-PUCCH ::=                            SEQUENCE {
    p0-PUCCH-Id                         P0-PUCCH-Id,
    P0-PUCCH-Value                      INTEGER
                                        (-16 . . . 15)
}
P0-PUCCH-Id ::=                         INTEGER (1 . . . 8)
PUCCH-PathlossReferenceRS ::=           SEQUENCE {
    pucch-PathlossReferenceRS-Id        PUCCH-
PathlossReferenceRS-Id,
    referenceSignal                     CHOICE {
        ssb-Index                       SSB-
                                        Index,
        csi-RS-Index                    NZP-CSI-
RS-ResourceId
    }
}
```

The UE determines the transmission power of the PUCCH according to the higher layer parameter configuration, the activated PUCCH-SpatialRelationInfo, the PUCCH UCI payload size, the allocated PUCCH transmission resource, and/or the TPC command indicated by the DCI. If the UE transmits the PUCCH to the primary cell c in the activated UL BWP b with the carrier f, the transmission power $P_{PUCCH,b,f,c}(i,q_u,q_d,l)$ of the PUCCH transmission occasion i may be defined as shown in Equation (4).

$$P_{PUCCH,b,f,c}(i, q_u, q_d, l) = \min \begin{cases} P_{CMAX,f,c}(i) \\ P_{O\_PUCCH b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{cases} \quad (4)$$

In Equation (4), $P_{CMAX,f,c}(i)$ denotes the maximum output power of the PUCCH transmission occasion i for the primary cell c, which is the carrier f.

$P_{O\_PUCCH b,f,c}(q_u)$ is defined as the sum of $P_{O\_NOMINAL\_PUCCH}$ indicated by the higher layer parameter p0-nominal (or set to 0 dBm if p0-nominal is not set) and $P_{O\_UE\_PUCCH}(q_u)$ indicated by p0-PUCCH-Value in the higher layer parameter p0-Set (or set to 0 if p0-Set is not set). If one PUCCH-SpatialRelationInfo is configured or one value of a plurality of PUCCH-SpatialRelationInfo is activated, the UE selects the p0-PUCCH-Value of P0-PUCCH set with p0-PUCCH-Id in PUCCH-SpatialRelationInfo. If more than one PUCCH-SpatialRelationInfo is configured and a PUCCH including HARQ-ACK information for the PDSCH providing an activation command of PUCCH-SpatialRelationInfo is transmitted in k slot, the UE applies the activation command from the first slot after k+3 slots. If the UE is not configured with PUCCH-SpatialRelationInfo, the UE selects the p0-PUCCH-Value of the P0-PUCCH having the minimum p0-PUCCH-Id in the p0-Set.

$M_{RB,b,f,c}^{PUCCH}(i)$ is the bandwidth of PUCCH resource assignment expressed as the number of RBs for PUCCH transmission occasion i.

$PL_{b,f,c}(q_d)$ denotes the DL pathloss estimate calculated by the UE for the RS resource index $q_d$. If the UE is not configured with pathlossReferenceRSs or is not configured with the dedicated higher layer parameter, the UE calculates $PL_{b,f,c}(q_d)$ with the SS/PBCH block used to receive the MIB. If the UE is configured with the RS resource index $q_d$, the index $q_d$ calculates $PL_{b,f,c}(q_d)$ with the RS resource. The RS resource set may be set as pathlossReferenceRSs, and the RS resource set may include an SS/PBCH block index that may be indicated by ssb-Index or a CSI-RS resource index that may be indicated by csi-RS-Index. If the UE is configured with the higher layer parameters pathlossReferenceRSs and PUCCH-SpatialRelationInfo, the UE may determine $PL_{b,f,c}(q_d)$ according to the referenceSignal of PUCCH-PathlossReferenceRS corresponding to pucch-PathlossReferenceRS-Id configured in PUCCH-SpatialRelationInfo. If more than one PUCCH-SpatialRelationInfo is configured and a PUCCH including HARQ-ACK information for the PDSCH providing an activation command of PUCCH-SpatialRelationInfo is transmitted in k slot, the UE applies the activation command from the first slot after k+3 slots. If PUCCH-SpatialRelationInfo includes servingCellId, the UE receives the RS for the resource index $q_d$ of the activated DL BWP of the corresponding supporting cell. If the UE is configured with pathlossReferenceRSs but is not configured with PUCCH-SpatialRelationInfo, the UE may determine $PL_{b,f,c}(q_d)$ according to the referenceSignal of the PUCCH-PathlossReferenceRS for which the index of the pucch-PathlossReferenceRS-Id is 0 among the RS resources for the supporting cell indicated by the higher layer parameter pathlossReferenceLinking (if configured) or the primary cell. In the case where the UE is configured with the higher layer parameters as follows:

if pathlossReferenceRSs is not configured,
    if PUCCH-SpatialRelationInfo is not configured,
    if the higher layer parameter enableDefualtBeamPL-For-PUCCH-r16 is configured, and
    if for none of the CORESETs, CORESETPoolIndex is set to 1, or if for all CORESETs, CORESETPoolIndex set to 1, and no codepoint in DCI format is mapped to two TCI states.

The UE determines the RS resource index $q_d$ for QCL assumption of the CORESET having the lowest index in the activated DL BWP in the primary cell or for periodic RS resources including 'QCL-TypeD' as a TCI state. If PUCCH transmission is performed through multiple slots, the PUCCH is transmitted by applying the same $q_d$ for each slot.

$\Delta_{F\_PUCCH}(F)$ is defined as the higher layer parameter deltaF-PUCCH-f0 (or f1, f2, f3, or f4) value for PUCCH format 0 (or format 1, format 2, format 3, or format 4), and if the corresponding higher layer parameter is not configured, $\Delta_{F\_PUCCH}(F)$ is set to 0.

$\Delta_{TF,b,f,c}(i)$ is defined as a PUCCH transmission power adjustment component and is determined according to a PUCCH format, a UCI payload, and resources allocated to PUCCH transmission.

$g_{b,f,c}(i,l)$ is the PUCCH power control adjustment state and is determined according to the TPC command value $g_{PUCCH\ b,f,c}(i, l)$ and the accumulation method.

$g_{PUCCH\ b,f,c}(i, l)$ may be the TPC command value indicated along with the TPC command for other UEs in DCI format 2_2 including the CRC scrambled with the TPC-PUCCH-RNTI or the TPC command value included in DCI format 1_0 or 1_1 detected by the UE for PUCCH transmission occasion i.

- If twoPUCCH-PC-AdjustmentStates and PUCCH-SpatialRelationInfo are configured to the UE, it is set to 1∈{0,1}
- If twoPUCCH-PC-AdjustmentStates or PUCCH-SpatialRelationInfo is not configured to the UE, 1=0.
- If the UE has received the TPC command value in DCI format 1_0 or 1_1 and PUCCH-SpatialRelationInfo is configured, the UE may obtain mapping between sets of the value for closedLoopIndex including 1 value and the set of PUCCH-SpatialRelationInfold with the index set by the p0-PUCCH-Id. If the UE receives an activation command indicating the PUCCH-SpatialRelationInfold value, the UE determines the closedLoopIndex that sets the 1 value connected with the corresponding p0-PUCCH-Id index.
- If the UE receives a TPC command from DCI format 2_2 transmitted through CRC scrambled with TPC-PUCCH-RNTI, a value of 1 is set as a closed loop indicator area in DCI format 2_2.

$$g_{b,f,c}(i, l) = g_{b,f,c}(i - i_0, l) + \sum_{m=0}^{C(C_i)-1} \delta_{PUCCHb,f,c}(m, l)$$

denotes the current PUCCH power control adjustment state for the PUCCH transmission occasion i.

Here, the $\delta_{PUCCHb,f,c}$ value may be one of the values shown in Table 30 below.

TABLE 30

| TPC Command Field | Accumulated $\delta_{PUCCHb,f,c}$ [dB] |
|---|---|
| 0 | −1 |
| 1 | 0 |
| 2 | 1 |
| 3 | 3 |

$$\sum_{m=0}^{C(C_i)-1} \delta_{PUCCHb,f,c}(m, l)$$

is the sum of the TPC command values in the TPC command set $C_i$ having the cardinality of C(C) received by the UE from the $K_{PUCCH}(i-i_0)-1$ symbol before PUCCH transmission occasion $i-i_0$ and the $K_{PUCCH}(i)$ symbol before the PUCCH transmission occasion i. Among the positive $i_0$ values for which the $K_{PUCCH}(i-i_0)-1$ symbol before the PUCCH transmission occasion $i-i_0$ may be earlier than the $K_{PUCCH}(i)$ symbol before the PUCCH transmission occasion I, the smallest value is set to $i_0$.

- If the UE detects DCI format 1_0 or 1_1 and transmits PUCCH, $K_{PUCCH}(i)$ is the number of symbols between the symbol after the last symbol of the corresponding PDCCH and the symbol before the first PUCCH transmission symbol.
- If the UE transmits PUCCH without detecting DCI format 1_0 or 1_1, $K_{PUCCH}(i)$ is the same $K_{PUCCH,min}$ as the product of k2 in the higher layer parameter PUSCH-ConfigCommon and the number $N_{symb}^{slot}$ of symbols per slot.
- If the maximum power is reached on PUCCH transmission occasion $i-i_0$ and $$\sum_{m=0}^{C(C_i)-1} \delta_{PUCCHb,f,c}(m, l) \geq 0,$$

$$g_{b,f,c}(i, l) = g_{b,f,c}(i - i_0, l)$$

- If the minimum power is reached on PUCCH transmission occasion $i-i_0$ and $$\sum_{m=0}^{C(C_i)-1} \delta_{PUCCHb,f,c}(m, l) \leq 0,$$

$$g_{b,f,c}(i, l) = g_{b,f,c}(i - i_0, l)$$

- If the $P_{O\_PUCCHb,f,c}(q_u)$ value configuration is provided by a higher layer parameter for the corresponding PUCCH power control adjustment state 1, $q_{b,f,c}(k,l)=0$, k=0, 1, . . . , i.
- If the UE is configured with PUCCH-SpatialRelationInfo, based on the p0-PUCCH-Id value $q_u$ and the pucch-SpatialRelationId value associated with the closedLoopIndex value 1, the UE determines I from the $q_u$ value. Otherwise, l=0.
  In other cases, $g_{b,f,c}(0,l)=\Delta P_{rampup,b,f,c}+\delta_{b,f,c}$. At this time, l=0. $\delta_{b,f,c}$ may be a TPC command indicated by an RAR grant corresponding to PRACH in the Type-1 random access procedure or a TPC command indicated by an RAR grant corresponding to MsgA transmission in the Type-2 random access procedure. Alternatively, $\delta_{b,f,c}$ may be a TPC command indicated by successRAR corresponding to MsgA in the Type-2 random access procedure. However, if it is the first PUCCH transmission after 28 symbols from the last symbol of the first PDCCH, $\delta_{b,f,c}$ may be the TPC command included in the DCI format transmitted with the CRC scrambled with the C-RNTI or MCS-C-RNTI detected in the first PDCCH received in recoverySearchSpaceId.
- If the UE transmits PUCCH, and $\Delta P_{rampuprequested,b,f,c}$ is the total power ramp-up requested by the higher layer, $\Delta P_{rampup\ b,f,c}$ is determined according to PUCCH formats 0 and 1 or other formats, as shown in Equation (5).

$$\Delta P_{rampupb,f,c} = \min\left[\max\left(\begin{array}{c} 0, \\ P_{CMAX,f,c} - (P_{O\_PUCCH,b,f,c} + PL_{b,f,c}(q_d) + \\ \Delta_{F\_PUCCH}(F) + \Delta_{TF,b,f,c} + \delta_{b,f,c}) \end{array}\right) \\ \Delta P_{rampuprequested,b,f,c} \right]; \quad (5)$$

or $$\Delta P_{rampupb,f,c} = \min\left[\max\left(\begin{array}{c} 0, \\ P_{CMAX,f,c} - (P_{O\_PUCCH,b,f,c} + PL_{b,f,c}(q_d)) \end{array}\right) \\ \Delta P_{rampuprequested,b,f,c} \right].$$

During UL transmission of the UE, upon transition from the transmit OFF state to the transmit ON state, a transition time (i.e., a transient time) may be required to meet the transmission power requirement for the ON state. Upon transition from the transmit ON state to the transmit OFF state, a transition time may be required to meet the transmit power requirement for the OFF state. Alternatively, a transition time may be required even when transmission power or transmission RB is changed in the transmit ON state or when frequency hopping occurs.

Figure 8:
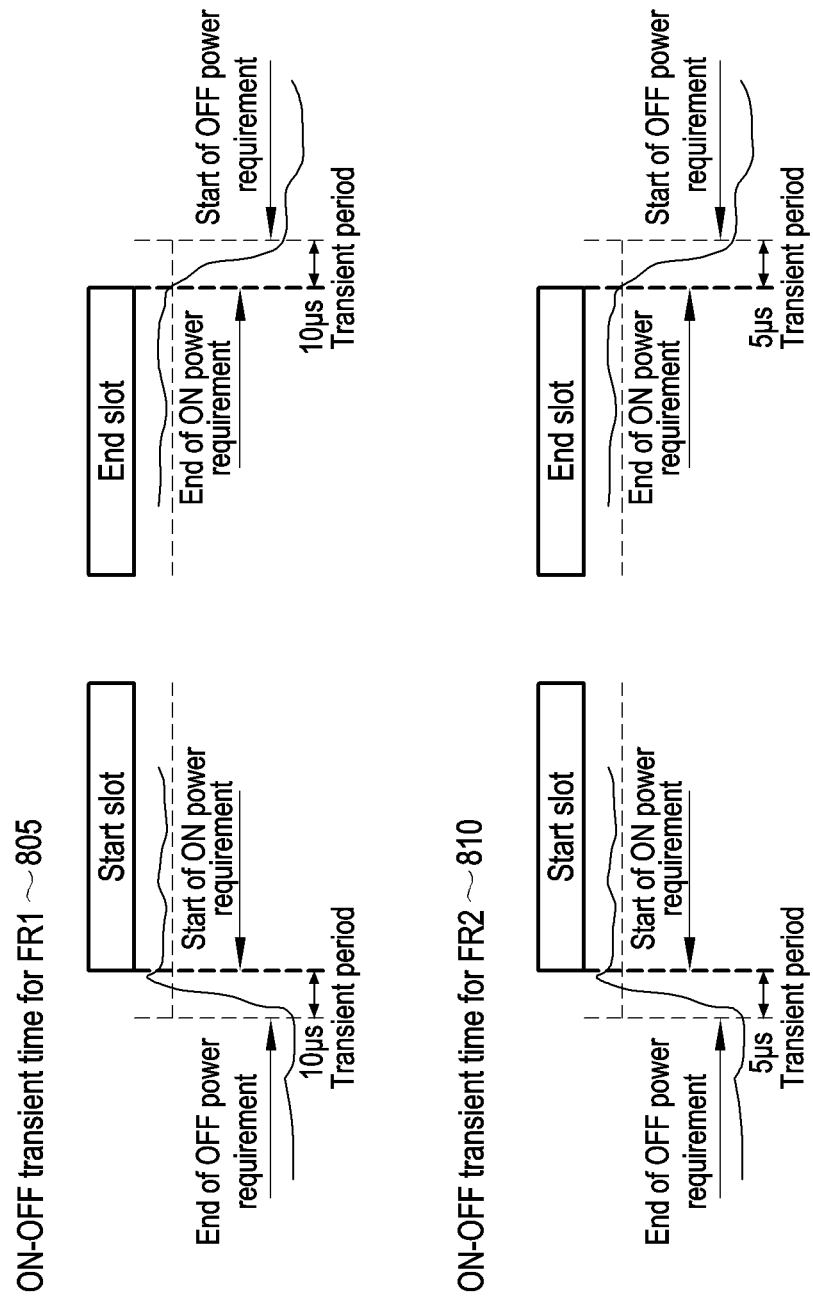
FIG. 8 illustrates a switch time for switching between a transmit OFF state and a transmit ON state when a UE transmits a UL according to an embodiment.

FIG. 8 illustrates a transition period (for transition between a transmit OFF state and a transmit ON state according to an embodiment.

Referring to FIG. 8, the transition time may be defined for each of FR1 and FR2 (805 and 810). In the NR system, the FR is split into FR1 and FR2. For example, FR1 may be 450 MHz-7125 MHz, and FR2 may be 24250 MHz-52600 MHz. However, the ranges of FR1 and FR2 may be changed and applied. For example, FR1 may be changed from 450 MHz up to 6000 MHz.

FIGS. 9A to 9E illustrate a transition time for a transmit power change, a transmission RB change, or frequency hopping in FR1 in a transmit ON state according to an embodiment.

Figure 9A:
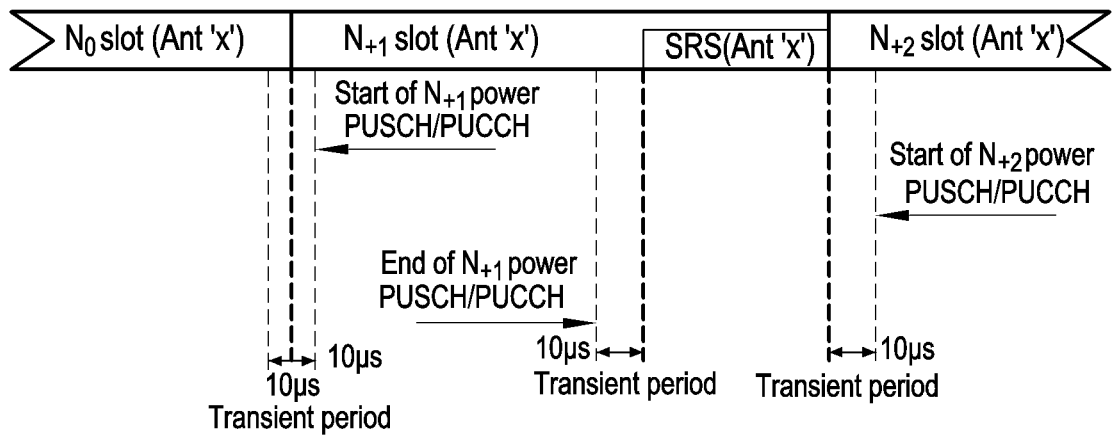
FIGS. 9A to 9E illustrate a switch time for a transmit power change, a transmit resource block (RB) change, or hopping in a first frequency range (FR) (FR1) according to an embodiment.
Figure 9B:
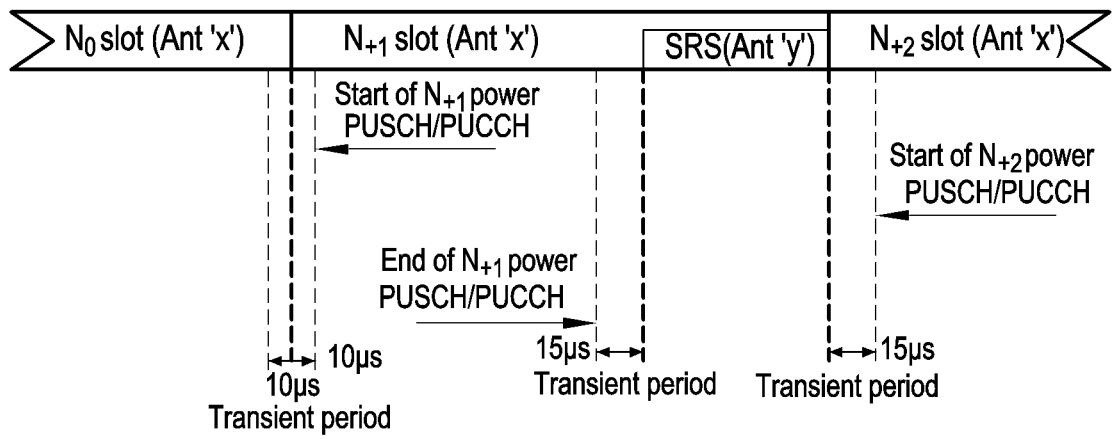

Referring to FIGS. 9A and 9B, when a transmission channel change is accompanied by a transmit power change, a transmission RB change, or frequency hopping, transition times may be defined as in 905 and 910. The transition time between SRS channel and another channel may be defined to differ depending on whether SRS sounding is performed through the same antenna port as the other channel (905) or through another antenna port (910).

Figure 9C:
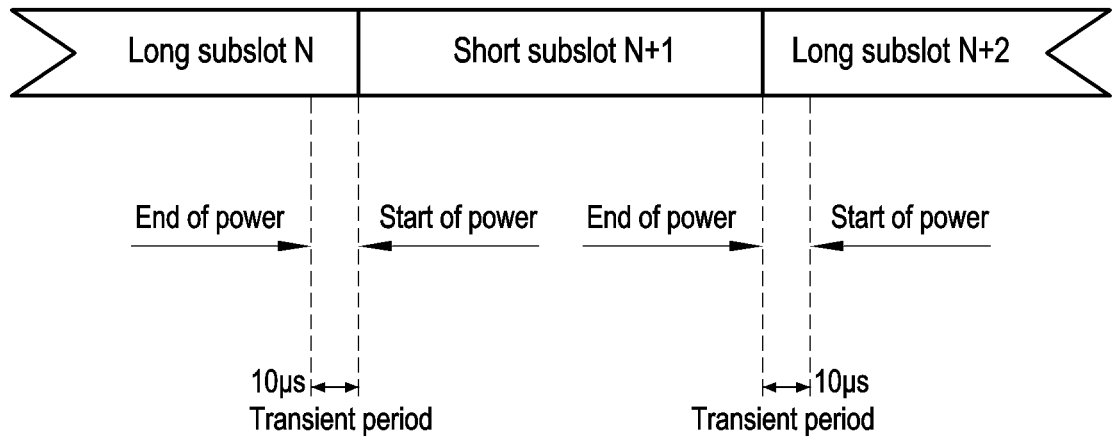
Figure 9D:
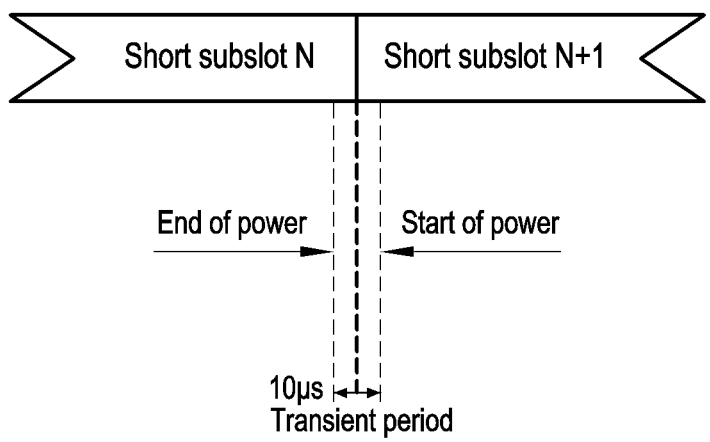
Figure 9E:
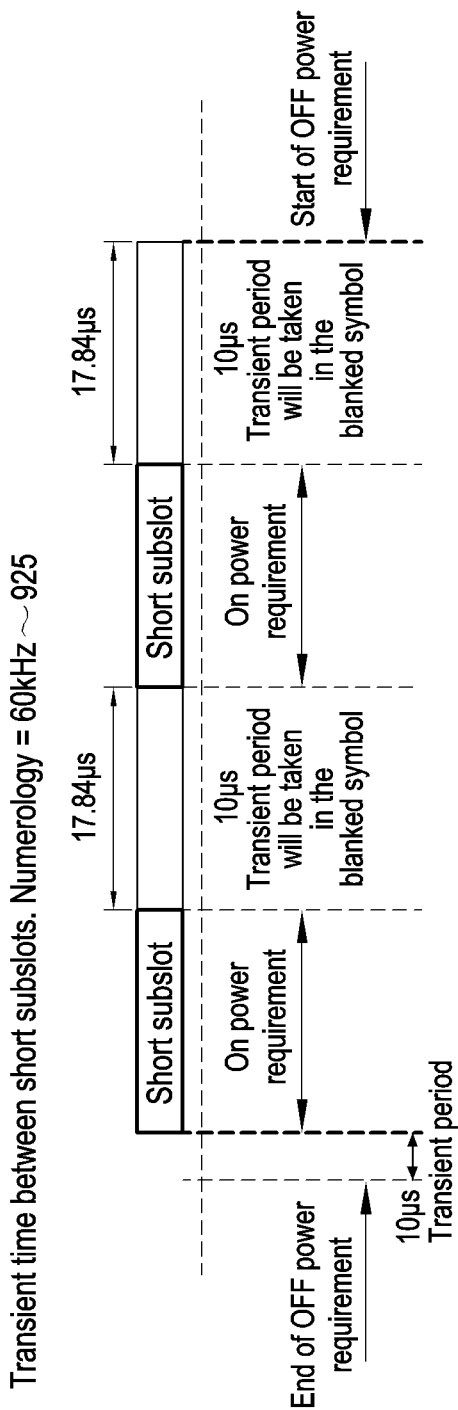

Referring to FIGS. 9C to 9E, when accompanied by a transmit power change, a transmission RB change, or frequency hopping, a different switching time may be defined depending on the length of the transmission channel before and after the change/hopping (915, 920, and 925).

When accompanied by a transmit power change, a transmission RB change, or frequency hopping between a long subslot transmission and a short subslot transmission, the transition time may be defined in the long subslot (915). When accompanied by a transmit power change, a transmission RB change, or frequency hopping between short subslots, the transition time may be defined between the short subslots (920 and 925), and when numerology is less than 60 kHz in FR1, a blank symbol need not be configured between the short subslots (920). However, when the numerology is 60 kHz in FR1, a blank symbol should be configured between the short subslots (925).

The long subslot may indicate a PUSCH transmission or a long PUCCH transmission in which the number of transmission symbols is greater than 2, and the short subslot may indicate a PUSCH transmission or a short PUCCH transmission in which the number of transmission symbols is 2 or less.

FIGS. 10A to 10D illustrate a transition time for a transmit power change, a transmission RB change, or frequency hopping in FR2 in a transmit ON state, according to an embodiment.

Figure 10A:
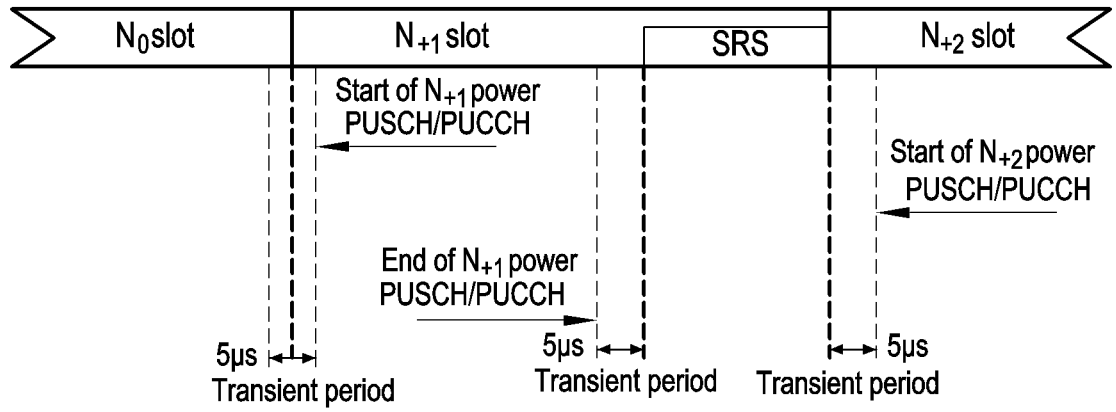
FIGS. 10A to 10D illustrate a switch time for a transmit power change, a transmit RB change, or hopping in a second FR (FR2) according to an embodiment.
Figure 10B:
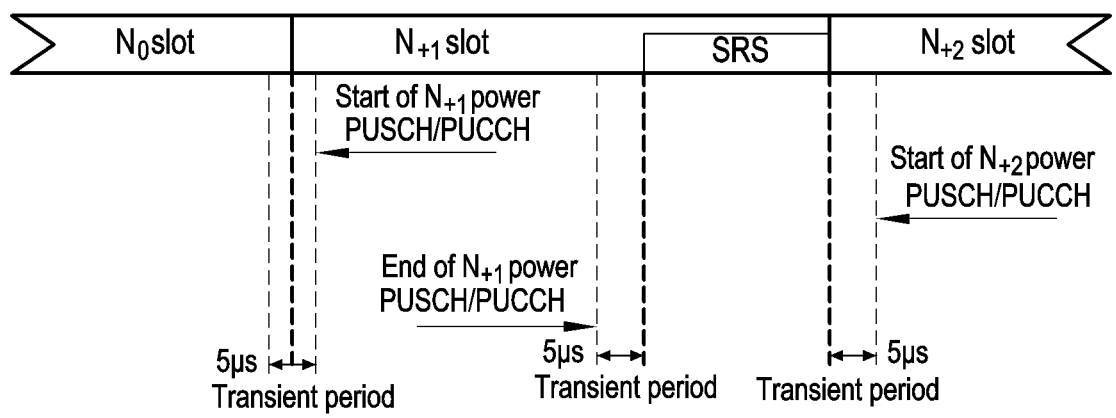

Referring to FIGS. 10A and 10B, when a transmission channel change is accompanied by a transmit power change, a transmission RB change, or frequency hopping, a transition time may be defined as in 1005.

Figure 10C:
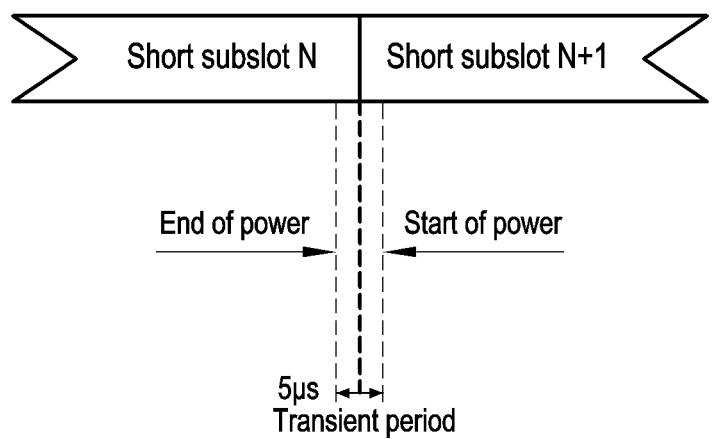
Figure 10D:
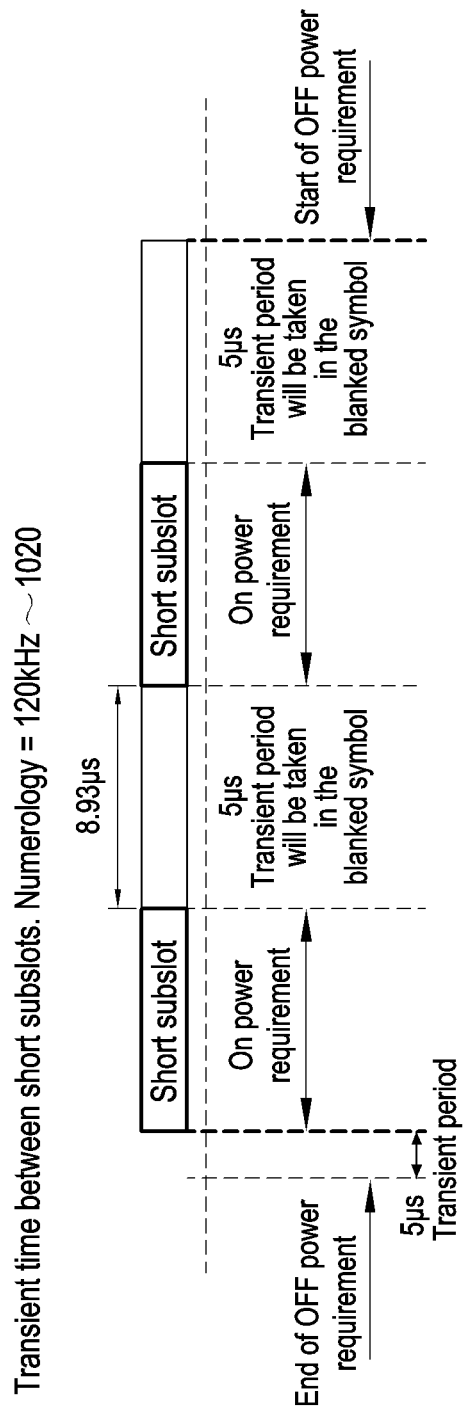

Referring to FIGS. 10B to 10D, when accompanied by a transmit power change, a transmission RB change, or frequency hopping, a different switching time may be defined depending on the length of the transmission channel before and after the change/hopping (1010, 1015, and 1020).

When accompanied by a transmit power change, a transmission RB change, or frequency hopping between a long subslot transmission and a short subslot transmission, the transition time may be defined in the long subslot (1010).

When accompanied by a transmit power change, a transmission RB change, or hopping between short subslots, the transition time may be defined between the short subslots (1015 and 1020), and when numerology is less than 120 kHz in FR2, a blank symbol need not be configured between the short subslots (1015). However, when the numerology is 120 kHz in FR2, a blank symbol should be configured between the short subslots (1020).

The long subslot may indicate a PUSCH transmission or a long PUCCH transmission in which the number of transmission symbols is greater than 2, and the short subslot may indicate PUSCH transmission or short PUCCH transmission in which the number of transmission symbols is 2 or less.

Unlike a conventional system, a 5G wireless communication system may support a service requiring a high transmission rate, a service having very short transmission latency, and a service requiring a high connection density. In a wireless communication network including a plurality of cells, TRPs, or beams, coordinated transmission between cells, TRPs, and/or beams may increase the strength of the signal received by the UE or efficiently perform interference control between cells, TRPs, and/or beams to thereby meet various service requirements. Joint transmission (JT) is one of the representative transmission technologies for the cooperative communication and may increase the strength or throughput of a signal received by the UE by transmitting signals to one UE through multiple cells, TRPs, and/or beams.

Referring to the PUCCH-related descriptions made above, Rel-15 NR of the current 3GPP standard focuses on a PDSCH transmission through a single cell/transmission point/panel/beam (hereinafter, TRP) or a PDSCH transmission in a coherent scheme per multiple TRPs. As an optimized HARQ-ACK transmission scheme, only one PUCCH resource, to the maximum, for the HARQ-ACK, as the optimized HARQ-ACK transmission scheme is transmitted in one slot. 3GPP NR release 16 may support per-TRP non-coherent transmission, i.e., non-coherent JT (NC-JT) and, in this case, each TRP participating in NC-JT may simultaneously transmit a separate PDSCH to the UE. The HARQ-ACK information for the PDSCH may be contained in one PUCCH resource and transmitted. Given a case where overhead due to inter-TRP information exchange is a burden, e.g., when the backhaul delay time is long for each TRP, the HARQ-ACK information may be contained in a separate PUCCH resource for each TRP and transmitted.

Further, 3GPP NR release 17 may support NC-JT for PDCCH, PUCCH, and PUSCH, which are physical channels other than PDSCH. For a PUCCH, coverage may be increased using multiple TRPs. When blockage occurs between the UE and the base station, the reception power of the PUCCH transmitted through a single TRP may be greatly reduced. However, repeated transmission of the PUCCH through a plurality of TRPs may form a link between a plurality of UEs and the base station and thus, may be more robust than transmitting the PUCCH through a single TRP in the blockage. Further, since a PUCCH is repeatedly transmitted through a plurality of TRPs, a gain due to macro diversity occurs. In NR release 15 or 16, since a method for repeatedly transmitting a PUCCH through multiple TRPs was not supported, one transmission power for PUCCH was determined. However, when the plurality of TRPs are in different positions, the distance between the TRP and the UE and the channel state may be different. If the distance between the TRP and the UE is different, the pathloss is different accordingly, and the PUCCH transmission power may be calculated for each TRP and supported.

In accordance with an embodiment of the disclosure, a method is provided for repeatedly transmitting a PUCCH based on NC-JT with the transmission power determined for each TRP so that the UE may support efficient PUCCH transmission.

Further, when the UE changes the beam and/or transmit power to repeatedly transmit PUCCH through multiple TRPs, an offset for the change may be required according to the UE capability. In accordance with an embodiment of the disclosure, a method is provided for repeatedly transmitting a PUCCH through multiple TRPs considering an offset determined by the base station according to UE capability and indicated to the UE, and a method for transmitting UL signals through multiple TRPs considering the offset, even for other UL signals (e.g., a PUSCH or an SRS).

The disclosure is applicable to FDD and/or TDD systems.

As used herein, the term "higher layer signaling" may refer to a method for transmitting signals from the base station to the UE using a DL data channel of the physical layer or from the UE to the base station using a UL data channel of the physical layer and may be interchangeably used with RRC signaling, PDCP signaling, or MAC CE. The information transferred to the UE through MAC CE or L1 signaling including DCI may be briefly referred to as control information.

The higher layer signaling may correspond to at least one or a combination of one or more of the following signaling.
  MIB
  SIB or SIB X(X=1, 2, ... )
  RRC
  MAC CE Further, L1 signaling may correspond to at least one or a combination of one or more of the following physical layer channels or signaling methods using signaling.
  PDCCH
  DCI
  UE-specific DCI
  Group common DCI
  Common DCI
  Scheduling DCI (e.g., DCI used for scheduling DL or UL data)
  Non-scheduling DCI (e.g., DCI not for the purpose of scheduling DL or UL data)
  PUCCH
  UCI The UE may determine whether to apply cooperative communication according to the following conditions:
  PDCCH(s) that allocates a PDSCH to which cooperative communication is applied has a specific format;
  PDCCH(s) that allocates the PDSCH to which cooperative communication is applied includes a specific indicator indicating whether to apply cooperative communication;
  PDCCH(s) that allocates a PDSCH to which cooperative communication is applied is scrambled with a specific RNTI; or
  To apply cooperative communication, a specific interval is assumed with the higher layer.

Hereinafter, for ease of description, "an NC-JT case" refers to when the UE receives cooperative communication-applied PDSCH or PDCCH based on conditions similar to the above-described conditions, along with the above-described conditions, and transmits a cooperative communication PUCCH or PDSCH based on similar conditions.

Hereinafter, 'determine priority between A and B' may be referred to in other various manners, e.g., as selecting one with higher priority according to a predetermined priority rule and performing an operation according thereto or omitting or dropping the operation for the one with lower priority.

Hereinafter, the above-described examples are described in connection with various embodiments. One or more of the embodiments may be applied simultaneously or in combination, rather than independently.

First Embodiment: Offset Configuration and UL Signal Transmission Method Considering UE Capability To transmit a UL signal, the UE may change at least one of the UL beam, transmit power, and frequency before signal transmission.

The UE may change the panel before signal, to transmit a UL signal. Thus, the UE may change at least one of the UL beam, transmit power, frequency, and panel, before signal transmission, to transmit the UL signal. When multiple beams are divided into multiple beam groups, a panel corresponding to each beam group may be configured, such as panel #1 to beam group #1, panel #2 to beam group #2, . . . . As another example, when a plurality of antenna modules for beam formation are included in the UE, and the plurality of antenna modules are installed in different positions, a panel corresponding to each antenna module may be configured. A plurality of panels may be configured in other various manners capable of dividing multiple beams having different beam widths or beam directions.

A change for UL signal transmission may be performed in the following cases:
  Case 1) When repeatedly changing a UL signal (e.g., a PUCCH, a PUSCH, or an SRS) through multiple TRPs, when changing the UL beam, transmit power, or frequency to change TRP between repeated transmissions and perform transmission, or when the UE changes TRP between repeated transmissions and performs transmission.
  Case 2) When the base station indicates UL signal transmission through MAC CE signaling or L1 signaling including DCI, when the UE changes a UL beam, a transmit power, or a frequency to transmit a UL signal, or when the UE changes the panel to transmit a UL signal.
  Case 3) When an SRS transmission is indicated or configured, when changing the UL beam, a transmit power, or a frequency to use multiple SRS resource sets or multiple SRS resources included in the SRS resource set, or when the UE changes the panel to perform SRS transmission.

The case of changing transmission information for changing the TRP between repeated transmissions in case 1 may be determined according to the mapping pattern between repeated transmission and TRP. Here, repeated transmission includes transmitting the same UL signals. The 3GPP Release 16 standard supports two mapping patterns (e.g., 'Sequential' and 'Cyclical') when the base station repeatedly transmits the PDSCH. The mapping pattern for repeatedly transmitting a PDSCH through multiple TRPs may be applied when the UE repeatedly transmits the UL signal through multiple TRPs. 'Sequential' mapping is a scheme of changing TRPs in two repeated transmission units, such as {TRP1, TRP1, TRP2, TRP2}, and then transmitting, and 'Cyclical' mapping is a scheme of changing the TRP every repeated transmission, such as {TRP1, TRP2, TRP1, TRP2}, and the transmitting. When at least one of the UL beam, the transmit power, and the frequency to be transmitted (or frequency hop) for transmitting a UL signal through multiple TRPs is determined, the UE may apply UL transmission change information determined according to the mapping scheme and transmit the UL signal. When a panel for transmitting a UL signal through multiple TRPs is determined, the UE may apply the UL transmission change information determined according to the above-described mapping scheme and transmit the UL signal. Here, the UL transmission change information may include at least one of the UL beam for transmitting a UL signal, a transmit power, and a frequency to be transmitted.

The UL transmission change information may include a panel for transmitting a UL signal. Repeatedly transmitting a PUSCH through multiple TRPs may include PUSCH repeated transmission type A and PUSCH repeated transmission type B. The PUSCH repeated transmission type B may consider nominal repetition and actual repetition as the repeated transmission unit.

In case 2, the base station may configure a higher layer parameter for UL signal transmission to the UE and indicate the UE's UL signal (e.g., a PUCCH, a PUSCH, or an SRS) transmission through L1 signaling (e.g., DCI). The time interval between the signaling for the base station to indicate a UL signal transmission to the UE and the UL signal transmitted by the UE may be defined as a 'time offset' which may be replaced with 'scheduling interval,' 'scheduling offset,' or 'time interval.' When indicating UL signal transmission to the UE through L1 signaling including DCI, the time offset may be calculated as 'from the last symbol where the PDCCH including DCI is transmitted to the first symbol where UL (e.g., aperiodic/semi-persistent SRS or PUCCH including HARQ-ACK for PDSCH or PUSCH) is transmitted.' If the UE's DCI decoding time is further considered, the time offset may be calculated as 'from the last symbol where a PDCCH including DCI is transmitted to the first symbol where a UL signal is transmitted.' When the base station indicates UL signal transmission through MAC CE signaling, the time offset may be calculated by the following methods.

Method 1: From the end of the last symbol where a PDSCH including a MAC CE signaling is transmitted to the start of the first symbol where a UL signal (e.g., aperiodic/semi-persistent SRS) is transmitted.

Method 2: From the end of the last symbol where a PUCCH/PUSCH including a HARQ-ACK for a PDSCH including a MAC CE signaling is transmitted to the start of the first symbol where a UL signal is transmitted.

Method 3: From the end of the last symbol where a PUCCH/PUSCH including a HARQ-ACK for a PDSCH including a MAC CE signaling to the start of the first symbol where a UL signal is transmitted after the MAC CE application delay time (e.g., to the first slot after 3 ms elapses).

The time offset may be converted into an absolute time unit (e.g., ms) or symbol unit. When receiving an indication of a UL signal transmission from the base station, the UE may change at least one of the UL beam, the transmit power, and the frequency for UL transmission during the time offset. Alternatively, the UE may change the panel for UL transmission during the time offset.

In case 3, when the UE transmits the SRS scheduled by the base station, the UE may change the UL beam, the transmit power, and the frequency according to the higher layer configuration of the SRS resource included in the SRS resource set to be transmitted and transmit it. Alternatively, the UE may change the panel according to the higher layer configuration of the SRS resource and transmit the SRS.

The UE may require a transition time (transient time) to change at least one of the UL beam, the transmit power, and the frequency according to UE capability. The UE may require a transition time to change the panel for UL transmission according to the UE capability. The transition time may be considered, e.g., when repeated transmission is performed in long subslot units or in short subslot units. The transition time according to a UE capability may apply all or some of the UL beam, the transmit power, or the frequency determined to transmit the UL signal depending on whether it is met during the time offset or between repeated transmissions of UL signal.

As described above, a predetermined time may be required to perform a change to the UL beam, the transmit power, or the frequency and, to meet this, an offset interval may be added between the repeated transmissions, or the base station may indicate UL signal transmission to the UE so that the time offset is larger than a predetermined time for change. Alternatively, a predetermined time may be required even when a panel change for UL transmission is additionally performed and, to meet this, an offset interval may be added between repeated transmissions or the base station may indicate UL signal transmission to the UE so that the time offset is greater than the predetermined time.

The offset in the time domain for the UE's UL transmission may be appreciated as encompassing the time interval between the repeated transmissions of UL signal or the above-described time offset.

Figures 11, 12:
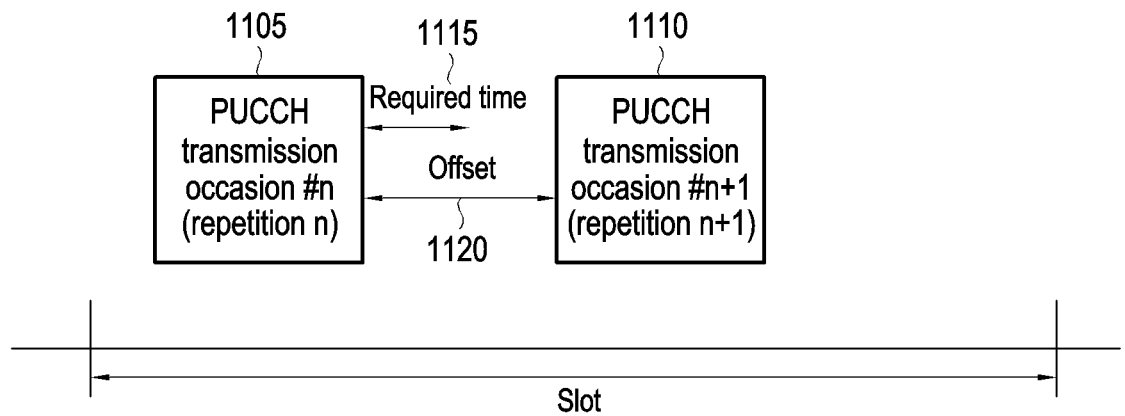
FIG. 11 illustrates repeated transmission of a PUCCH in a slot, with an offset indicated by a base station applied, according to an embodiment.
FIG. 12 illustrates a medium access control (MAC) control element (CE) for activating a new higher layer parameter to perform transmit power control for each TRP in FR1 according to an embodiment.

FIG. 11 illustrates a UE repeatedly transmitting a PUCCH in a slot, with an offset indicated by a base station applied, according to an embodiment.

Referring to FIG. 11, an offset 1120 may be set to a value greater than or equal to a time 1115 required between repeated PUCCH transmissions 1105 and 1110.

A method in which the base station determines an offset in the time domain to ensure the time required to change the UL beam, the transmit power, or the frequency according to UE capability and a method in which the UE transmits the UL signal indicated by the base station are described below in detail in connection with a 1-1th embodiment and a 1-2th embodiment. The 1-1th embodiment and the 1-2th embodiment are so separated for ease of description, and embodiments may be performed alone or in combination.

1-1th Embodiment: Method of Determining an Offset by the Base Station According to the UE Capability Reported by the UE and Configuring an Offset to the UE As an example of the method for determining an offset in the time domain for UL signal transmission, the UE may report, to the base station, UE capability information including at least one of the UE capability for performing a UL beam change, the UE capability for performing a transmit power change, and the UE capability for performing a frequency change considering frequency hopping. Alternatively, the three UE capabilities may be individually reported to the base station. The UE may select and report some of the three UE capabilities. The UE may report a representative value of the UE capability for changing the transmission configuration of the UL signal.

Further, if the UE is able to transmit a UL signal using multiple panels, the UE capability for a panel change may also be considered while determining the UE capability to be reported. That is, UE capability information including at least one of the UE capability for performing a UL beam change, the UE capability for performing a transmit power change, the UE capability for performing a frequency change considering frequency hopping, and the UE capability for performing a panel change may be reported to the base station. Alternatively, the four UE capabilities may be individually reported to the base station. The UE may select and report some of the four UE capabilities. The UE may report a representative value of the UE capability for changing the transmission configuration of the UL signal.

Hereinafter, the terms UE capability and UE capability information may be used interchangeably in the disclosure may be understood to have the same meaning.

As described above, a UE may provide information for the base station to determine an offset in the case of changing some or all of the UL beam, the transmit power, or the frequency when transmitting a UL signal. Further, if the UE supports a plurality of panels, information for the base station to determine the offset in the case of a panel change may be provided. The UE may report UE capability for each UL beam change, transmit power change or frequency change using one of the following methods. Further, the UE capability for panel change may also be reported using one of the following methods:

UE capability for UL transmission configuration change of NR Release 15/16 may be reported. For example, the UE may set 'beamSwitchTiming' to one of {14, 28, 48} as in NR Release 15/16 for reporting UE capability for beam change and report it to the base station. The UE may set 'beamSwitchTiming' to one of {224, 336} for reporting UE capability for panel change and report it to the base station. Here, the number indicating the 'beamSwitchTiming' is a symbol unit, e.g., when 'beamSwitchTiming' is set to "224" in the UE capability report for panel change, which indicates that the processing time for beam switching in UE capability for panel change is 224 symbols. Further, the 'beamSwitchTiming' may be set for each subcarrier spacing.

The time required for change may be reported in symbol or absolute time units (e.g., ms).

The base station and the UE may pre-define a processing time that may indicate processing capability. The processing time for N processing capabilities may be previously defined, and the processing time may differ depending on p indicating the subcarrier spacing.

Tables 31 and 32 below show examples of processing times previously defined by the base station and the UE for processing capabilities n and n_1 for a UL beam change, a transmit power change, or a frequency change. The value of the required time area may be set to establish the relationship, e.g., {a1<a2<a3<a4}, {b1<a1, b2<a2, b3<a3}. The unit of required time may be set to a symbol or ms.

TABLE 31

| Processing capability n | |
|---|---|
| μ | Required time |
| 0 | a1 |
| 1 | a2 |

TABLE 31-continued

| Processing capability n | |
|---|---|
| μ | Required time |
| 2 | a3 |
| 3 | a4 |

TABLE 32

| Processing capability n + 1 | |
|---|---|
| μ | Required time |
| 0 | b1 |
| 1 | b2 |
| 2 | b3 |

When the UE reports a processing time for changing at least one of the UL beam, the transmit power, and the frequency as UE capability, it may determine a value to be reported considering each UL signal. For example, when reporting the processing time for UL beam change as UE capability, the report may be made, with the UE capability divided into the UE capability for beam change for a PUCCH, UE capability for beam change for PUSCH, and UE capability for beam change for an SRS. The UE capability for a transmit power change and the capability for a frequency change may also be divided and reported according to a PUCCH, a PUSCH, or an SRS in the same manner. When the UE reports a UE capability for changing at least one of a UL beam, a transmit power, and a frequency for a PUCCH, the determination may be made considering the number of PUCCH resources, the number of configured spatial relation info, the number of activated spatial relation info, and the frequency hopping configuration. When the UE reports UE capability for changing each of the UL beam, the transmit power, and the frequency for PUSCH, the determination may be made considering the precoding method for a PUSCH (e.g., 'codebook' or 'non-codebook'), the number of SRS resource sets associated with PUSCH transmission, the number of SRS resources configured in the associated SRS resource set, the relationship between the PUSCH and the SRS antenna port, and the frequency hopping configuration.

When the UE reports UE capability for changing each of the UL beam, the transmit power, and the frequency for the SRS, the determination may be made considering SRS transmission indication method (e.g., DCI-based or MAC CE-based), SRS time axis information (e.g., periodic SRS or semi-persistent SRS or aperiodic SRS), the use of SRS (e.g., 'beamManagement' or 'codebook' or 'nonCodebook' or 'antennaSwitching'), the number of SRS resource sets, and the number of SRS resources. Further, when the UE supporting multiple panels reports a processing time for changing the panel as UE capability, it may determine a value to be reported considering the UL signal.

Alternatively, the UE may determine and report UE capability for at least one change of the UL beam, the transmit power, and the frequency without distinguishing the UE capability for each UL signal. The UE may determine and report the UE capability for the panel change without distinguishing the UE capability for each UL signal.

The UE may additionally report UE capability for indicating whether the UL beam, the transmit power, and the frequency may be changed simultaneously or sequentially. Here, the UE supporting multiple panels may report whether the panel may be changed simultaneously as the corresponding UE capability. That is, the UE may report whether the UL beam, the transmit power, the frequency, and the panel may be changed simultaneously as the corresponding UE capability. As an example of the corresponding UE capability, the UE may select and report one of 'simultaneous' or 'sequential' to the base station. If the UE reports the UE capability as 'simultaneous', the UE may simultaneously change the UL beam, the transmit power, and the frequency. If the UE supports multiple panels, the panels may also be changed at the same time. If the UE reports the UE capability as 'sequential', the UE may sequentially change the UL beam, the transmit power, and the frequency. If the UE supports multiple panels, the panels may be sequentially changed.

The UE may report UE capability 'beamCorrespondenceWithoutUL-BeamSweeping' to the base station to indicate whether the beam correspondence requirement is met, in addition to reporting UE capability for supporting a change for the UL beam, the transmit power, the frequency, and the panel. The beam correspondence refers to the capability of the UE to select a beam for UL transmission based on DL measurement without relying on UL beam sweeping. If the UE reports that 'beamCorrespondenceWithoutUL-BeamSweeping', which is the UE capability for the beam correspondence, is supportable ('supported'), the UE may select a UL beam for UL transmission without UL beam sweeping, and then transmit the UL signal.

The base station may determine an offset for securing a time for applying UL transmission change information through the UE capability reported by the UE. The base station may determine the offset considering one or a combination of the following options:

Option 1) The offset may be determined based on the largest value for at least one of UE capability for a UL beam change, UE capability for a transmit power change, or UE capability for a frequency change reported from the UE.

Option 2) The offset is determined based on the largest value among UE capabilities for a change required to perform actual UL transmission among UE capabilities reported from the UE. For example, when the base station indicates a UL signal to the UE to change only the UL beam and the transmit power, the offset may be determined based on the largest value of the UE capability for UL beam change and the UE capability for transmit power change. The offset may be determined in the same manner as in the above example for UL transmission change information combinations other than the above example.

Option 3) The offset may be determined based on a sum of UE capability for a UL beam change, UE capability for a transmit power change, and UE capability for a frequency change reported from the UE.

Option 4) The offset may be determined based on a sum of the UE capabilities for change for performing actual UL transmission among the UE capabilities reported from the UE. For example, when the base station indicates a UL signal to the UE to change only the UL beam and the transmit power, the offset may be determined based on the sum of the UE capability for a UL beam change and the UE capability for a transmit power change. The offset may be determined in the same manner as in the above example for UL transmission change information combinations other than the above example.

Option 5) When the offset is determined using one of options 1 to 4 above, the offset may be determined considering the configuration of each UL transmission signal. For example, when the base station determines the offset for repeatedly transmitting a PUCCH through multiple TRPs according to option 1, the offset may be determined based on the UE capability reported by the UE considering the configuration of the PUCCH. As another example, when the UE does not distinguish UE capabilities for each UL signal, the offset may be determined by the base station expecting an additional required time due to a PUCCH configuration to the UE capability reported from the UE. This may also be applied when the base station determines an offset for transmitting another UL signal (e.g., a PUSCH or an SRS).

Option 6) When the offset is determined using one of options 1 to 4 above, the offset may be determined without distinguishing the configuration of each UL transmission signal.

Option 7) The base station may determine an arbitrary value as the offset. In this case, the higher layer parameter configuration or the UL resource configuration of the UL signal may be considered.

Option 8) When the UE supports multiple panels, the UE capability for panel change may be further considered in determining the offset using options 1 to 6.

Each option above is an example in which the UE reports all of the UE capabilities for three types of UL transmission change information. However, if the UE reports only some of the UE capabilities, the base station may determine the offset by applying only the reported UE capabilities to each option.

When the UE reports that the UL beam, the transmit power, and the frequency may be simultaneously changed, the base station may select option 1 or option 2 to determine the offset. When the UE reports that the UL beam, the transmit power, and the frequency may be sequentially changed, the base station may select option 3 or 4 to determine the offset. When the UE supports multiple panels and reports that the UL beam, the transmit power, the frequency, and the panel (or at least two or more thereof) may simultaneously be changed, the base station may further consider the UE capability for panel change in option 1, according to option 8, so as to determine the offset or may further consider the UE capability for panel change in option 2, according to option 8, so as to determine the offset. This is an example of the above embodiment, and the base station may determine the offset considering one or a combination of options 1 to 8 described above according to the UE capability reported by the UE.

The base station may adjust the offset value determined by the above-described options according to whether the UE supports the beam correspondent reported through the UE capability. For example, if the UE supports beam correspondence, the base station may determine the offset value determined using the above options as the final offset value or adjust it to a smaller value. If the UE does not support beam correspondence, the base station may add an additional required time to the offset value determined using the above-described options.

The base station may adjust the offset value determined by the above-described options according to whether the UE reports on the UL beam to be transmitted on the UL for multiple TRPs. For example, if the UL beam is reported to the base station, the corresponding UL beam is a 'known' beam for the UE. If the UL beam is not reported to the base station, the corresponding UL beam is an 'unknown' beam for the UE. If the UE reports the UL beam to be transmitted on UL to the base station, the base station may determine the offset value determined through the above options as the final offset value or adjust it to a smaller value. If the UE does not report the UL beam to be transmitted on UL to the base station, the base station may add additional time to the offset value determined through the above options.

The base station may inform the UE of the determined offset. In this case, the base station may explicitly or implicitly inform the UE of the offset:

When the base station explicitly configures the determined offset to the UE:

The base station may configure the offset with a new higher layer parameter and explicitly inform the UE of the configured offset. For example, the new higher layer parameter 'timeDurationForULSwitch' may be added to configuration information for a PUCCH transmission, such as PUCCH-FormatConfig or PUCCH-ConFIG. Similarly for a PUSCH or an SRS, a new parameter for an offset may be added to a higher layer parameter for a PUSCH transmission and a higher layer parameter for an SRS transmission.

The above-described example is one of the methods of configuring a new higher layer parameter for indicating the offset determined by the base station to the UE and may be defined as a higher layer parameter with a different name having the same function.

When the base station implicitly indicates the determined offset:

The base station may implicitly indicate the offset through other configuration(s) for transmitting a UL signal, rather than directly configuring the offset with the higher layer parameter. For example, the offset may be indicated through 'startingSymbolIndex' configured in a PUCCH-format[a] (where a is, e.g., 0, 1, 2, 3 or 4) in the higher layer parameter PUCCH-Resource.

More specifically, as an example of one of the reinforcement methods for indicating repeated transmission of PUCCH in the slot, the startingSymbolIndex in PUCCH-format[a] of PUCCH-Resource may be configured as many times as the number of repetitions of PUCCH in the slot. If the number of repetitions in the slot is 2, the startingSymbolIndex indicates the transmission start symbol of the first PUCCH repeated transmission occasion in the slot, and 'startingSymbolIndex2' that may be newly added may indicate the transmission start symbol of the second PUCCH repeated transmission occasion in the slot. The symbol position indicated by startingSymbolIndex must be earlier than the symbol position indicated by startingSymbolIndex2, and the interval between two symbols may be set by the base station so that it becomes a value greater than the offset determined by the base station and one PUCCH transmission symbol nrofSymbols. As another example, the base station may inform the UE of the offset implicitly through PUCCH resource configuration for a PUCCH transmission.

Alternatively, when the base station schedules the PUCCH including the HARQ information for the PDSCH to the UE, the PDSCH-to-HARQ_feedback timing indicator may be indicated to the UE so that the time offset becomes a greater value than the determined offset. For other UL signals (e.g., a PUSCH or an SRS) than a PUCCH, the UE may be implicitly informed of the offset through the transmission timing indicated by DCI or the higher layer parameter of the UL signal.

1-2th Embodiment: A Method for Transmitting the UL Signal Indicated by the Base Station, by the UE, According to UE Capability When the UE is instructed to repeatedly transmit a UL signal from the base station, the UE may determine an operation for repeated UL transmission according to whether the offset determined by the base station is explicitly configured or is implicitly indicated. If the UE is explicitly configured with the offset by the base station, the UE may transmit an interval between repeated transmissions according to the offset in the time domain and transmit the UL signal. If the UE is implicitly informed of offset, the UE transmits the UL signal according to the higher layer parameter configuration for the UL signal configured by the base station.

When the UE is explicitly configured with the offset or is implicitly informed of the offset and applies it to repeated transmission of a UL signal, it may change at least one of the UL beam, the transmit power, or the frequency during the offset depending on the UE capability and transmit it. If the offset determined by the base station is set to be larger than the UE capability for changing a UL beam, a transmit power, or a frequency, the UE may change the UL beam or the transmit power to change a TRP between repeated transmissions and then transmit it, or may perform a frequency change for frequency hopping. If the offset determined by the base station is set to be smaller than the UE capability for changing a transmit power or a frequency, the base station and the UE may previously define a default UL transmission method considering one or a combination of the following operations to repeatedly transmit the UL signal.

Transmit the UL signal with the same UL beam, transmit power and frequency as the previous repeated transmission:

Since the offset determined by the base station is smaller than the UE capability, the UE cannot meet the time for changing the beam or transmit power or frequency between repeated transmissions. Therefore, the UE may perform the next repeated transmission with the beam, the transmit power, and the frequency applied to the previous repeated transmission. The previous repeated transmission may refer to the repeated transmission occasion immediately before the repeated transmission occasion to be transmitted. Further, it is possible to use at least one of the UL beam, the transmission power, or the frequency identical to the previous (repeated) transmission to change the rest. For example, the same UL beam and frequency as the previous (repeated) transmission may be used, and the transmit power may be changed for the next repeated transmission.

Transmit the UL signal with the UL beam, the transmit power, and the frequency set as default:

Since the offset determined by the base station is smaller than the UE capability, the UE cannot meet the time for changing the beam or transmit power or frequency between repeated transmissions. Therefore, the UE may perform the next repeated transmission with the default UL beam, the default transmit power, and the default frequency as previously defined. Here, the base station and the UE may define default transmission information for each UL signal (e.g., a PUCCH, a PUSCH, or an SRS).

Alternatively, the base station and the UE may define default transmission information commonly for the UL signal. Further, at least one of the UL beam, the transmission power, or the frequency may be used as default configuration, and the rest may be changed. For example, the UL beam and frequency may be used as the default configuration, and the transmit power may be changed for the next repeated transmission.

Conditionally change the UL beam, the transmit power, or the frequency and transmit the UL signal:

If the mapping between the UL repeated transmission and the TRP is set to 'Sequential', the UL beam, the transmit power, or the frequency may be changed and transmitted on a repeated transmission occasion that meets the UE capability.

On the repeated transmission occasion failing to meet the UE capability, the UE may transmit the UL signal with the same configuration as the previous repeated transmission occasion. For example, if the mapping is configured as {TRP1, TRP1, TRP2, TRP2}, the first two repeated transmission occasions are transmitted with the UL beam, the transmit power, and the frequency for TRP1. The third repeated transmission occasion should be changed with the UL beam, the transmit power, and the frequency for TRP2 and transmitted, but since the offset is smaller than UE capability, the UE transmits a UL signal with the configuration for TRP1 without changing UL transmission information. The UE may change to the UL beam, the transmit power, and the frequency for TRP2 and transmit the fourth repeated transmission occasion.

Repeatedly transmit a UL signal by applying a changeable configuration among the UL beam, the transmit power, or the frequency:

When the UE compares the size between the offset set by the base station and the UE capability, the UE may apply some changeable configurations in which the UE capability is smaller than the offset among the UE capabilities to the next repeated transmission occasion. For example, if the offset is larger than the UE capability for UL beam change and is smaller than the UE capability for transmit power change or frequency change, the UE may change only the UL beam and apply the same repeated transmission occasion as the previous repeated transmission occasion, for the transmit power and the frequency, and transmit the next repeated transmission occasion. If the UE sequentially changes the UL beam, the transmit power, and the frequency, the UE compares the offset determined by the base station with a combination of the UE capabilities for UL beam change, the transmit power change, and the frequency change. If the combination is smaller than the offset, the change of the UL beam, the transmit power, or the frequency is determined depending on the priority for the UL beam, the transmit power, or the frequency, previously determined between the base station and the UE. For example, if the offset determined by the base station is smaller than the sum of all the UE capabilities, the sum of the UE capabilities for UL beam and the transmit power change, the sum of the UE capabilities for UL beam change and frequency change, and the sum of the UE capabilities for transmit power and frequency change are smaller than the offset, and the base station and the UE previously define priority {UL beam>transmit power>frequency}, the UE may change the UL beam and the transmit power and transmit the UL signal.

Drop some symbols or repeated transmission occasion and transmit a UL signal:

To apply the UL transmission change information and repeatedly transmit the UL signal, the UE may drop some symbols in the repeated transmission occasion to change at least one of the beam, the transmit power, or the frequency and transmit the UL signal through the remaining resources. For example, if the mapping between repeated PUCCH transmission and a TRP is set as {TRP1, TRP1, TRP2, TRP2}, in the third repeated transmission, no PUCCH is transmitted during the front symbols until the required time for changing the UL beam, the transmit power, and the frequency for TRP2 is met. For the remaining symbols, after meeting the required time for changing the UL beam, the transmit power, and the frequency, the UE may repeatedly transmit the third PUCCH.

For example, if the required time for a change of the UL beam, the transmit power, and the frequency for repeated transmission for which TRP is changed is not met, the UE may drop the corresponding UL repeated transmission occasion. If the mapping between a PUCCH repeated transmission and a TRP is set as {TRP1, TRP1, TRP2, TRP2}, the third PUCCH repeated transmission occasion may be dropped. Thereafter, the fourth PUCCH repeated transmission occasion may be transmitted, with the UL beam, the transmit power, and the frequency changed for TRP2. As another example, if the mapping between a PUCCH repeated transmission and a TRP is set as {TRP1, TRP2, TRP1, TRP2}, the second and fourth PUCCH repeated transmission occasions may be dropped, and a single TRP-based PUCCH repeated transmission may be supported.

If a PUCCH repeated transmission is performed considering the channel status for each TRP through the methods provided herein, an increase in coverage of UL control signals may be expected. Further, since transmit power is controlled for each transmission reception point, efficient battery management of the UE may be expected.

A similar method may be equally applied to a size relationship between the time offset for UL signal transmission and UE capability. If the time offset is larger than the UE capability for changing the UL beam, the transmit power, or the frequency, the UE may transmit the UL signal. If the time offset is smaller than the UE capability for changing the UL beam or transmit power or frequency, the UE may transmit the UL signal considering one or a combination of the following operations similarly to the above case in which the offset between repeated transmissions does not meet the UE capability.

Transmit the UL signal with the same UL beam, the transmit power and the frequency as the previous UL signal transmission.

Transmit the UL signal with the UL beam, the transmit power, and the frequency set as defaults.

Repeatedly transmit UL signal by applying a changeable configuration among the UL beam, the transmit power, or the frequency.

Drop some symbols of the first repeated transmission occasion or the first repeated transmission occasion and transmit the UL signal.

The operations according to the above conditions have been described with respect to a method for a UE supporting a single panel to change the UL beam, the transmit power, or the frequency. However, if the UE supports multiple panels, the UE identifies whether the offset determined by the base station is set to be smaller than the UE capability for a change of a UL beam, a transmit power, a frequency, or a panel. If the offset determined by the base station is larger than the UE capability for changing the UL beam, the transmit power, the frequency, or the panel, the UE may transmit the UL signal. If the offset is set to be smaller than the UE capability for changing the UL beam, the transmit power, the frequency, or the panel, the UE may transmit the UL signal according to one or a combination of the following operations, further considering the UE capability for panel change similarly to the above case in which the offset between repeated transmissions does not meet the UE capability.

Transmit the UL signal with the same UL beam, transmit power, frequency, and panel as the previous UL signal transmission.

Transmit the UL signal with the UL beam, the transmit power, the frequency, and the panel set as a default.

Repeatedly transmit a UL signal by applying a changeable configuration among the UL beam, the transmit power, the frequency, or the panel.

Drop some symbols of the first repeated transmission occasion or the first repeated transmission occasion and transmit the UL signal.

Here, the previous UL signal includes the most recently transmitted physical channel as the UL signal (e.g., a PUCCH, a PUSCH, or an SRS) to be transmitted. The base station and the UE may define default transmission information for each UL signal (e.g., a PUCCH, a PUSCH, or an SRS). Alternatively, the base station and the UE may define default transmission information commonly for the UL signal.

Second Embodiment: Method for Controlling Transmit Power Divided Per TRP in FR1

If the UE repeatedly transmits the PUCCH through a plurality of TRPs in an environment in which blockage occurs, since the PUCCH is transmitted through a plurality of channel links, it may be transmitted more stably than when the PUCCH is repeatedly transmitted through a single TRP. Further, since the PUCCH is repeatedly transmitted with a plurality of TRPs, a large performance gain due to macro diversity may be additionally obtained. Each channel link is created between a plurality of TRPs and the UE, and pathloss may differ due to the difference in distance between the TRP and the UE, and other channel characteristics may also be different. Therefore, to transmit the PUCCH through multiple TRPs, a transmit power control considering the UL beam and different pathloss for each TRP is required.

In FR2, the higher layer parameter PUCCH-SpatialRelationInfo is defined for each PUCCH resource to transmit the PUCCH. If only one PUCCH-SpatialRelationInfo is configured, PUCCH resources are transmitted according to the corresponding PUCCH-SpatialRelationInfo without a separate activation process. If multiple PUCCH-SpatialRelationInfo's are configured, PUCCH-SpatialRelationInfo is activated for each PUCCH, through MAC CE. Since the PUCCH-SpatialRelationInfo includes reference RS information for configuring the UL beam and parameters for controlling transmit power, it is possible to determine the UL beam and the transmit power when transmitting the PUCCH resource.

According to an embodiment of the disclosure, it is possible to activate as many PUCCH-SpatialRelationInfos as the number of TRPs supported, by enhancing the method for activating one PUCCH-SpatialRelationInfo in the PUCCH resource for the UE to repeatedly transmit the same PUCCH through multiple TRPs. Since the 3GPP Release 17 standard supports up to two TRPs, up to two PUCCH-SpatialRelationInfos may be activated in one PUCCH resource. Each PUCCH-SpatialRelationInfo may be used to determine the UL beam and transmit power for each TRP, and according to the mapping method between repeated transmission and TRP, the PUCCH may be transmitted by referring to the PUCCH-SpatialRelationInfo corresponding to each TRP. It is also possible to activate two or more PUCCH-SpatialRelationInfo's in one PUCCH resource according to an embodiment.

Unlike transmitting a PUCCH in FR2, when a PUCCH is transmitted in FR1, PUCCH-SpatialRelationInfo is not configured. One of the reasons for this is that FR1 operates in a lower frequency band than FR2 and the UE transmits and receives signals using omnidirectional beams. In FR1, since PUCCH-SpatialRelationInfo for each PUCCH resource is not configured, the UE may determine transmit power according to the default operation corresponding to the case where PUCCH-SpatialRelationInfo is not configured to the UE among the above-described transmit power control methods. However, when the UE repeatedly transmits a PUCCH through multiple TRPs in FR1, since the default transmission power control method for NR Release 15/16 standard cannot determine the transmission power for each TRP individually, FR1 requires an enhanced transmission power control method.

As enhancement methods for controlling transmit power for multiple TRPs in FR1, a method to enhance default transmit power control and a method to utilize PUCCH-SpatialRelationInfo framework in FR1 is provided. This enhanced transmit power control method is not limited to repeated PUCCH transmission, but may also be used in other methods of transmitting PUCCH using a plurality of TRPs. For example, even when the UE performs individual transmission, rather than repeated transmission of PUCCHs including different UCIs through different TRPs, the enhanced transmit power control method may be used to apply transmit power for each TRP. The 2-1th embodiment and the 2-2th embodiment are so separated for ease of description, and embodiments may be performed alone or in combination.

2-1th Embodiment: Enhanced Default Transmit Power Control Method to Transmit PUCCH Through Multiple TRPs in FR1

The UE may determine the transmit power for each TRP by enhancing the method for determining the transmit power for one PUCCH transmission with the existing default transmit power control method. If the UE transmits a PUCCH through multiple TRPs, the transmit power is determined according to the enhanced default transmit power control method and, if a PUCCH is transmitted through a single TRP, the transmit power is determined according to the default transmit power control method of the NR Release 15/16 standard.

Before supporting the UE, the base station may receive, from the UE, a report for the UE capability on whether a transmit power control for each TRP is possible in FR1. If the UE reports the UE capability as being able to support a transmit power control for each TRP, the base station may configure a higher layer parameter to perform a transmit power control for each TRP in FR1. For example, the UE may set the UE capability 'separatePC-FR1' to 'supported' or 'enabled' and report it to the base station. The base station and the UE may pre-define one or a combination of the following conditions as a condition for transmitting the PUCCH through a plurality of TRPs:

The mapping pattern between multiple TRPs and repeated transmission is set by a higher layer parameter, and the transmitted PUCCH resource is configured to be transmitted repeatedly.

A PDCCH including DCI scheduling a PUCCH is transmitted through multiple TRPs, and the scheduled PUCCH resource is configured to be repeatedly transmitted.

The UE is scheduled to receive the PDSCH from multiple TRPs, and the PUCCH resource for transmitting the HARQ-ARQ of the received PDSCH is configured to be repeatedly transmitted. The PDSCH may include both a case in which it is repeatedly transmitted and a case in which it is not repeatedly transmitted. Further, it may also include a case in which a PDCCH scheduling a PDSCH is received from a CORESET configured with two different CORESETPoolIndexes or a case in which a PDCCH scheduling a PDSCH is received from a CORESET in which CORESETPoolIndex is not set and a CORESET in which CORESETPoolIndex is set to 1.

A new parameter indicating a transmit power control for each TRP is configured in the higher layer parameter configuration for PUCCH transmission, and the transmitted PUCCH resource is configured to be transmitted repeatedly. For example, the new parameter 'enableTwoDefaultPowerControl' may be set to 'enabled' in the higher layer parameter PUCCH-ConFIG.

A new higher layer parameter is configured to instruct each hop to be transmitted through a different TRP, similar to intra-slot frequency hopping for a single PUCCH transmission. The first hop and the second hop are transmitted through different TRPs. For example, the new higher layer parameter 'intraslotBeamHopping' in PUCCH-FormatConfig may be set to 'enabled'.

If the conditions previously defined by the base station and the UE are not met among the above conditions, the UE may transmit the PUCCH according to the default transmit power control method of the NR Release 15/16 standard. If the conditions previously defined by the base station and the UE among the above conditions are met, it is possible to enhance the default transmit power control method to be able to select the transmit power control parameter for each TRP in terms of P0-PUCCH, PUCCH-PathlossReferenceRS, and closed loop index among the transmit power control parameters.

P0-PUCCH: The UE obtains the minimum value among the p0-PUCCH-Id values configured in the higher layer parameter p0-Set and the p0-PUCCH-Value of the P0-PUCCH for the next minimum value. The minimum value is applied to P0 of the TRP for the first PUCCH transmission, and the next minimum value is applied to P0 for another TRP. If only one P0-PUCCH is configured in p0-Set, the same P0-PUCCH-Value is applied and PUCCH is transmitted through two TRPs.

PUCCH-PathlossReferenceRS: If the UE is configured with pathlossReferenceRSs, but is not configured with PUCCH-SpatialRelationInfo, the UE obtains the RS of the PUCCH-PathlossReferenceRS having the pucch-PathlossReferenceRS-ID of index 0 and index 1 among the PUCCH-PathlossReferenceRSs that are RS resources for the supporting cell indicated by the pathlossReferenceLinking if configured, or the primary cell. The referenceSignal of the PUCCH-PathlossReferenceRS having index 0 is applied to calculate the pathloss of the TRP for the first PUCCH transmission, and the referenceSignal of the PUCCH-PathlosReferenceRS having the index 0 is applied to calculate the pathloss of the other TRP. If only one PUCCH-PathlossReferenceRS is configured in pathlossReferenceRSs, the same referenceSignal is applied to transmit PUCCH through two TRPs.

Closed loop index: If the UE is configured with two-PUCCH-PC-AdjustmentStates and is not configured with PUCCH-SpatialRelationInfo, the closed loop index of the TRP for the first PUCCH transmission is set to 0, and the closed loop index of the other TRP is set to 1.

2-2th Embodiment: Transmit Power Control Method for Each TRP Using PUCCH-SpatialRelationInfo Framework in FR1

In the 3GPP release 15 and 16 standards, PUCCH-SpatialRelationInfo is not configured in FR1, but in the release 17 standard, a framework related to the existing PUCCH-SpatialRelationInfo may be introduced to transmit a PUCCH through multiple TRPs in FR1. The PUCCH-SpatialRelationInfo framework may include PUCCH-SpatialRelationInfo information and also higher layer transmit power parameters associated with PUCCH-SpatialRelationInfo and MAC CE for activation.

The base station may receive, from the UE, a report for the UE capability on whether the UE may control transmit power for each TRP in FR1. If the UE reports the UE capability as being able to support a transmit power control for each TRP, the base station may configure a higher layer parameter to perform a transmit power control for each TRP in FR1. For example, the UE may set the UE capability 'separatePC-FR1' to 'supported' or 'enabled' and report it to the base station.

The base station may support one or a combination of the following operations to perform transmit power control for each TRP in FR1:

2-2-1th embodiment) Operation using PUCCH-SpatialRelationInfo in FR1:

The base station may activate PUCCH-SpatialRelationInfo for the PUCCH resource even in FR1. If a PUCCH is transmitted through M TRPs, up to M PUCCH-SpatialRelationInfo's may be activated for each PUCCH resource. In the disclosure, it is assumed that M=2 for convenience of description. If only two PUCCH-SpatialRelationInfo's are configured, two PUCCH-SpatialRelationInfo's may be applied to PUCCHs transmitted through multiple TRPs without additional MAC CE signaling. Whether the PUCCH is transmitted through multiple TRPs may follow the conditions for transmitting the PUCCH through the plurality of TRPs described above in connection with the 2-1th embodiment. If the corresponding condition is not met, the UE may follow the transmit power control method of the NR release 15 to 16 standard. If more than two PUCCH-SpatialRelationInfo's are configured to the UE, a MAC CE may be used to indicate the activated PUCCH-SpatialRelationInfo of each PUCCH resource. The MAC CE may use the same format as the MAC CE for activating the PUCCH spatial relation of the conventional NR release 15/16 standard, and up to two PUCCH-SpatialRelationInfo's activated in the corresponding resource and PUCCH resource ID may be configured (only one PUCCH-SpatialRelationInfo may be activated in the Release 15/16 standard). Since the PUCCH-SpatialRelationInfo may also include reference information for determining the UL beam, the UE may transmit the PUCCH according to the spatial setting when receiving or transmitting the DL RS or SRS indicated in the 'referenceSignal' area.

When the mapping between TRP and PUCCH repeated transmission is determined, and the activated PUCCH-SpatialRelationInfo is applied, mapping and connection with the activated PUCCH-SpatialRelationInfo are required. If the UE transmits the PUCCH as, {1,1,2,2}, as the mapping pattern between TRP and PUCCH repeated transmission is set to 'Sequential', the smaller ID of the two activated PUCCH-SpatialRelationInfo's may be determined to correspond to "1", and the larger ID may be determined to correspond to "2". That is, when the UE transmits the PUCCH corresponding to "1", the transmit power is determined according to the small ID, PUCCH-SpatialRelationInfo, and the PUCCH is transmitted.

When transmitting the PUCCH corresponding to "2", the transmit power may be determined according to the larger ID, PUCCH-SpatialRelationInfo, and the PUCCH may be transmitted. The same method may also be applied to other mapping patterns.

The UE may determine the transmit power for the TRP for the first repeated transmission according to the PUCCH-SpatialRelationInfo set as the smaller ID and may determine the transmit power for the other TRP according to the PUCCH-SpatialRelationInfo set as the larger ID among the activated values. This transmission method is equally applicable to FR2. If only one PUCCH-SpatialRelationInfo is activated in the PUCCH resource, the UE transmits the PUCCH according to the parameters configured in one activated PUCCH-SpatialRelationInfo, rather than transmitting the PUCCH through multiple TRPs.

2-2-2th embodiment) Operation using a new higher layer parameter for transmit power control and MAC CE for activating it:

The base station may configure, to the UE, a new higher layer parameter for a transmit power in FR1, similar to the configuration of PUCCH-SpatialRelationInfo. Table 33 below is an example of the new higher layer parameters, and the new higher layer parameters include transmit power control parameters for each TRP. Hereinafter, the new higher layer parameter PUCCH-PowerControlInfo is designated as PUCCH-PowerControlInfo for convenience of description, but may be referred to by another higher layer parameter name performing the same function.

TABLE 33

```
PUCCH-PowerControlInfo ::= SEQUENCE {
    pucch-PowerControlInfoId        PUCCH-PowerContolInfoId,
    pucch-PathlossReferenceRS-Id    PUCCH-PathlossReferenceRS-Id,
    p0-PUCCH-Id                     P0-PUCCH-Id,
    closedLoopIndex                 ENUMERATED { i0, i1 }
}
```

Two or more PUCCH-PowerControlInfos may be configured. If the base station schedules PUCCH to transmit PUCCH through multiple TRPs or configures periodic or semi-persistent PUCCH, a MAC CE for activation may be required according to the number of configured PUCCH-PowerControlInfos. If only two PUCCH-PowerControlInfos are configured, the two PUCCH-PowerControlInfos may be applied to PUCCHs transmitted through multiple TRPs without additional MAC CE signaling. Whether the PUCCH is transmitted through multiple TRPs may follow the conditions for transmitting the PUCCH through the plurality of TRPs described above in connection with the 2-1th embodiment. If the corresponding condition is not met, the UE may follow the transmit power control method of the NR release 15 to 16 standard. If more than two PUCCH-PowerControlInfos are configured, a MAC CE that activates two PUCCH-PowerControlInfos is required.

FIG. 12 illustrates a MAC CE for activating a new higher layer parameter for performing a transmit power control for each TRP in FR1 according to an embodiment.

Referring to FIG. 12, PUCCH-PowerControlInfo may be activated using a MAC CE similar to the MAC CE for activating PUCCH-SpatialRelationInfo.

The MAC CE includes a support cell ID 1200 to which the MAC CE command is to be applied, a BWP ID 1205, a PUCCH resource ID 1210 indicating the higher layer parameter PUCCH-ResourceId, and an $S_0$ to $S_k$ area 1215 for indicating the activation state of the PUCCH-PowerControlInfo indicated by PUCCH-PowerControlInfoId. $S_k$ indicates the activation state of PUCCH-PowerControlInfo where PUCCH-PowerControlInfoId is k. If $S_k$ is set to 1, it indicates that PUCCH-PowerControlInfo is activated for the indicated PUCCH resource, and if $S_k$ is set to 0, it indicates that PUCCH-PowerControlInfo is deactivated. Here, K indicates the maximum number of configurable PUCCH-PowerControlInfos. Up to two activated PUCCH-PowerControlInfos may be configured for one PUCCH resource.

Mapping between the activated PUCCH-PowerControlInfo and repeated transmission may be determined according to a mapping pattern between repeated transmissions and a TRP, like in the case of reusing PUCCH-SpatialRelationInfo in FR1. When the mapping pattern between repeated transmissions and the TRP is {1,1,2,2}, when the UE transmits the PUCCH corresponding to "1", the transmit power is determined according to the small ID, PUCCH-PowerControlInfo, and the PUCCH is transmitted.

When transmitting the PUCCH corresponding to "2", the transmit power may be determined according to the larger ID, PUCCH-PowerControlInfo, and the PUCCH may be transmitted. The same method may also be applied to other mapping patterns. The UE may determine the transmit power for the TRP for the first repeated transmission according to the PUCCH-PowerControlInfo set as the smaller ID and may determine the transmit power for the other TRP according to the PUCCH-PowerControlInfo set as the larger ID among the activated values. If only one PUCCH-PowerControlInfo is activated in the PUCCH resource, the UE transmits the PUCCH according to the parameters configured in one activated PUCCH-PowerControlInfo, rather than transmitting the PUCCH through multiple TRPs.

2-2-3th embodiment) Default transmit power control operation using a new higher layer parameter for transmit power control:

To determine the PUCCH transmit power for each TRP, a default transmit power control may be performed without an activation process using a separate MAC CE. As in the example described above, when only two PUCCH-PowerControlInfos are configured, the UE may determine a transmit power for each TRP without activation using an additional MAC CE. Similar to this operation, the new higher layer parameter PUCCH-PowerControlInfo-r17 may be defined as shown in Table 34 below to determine the transmit power for each TRP without an activation process using a MAC CE.

TABLE 34

```
PUCCH-PowerControlInfo-r17 ::= SEQUENCE {
    pucch-PathlossReferenceRS-Id    SEQUENCE (Size (2)) OF PUCCH-PathlossReferenceRS-Id,
    p0-PUCCH-Id                     SEQUENCE (Size (2)) OF P0-PUCCH-Id,
    closedLoopIndex                 SEQUENCE (Size (2)) OF ENUMERATED { i0, i1 }
}
```

As shown in Table 34 above, parameters for a transmit power control for two TRPs may be included, in the form of a sequence, in the new higher layer parameter PUCCH-PowerContolInfo-r17. The base station may configure one PUCCH-PowerControlInfo-r17 to the UE. If the UE transmits the PUCCH through a plurality of TRPs, the default transmit power control may be performed according to one configured PUCCH-PowerControlInfo-r17. The UE may apply the first value of the sequence in one configured PUCCH-PowerControlInfo-r17 to determine the transmit power for the TRP of the first PUCCH repeated transmission and may apply the second value of the sequence to determine the transmit power for the other TRP. In this case, whether the PUCCH is transmitted through multiple TRPs may follow the conditions for transmitting the PUCCH through the plurality of TRPs described above in connection with the 2-1th embodiment. If the corresponding condition is not met, the UE may follow the transmit power control method of the NR release 15 to 16 standard.

2-2-4th embodiment) New MAC CE-based transmit power control operation for activating transmit power control parameters of NR Release 15/16 standard:

The base station may determine the transmit power for transmitting the PUCCH through multiple TRPs with the power transmission control parameter set configured in the NR Release 15 or 16 standard and the new MAC CE that activates it, without adding a separate new higher layer parameter. As shown above in Table 34, parameters for transmit power control are configured in the higher layer parameter PUCCH-PowerControl. Here, based on the NR Release 15 standard, p0-Set in which up to 8 P0-PUCCHs are configured and pathlossReferenceRSs in which up to 4 (up to 64 may be set in NR Release 16) PUCCH-Pathloss-ReferenceRSs are configured may be configured in PUCCH-PowerControl. As such, the values in each parameter set are activated with the new MAC CE in order to select a parameter for determining the transmit power of each TRP among a plurality of transmit power control parameters.

FIGS. 13A and 13B illustrate a new MAC CE for activating a PUCCH transmit power control parameter according to an embodiment. Specifically, FIG. 13 illustrates an example of a new MAC CE that may be defined based on the transmit power control parameters of the NR Release 15 and 16 standards.

Since the maximum configurable PUCCH-PathlossReferenceRSs differ in the NR Release 15 and 16 standards, the different number of bits of the area for activating a pathloss reference RS ID and the format structure thereof may be different.

Referring to FIGS. 13A and 13B, each MAC CE includes a serving cell ID 1300 or 1350 to which the MAC CE command is to be applied, a BWP ID 1305 or 1355, and a PUCCH resource ID 1310 or 1360 indicating the higher layer parameter PUCCH-ResourceID. The area for determining the transmit power for the TRP of the first PUCCH repeated transmission is configured as the pathloss reference RS ID 1321 or 1372, P0 PUCCH ID 1322 or 1371, and ClosedLoopIndex 1320 or 1370.

An area for determining transmit power for the other TRP is configured as the pathloss reference RS ID 1331 or 1382, P0 PUCCH ID 1332 or 1381, and ClosedLoopIndex 1330 or 1380. The pathloss reference RS ID area denotes the PUCCH-PathlossRefereceRS-Id of PUCCH-PathlossReferenceRS activated among pathlossReferenceRSs in the higher layer PUCCH-PowerControl, P0 PUCCH ID denotes the P0-PUCCH-Td of P0-PUCCH activated among p0-Sets, and ClosedLoopIndex denotes the closed loop of the corresponding TRP. If the pathloss reference RS ID is set to a, the PUCCH-PathlossReferenceRS whose PUCCH-Pathloss-ReferenceRS-Id is a is activated, and if the P0 PUCCH ID is set to b, the P0-PUCCH whose P0-PUCCH-Id is b+1 is activated. If ClosedLoopIndex is 0, the transmit power of the corresponding TRP is adjusted according to closed loop 0, and if ClosedLoopindex is 1, the transmit power of the corresponding TRP is adjusted according to closed loop 1.

When the UE transmits the PUCCH through the PUCCH resource for which the transmit power control parameter is activated with the MAC CE as described above, the UE may apply the activated transmit power control parameter and transmit the PUCCH through each TRP. If the UE does not receive the MAC CE command for the PUCCH resource to be transmitted, the UE transmits the PUCCH according to the transmit power control method of the NR Release 15/16 standard. If only one PUCCH resource is activated with a MAC CE for transmit power control parameters, the UE applies only the activated parameters to transmit power control and transmits the PUCCH.

Figure 14A:
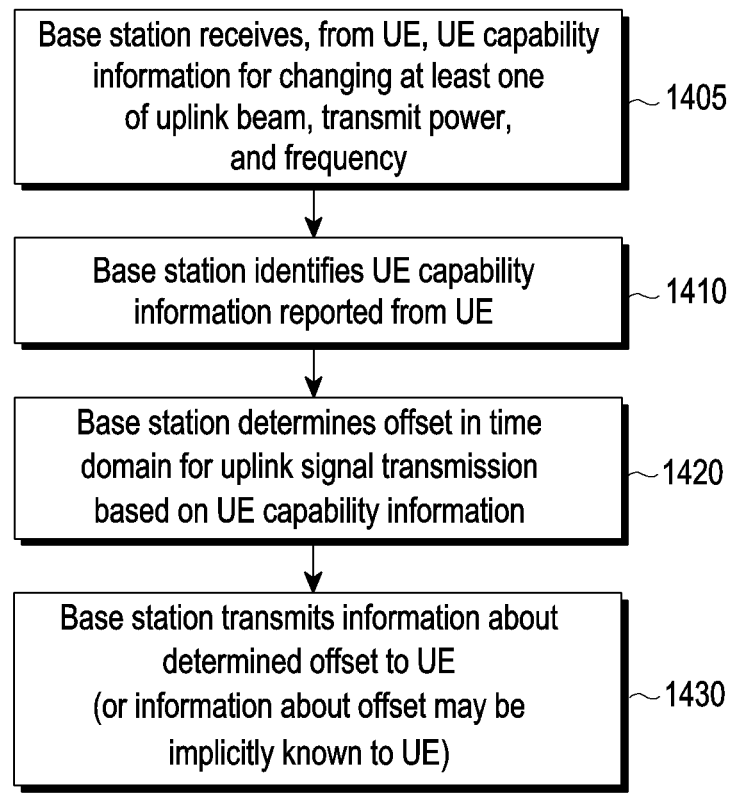
FIG. 14A illustrates a base station method of determining an offset for UL signal transmission according to a UE capability reported by a UE and providing the offset to the UE according to an embodiment.

FIG. 14A is a flowchart illustrating a base station method of determining an offset for UL signal transmission according to UE capability reported by a UE and providing it to the UE according to an embodiment.

The base station may determine an offset based on the UE capability for at least one of the UL beam, the transmit power, or the frequency change reported by the UE as in the above-described embodiments and may explicitly configure or implicitly indicate the determined offset to the UE. The UE may report the UE capability for at least one of a UL beam change, a transmit power change, or a frequency change to the base station and may transmit a UL signal through multiple TRPs according to the offset configured or indicated by the base station.

Specifically, referring to FIG. 14A, in step 1405, the base station receives the UE capability for changing at least one of the UL beam, the transmit power, or the frequency from the UE. The UE may report all or only some of the UE capabilities for each change to the base station as in the schemes described above.

In step 1410, the base station may identify the UE capability reported by the UE.

In step 1420, the base station determines an offset in the time domain for a UL signal transmission based on the reported UE capability. The base station may use one or a combination of options 1 to 7 of the above-described 1-1th embodiment to determine the offset.

In step 1430, the base station transmits, to the UE, information regarding the offset determined for the UE. The information regarding the offset may be explicitly transmitted to the UE or may be implicitly indicated as in the above-described schemes.

Figure 14B:
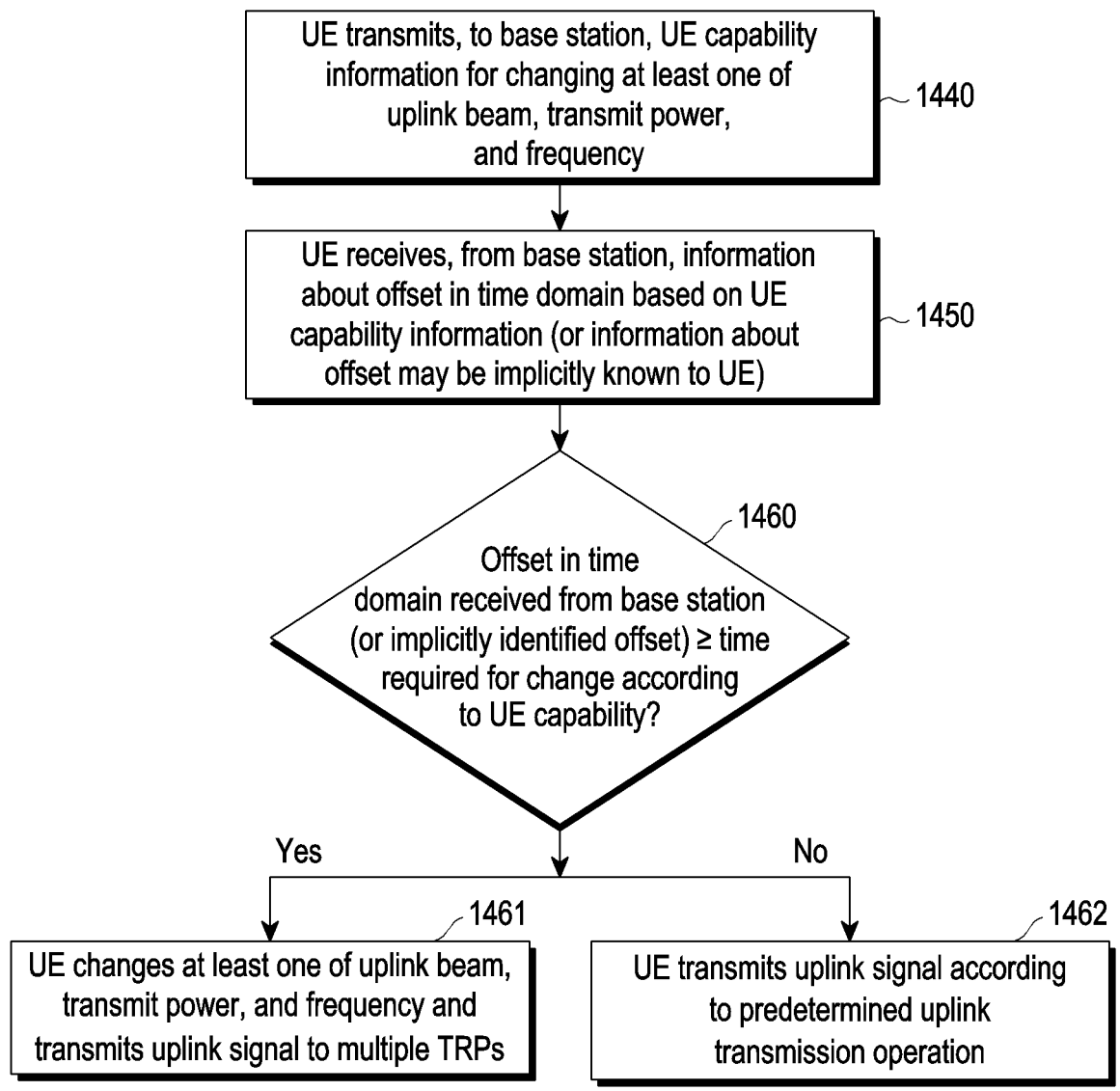
FIGS. 14B and 14C illustrate a UE method of transmitting a UL signal to one or more TRPs based on an offset configured by a base station according to an embodiment.

FIG. 14B is a flowchart illustrating a UE method of transmitting a UL signal to one or more TRPs based on an offset configured by a base station according to an embodiment.

Referring to FIG. 14B, in step 1440, the UE transmits UE capability information for changing at least one of the UL beam, the transmit power, or the frequency to the base station.

In step 1450, the UE receives information regarding the offset in the time domain, based on the UE capability information from the base station (or the UE may be implicitly aware of information regarding the offset by the above-described schemes).

The UE compares the offset with the UE capability in step 1460.

If the offset received from the base station in the time domain (or the offset implicitly identified) is greater than or equal to the time for change according to UE capability in step 1460, the UE changes at least one of the UL beam, the transmit power, or the frequency and transmits the UL signal through multiple TRPs in step 1461. Hereinafter, the plurality of TRPs may be understood as including the base station and at least one other base station (or IAB node) that cooperates with the base station. The UL signal received from the other base station may be transferred to the base station.

If the offset in the time domain received from the base station (or implicitly identified offset) is smaller than the time for change according to the UE capability in step 1460, the UE may transmit the UL signal according to the default UL transmission operation pre-defined/determined by the base station and the UE in step 1462.

Figure 14C:
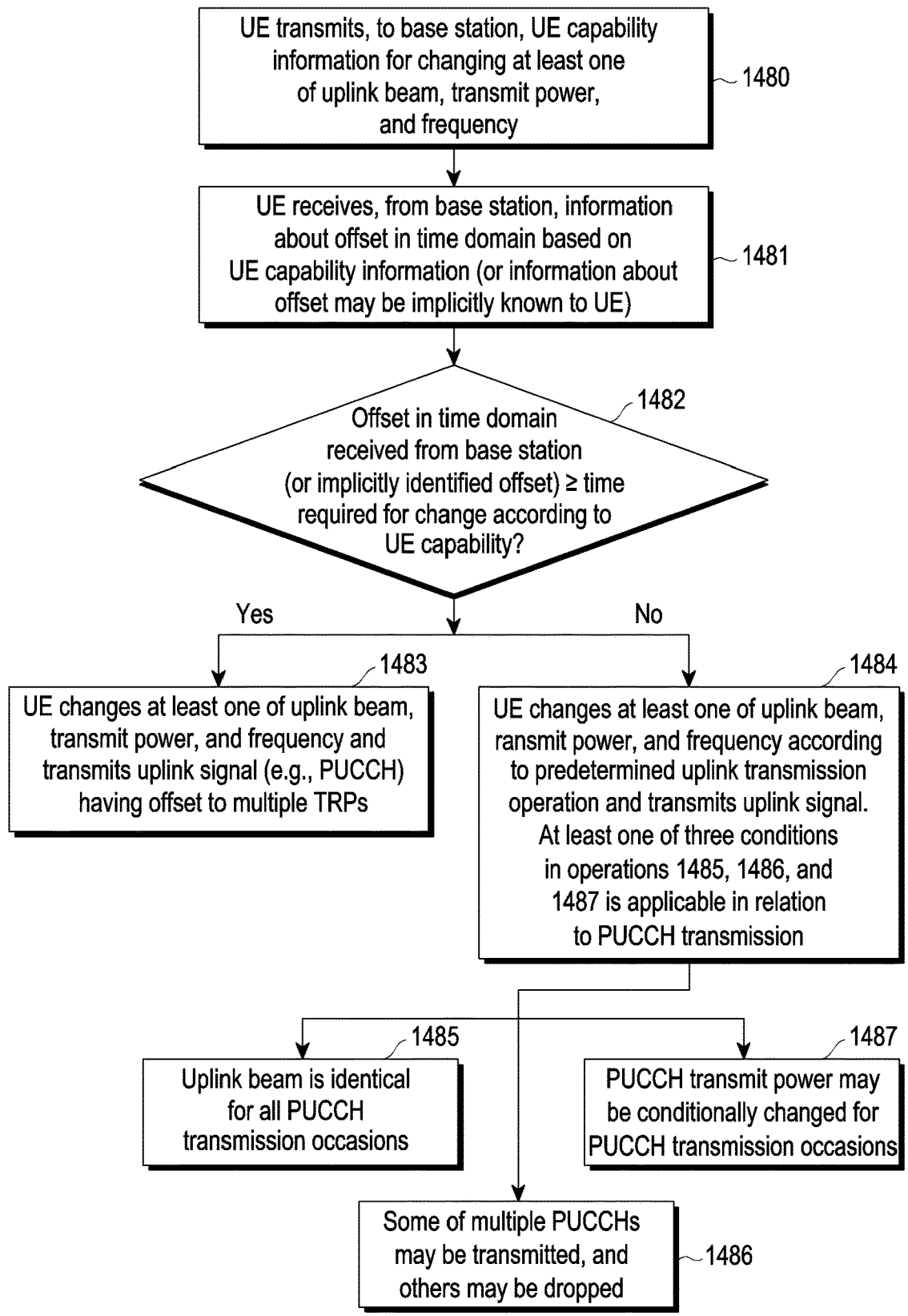

FIG. 14C is a flowchart illustrating a UE method of transmitting a UL signal to one or more TRPs based on an offset configured by a base station according to an embodiment.

Referring to FIG. 14C, steps 1484 to 1487 specifically exemplify the default UL transmission in step 1462 in FIG. 14B.

Additionally, steps 1480 to 1483 of FIG. 14C are the same as steps 1440 to 1461 of FIG. 14B, and a detailed description thereof is omitted.

In step 1484, the UE changes at least one of the UL beam, the transmit power, or the frequency according to a predetermined UL transmission operation (e.g., the default UL transmission operation) and transmits the UL signal. In relation to the PUCCH transmission, at least one of the three conditions exemplified in steps 1485, 1486, and 1487 may be applied. For example, as in step 1485, the UL beam may be the same for all PUCCH transmission occasions, or as in step 1486, some of the plurality of PUCCHs may be transmitted and others may be dropped. Alternatively, as in step 1487, the PUCCH transmit power may be conditionally changed during PUCCH transmission occasions. However, the default UL transmission operation of the disclosure is not limited to the above three conditions.

For example, the default UL transmission operation may include at least one of the method for transmitting it through the same UL beam, the transmit power, and the frequency as the previous UL signal, the method for transmitting the UL signal through the UL beam, the transmit power, and the frequency set as default, the method for conditionally changing the UL beam, the transmit power, and the frequency and then transmitting, the method for applying some changeable configurations and then transmitting, or the method for dropping some symbols or repeated transmission occasions and then transmitting, as described above in connection with the 1-2th embodiment.

The UE capability information in FIGS. 14A to 14C may also include information regarding a panel.

Figure 15A:
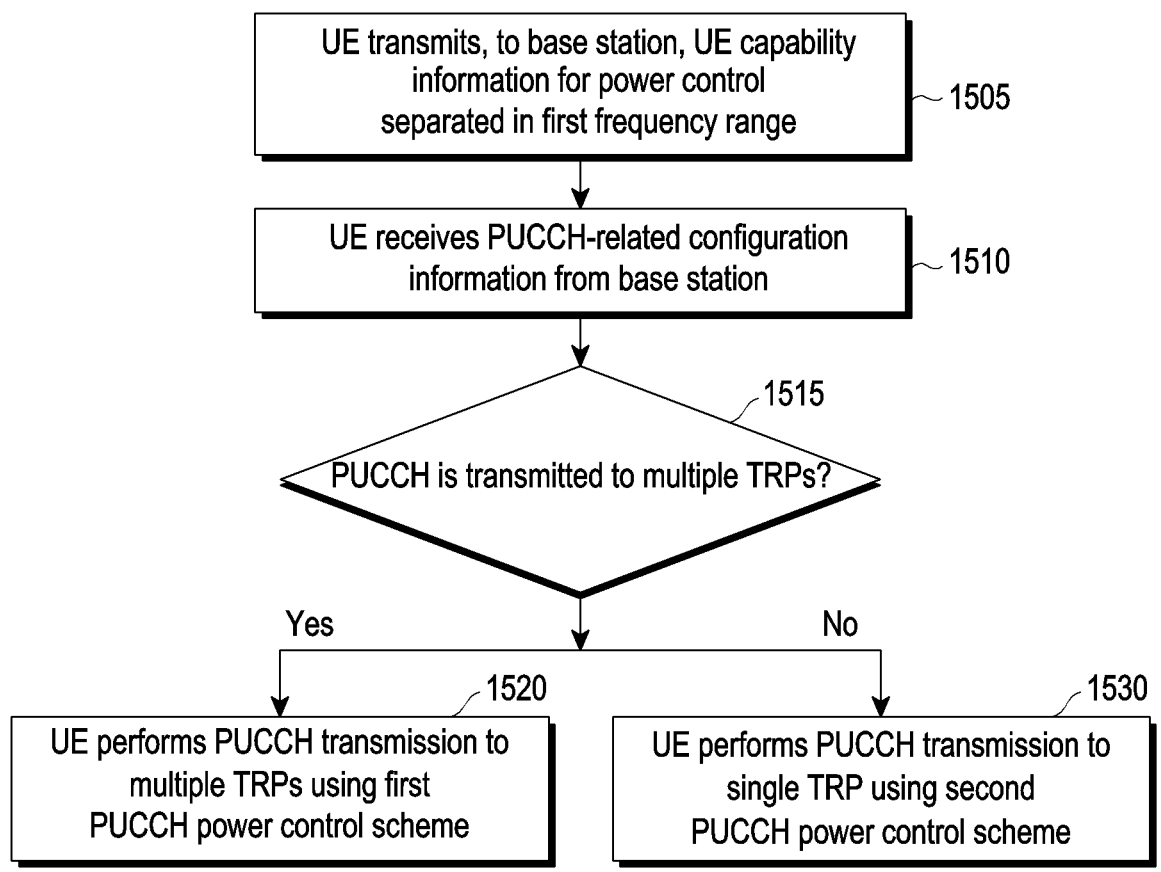
FIG. 15A illustrates a UE method of determining a transmit power for each TRP and transmitting a PUCCH signal to one or more TRPs by a default transmit power control method in FR1 according to an embodiment.

FIG. 15A is a flowchart illustrating a UE method of determining transmit power for each TRP and transmitting a PUCCH signal to one or more TRPs by a default transmit power control method in FR1 according to an embodiment.

Referring to FIG. 15A, in step 1505, the UE reports, to the base station, the UE capability indicating whether transmit power control may be performed for each TRP, as UE capability information for separate power control per TRP in FR1.

In step 1510, the UE receives the higher layer parameter (configuration information) related to PUCCH transmission from the base station.

In step 1515, the UE identifies the condition for transmitting the PUCCH signal through multiple TRPs. Here, the condition for transmitting the PUCCH through multiple TRPs may adopt the condition for transmitting the PUCCH through the plurality of TRPs described above in connection with the 2-1th embodiment.

If, as a result of identification in step 1515, the UE transmits the PUCCH through multiple TRPs in FR1, the UE determines the transmit power for each TRP through the first PUCCH power control scheme (e.g., the enhanced default PUCCH transmit power control method) and applies the determined transmit power to transmit the PUCCH through the multiple TRPs in step 1520. The enhanced default PUCCH transmit power control method may use an enhanced default PUCCH transmit power control method for supporting PUCCH through multiple TRPs as described above in connection with the 2-1th embodiment.

If, as a result of identification in step 1515, the UE transmits the PUCCH through a single TRP in FR1, the UE determines the transmit power according to the second PUCCH power control scheme (e.g., the default transmit power control method in the NR release 15/16 standard) and applies the determined transmit power to transmit the PUCCH through the single TRP in step 1530. The single TRP may be a base station receiving the UE capability information or another base station cooperating with the base station.

Figure 15B:
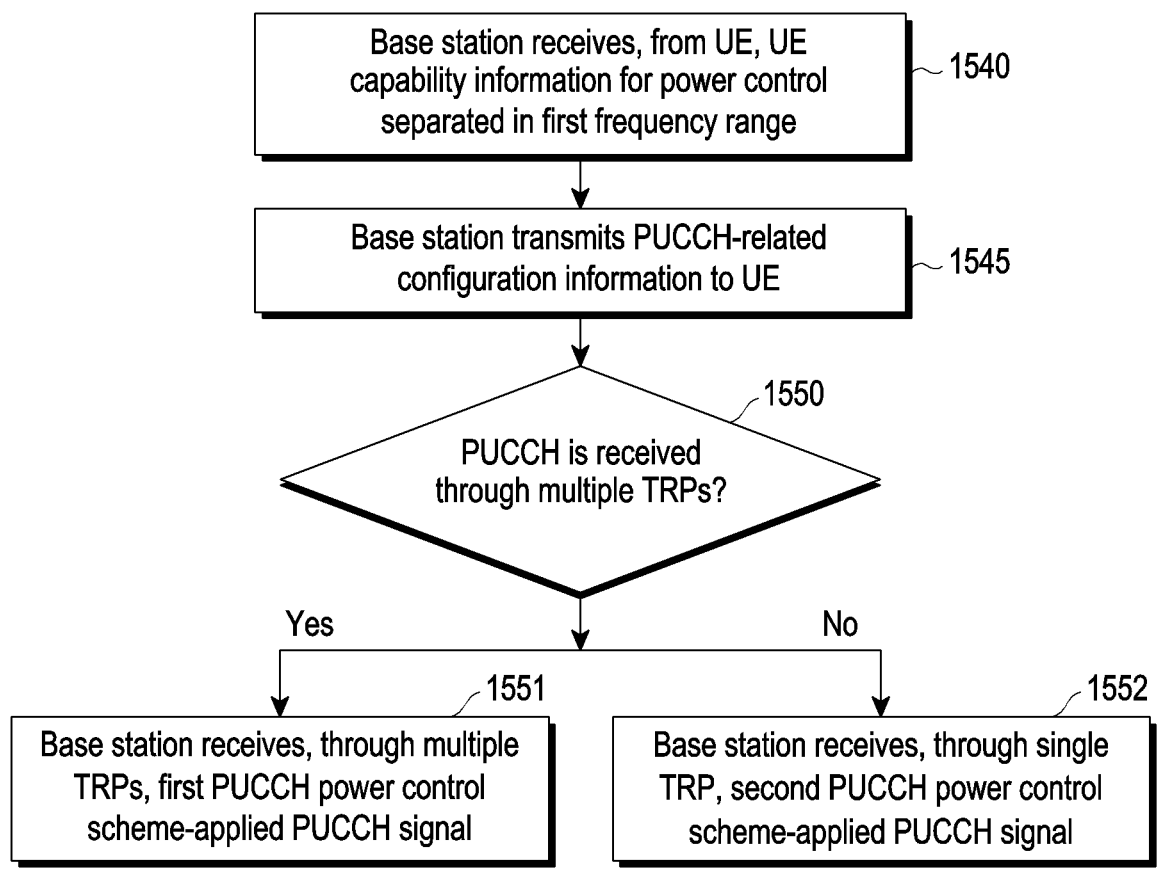
FIG. 15B illustrates a base station method of receiving, through one or more TRPs, a PUCCH, to which a default transmit power control method is applied, in FR1, according to an embodiment.

FIG. 15B is a flowchart illustrating a base station method of receiving, through one or more TRPs, a PUCCH, to which a default transmit power control method is applied, in FR1 according to an embodiment.

Referring to FIG. 15B, in step 1540, the base station receives UE capability information for power control separated for each TRP in the FR1 from the UE.

In step 1545, the base station receiving the UE capability information transmits the PUCCH-related configuration information to the UE.

In step 1550, the base station identifies whether to receive PUCCH (condition) through multiple TRPs based on the PUCCH-related configuration information.

If, as a result of the identification in step 1550, the PUCCH is received through multiple TRPs, the base station receives, through multiple TRPs, the PUCCH signal to which the first PUCCH power control scheme (e.g., the enhanced default PUCCH transmission power control method used in the LTE system) is applied, in step 1551.

If, as a result of the identification in step 1550, the PUCCH is received through a single TRP, the base station receives, through a single TRP, the PUCCH signal to which the second PUCCH power control scheme (e.g., the default transmit power control method used in the NR release 15/16 standard) is applied, in step 1552.

Figure 16A:
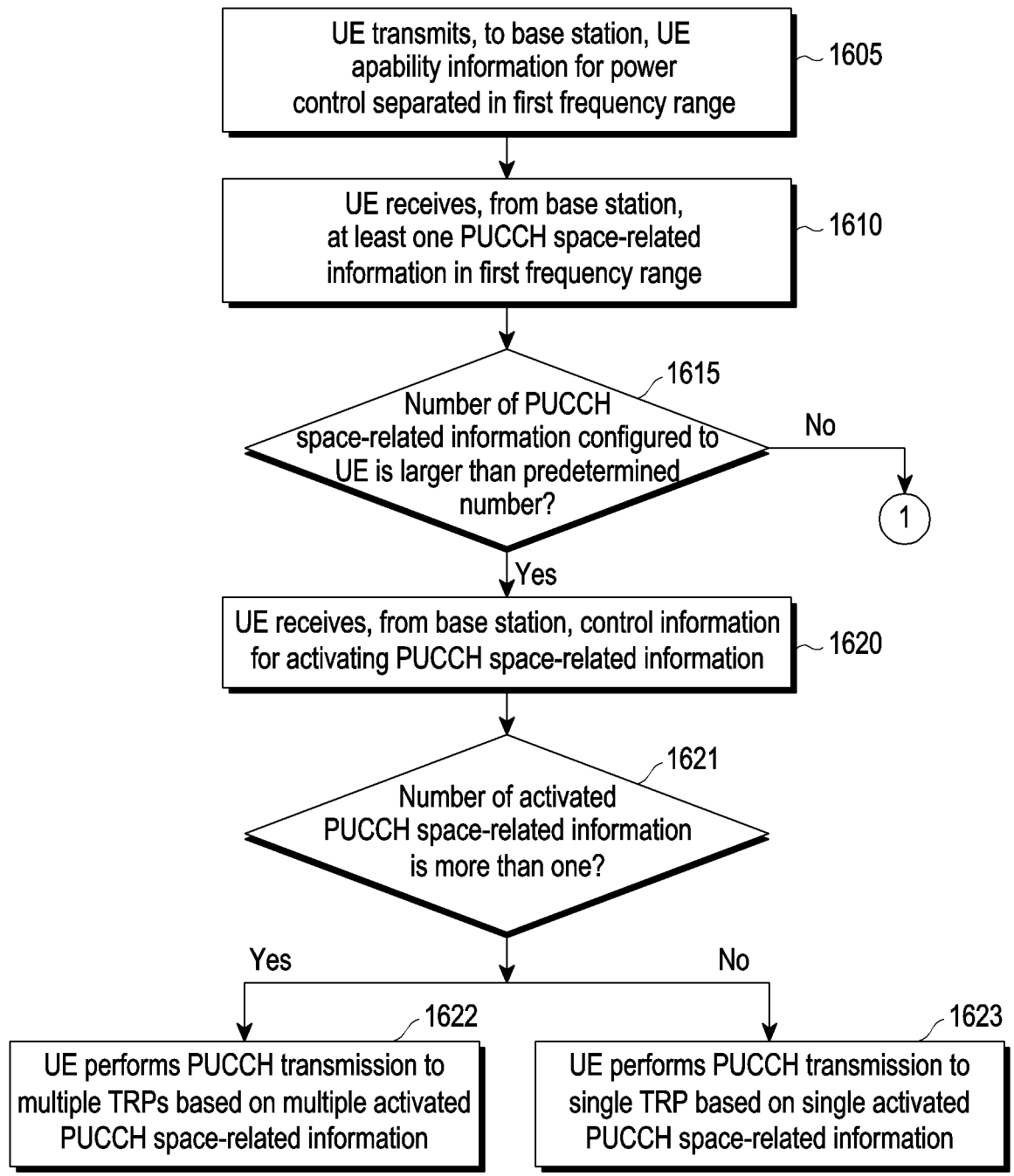
FIGS. 16A and 16B illustrate a UE method of transmitting a PUCCH signal using one or more TRPs using PUCCH-SpatialRelationInfo in FR1 according to an embodiment.
Figure 16B:
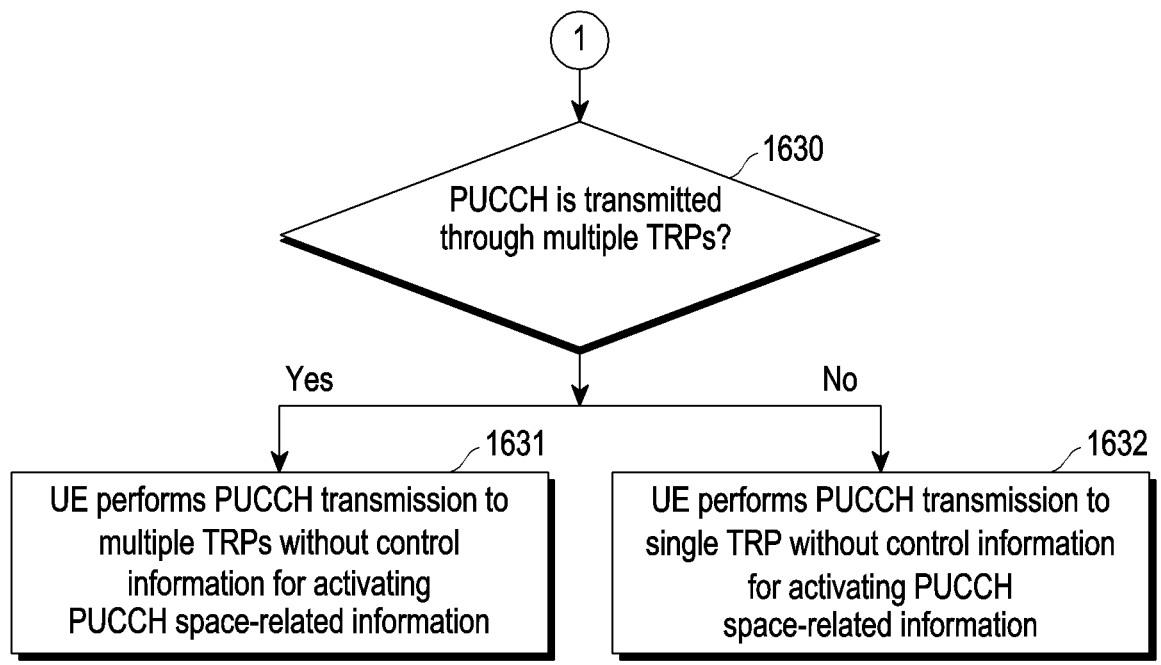

FIGS. 16A and 16B are flowcharts illustrating a UE method of transmitting a PUCCH signal using one or more TRPs using PUCCH-SpatialRelationInfo in FR1 according to an embodiment.

Referring to FIG. 16A, in step 1605, the UE reports, to the base station, the UE capability indicating whether transmit power control may be performed for each TRP, as UE capability information for power control separated for each TRP in FR1.

In step 1610, the UE is configured with the higher layer parameter PUCCH-SpatialRelationInfo (PUCCH space-related information) to support transmit power control for each TRP in FR1, by the base station. The UE may receive at least one PUCCH space-related information.

In step 1615, the UE identifies whether the number of configured PUCCH-SpatialRelationInfos configured to the UE is greater than a predetermined number (e.g., 2 or more).

If the number of configured PUCCH-SpatialRelationInfos is greater than the predetermined number in step 1615, the UE receives control information (e.g., MAC CE command) indicating the activation state of the configured PUCCH-SpatialRelationInfo from the base station in step 1620.

In step 1621, the UE identifies the number of PUCCH-SpatialRelationInfos activated by the control information (e.g., MAC CE).

If a plurality of (e.g., 2 or more) PUCCH-SpatialRelationInfos are activated in step 1621, the UE determines the transmit power of each TRP according to the plurality of PUCCH-SpatialRelationInfos, applies it, and transmits the PUCCH through a plurality of TRPs in step 1622.

If one PUCCH-SpatialRelationInfo is activated in step 1621, the UE determines one transmit power according to one activated PUCCH-SpatialRelationInfo, applies it, and transmits the PUCCH in step 1623.

Referring to FIG. 16B, if the number of PUCCH-SpatialRelationInfos configured to the UE in step 1615 is equal to a predetermined number (e.g., 2 or more), the UE identifies the conditions for transmitting the PUCCH through multiple TRPs described above in connection with the 2-1th embodiment in step 1630. For example, a case where the predetermined number is 2 or more corresponds to a case where the number of TRPs is 2 or more.

As a result of the identification, if the UE transmits the PUCCH through multiple TRPs in step 1630, the UE determines the transmit power of each TRP according to a predetermined number of PUCCH-SpatialRelationInfos without control information (e.g., a MAC CE command) for activation, applies it, and transmits the PUCCH through the multiple TRPs in step 1631.

If, as a result of identification in step 1630, the UE transmits the PUCCH through a single TRP in FR1, the UE determines the transmit power according to the default transmit power control method in the NR release 15/16 standard and applies the determined transmit power to transmit the PUCCH through the single TRP in step 1632.

On the other hand, although not shown in FIG. 16B, if the number of PUCCH-SpatialRelationInfo's configured to the UE is less than a predetermined number (e.g., 2 or more), the UE performs a general PUCCH transmission operation. The general PUCCH transmission operation may be a single TRP PUCCH transmission operation according to 3GPP Release 15/16 procedure.

Figure 16C:
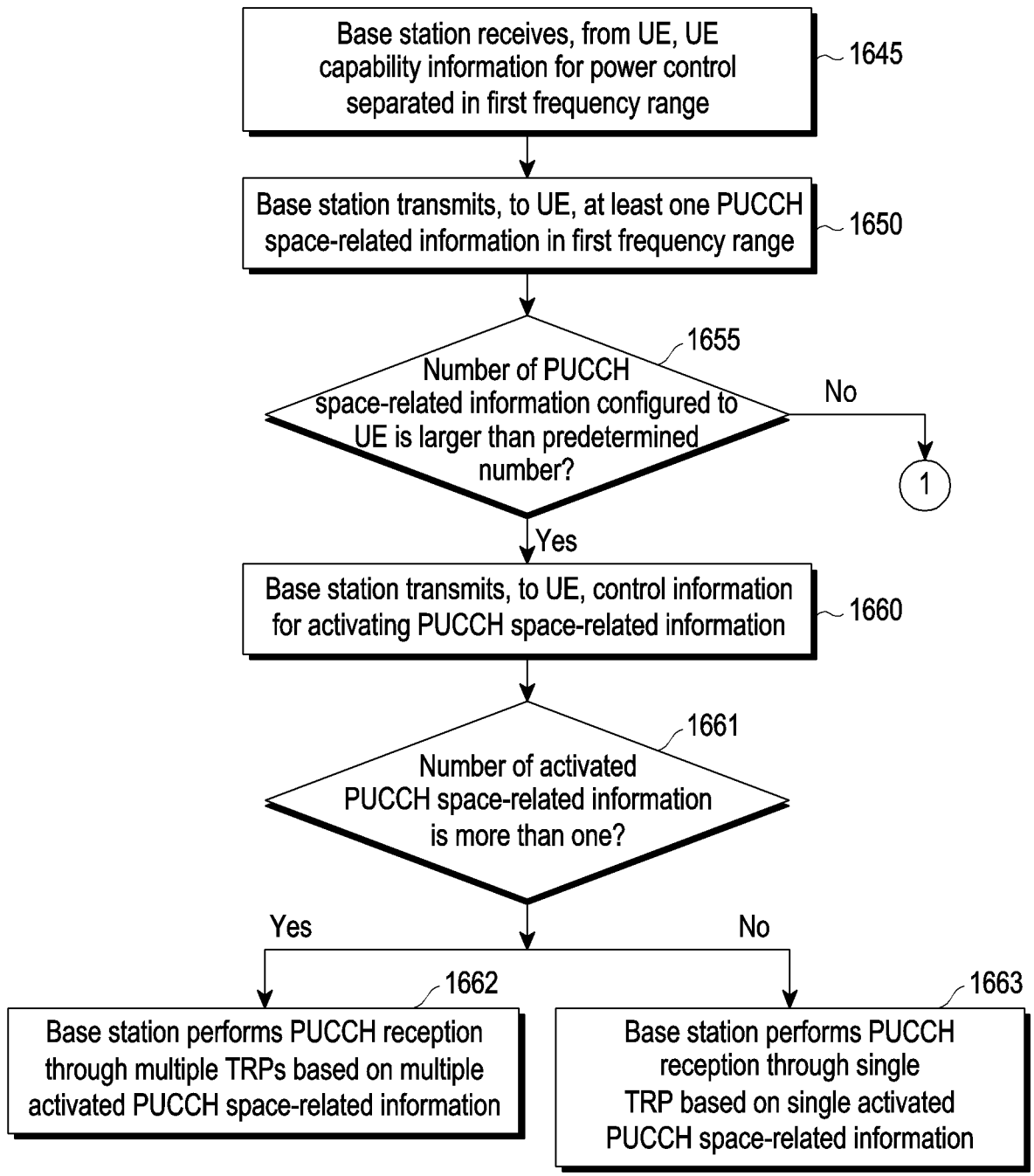
FIGS. 16C and 16D illustrate a base station method of receiving a PUCCH through one or more TRPs using PUCCH-SpatialRelationInfo in FR1 according to an embodiment.
Figure 16D:
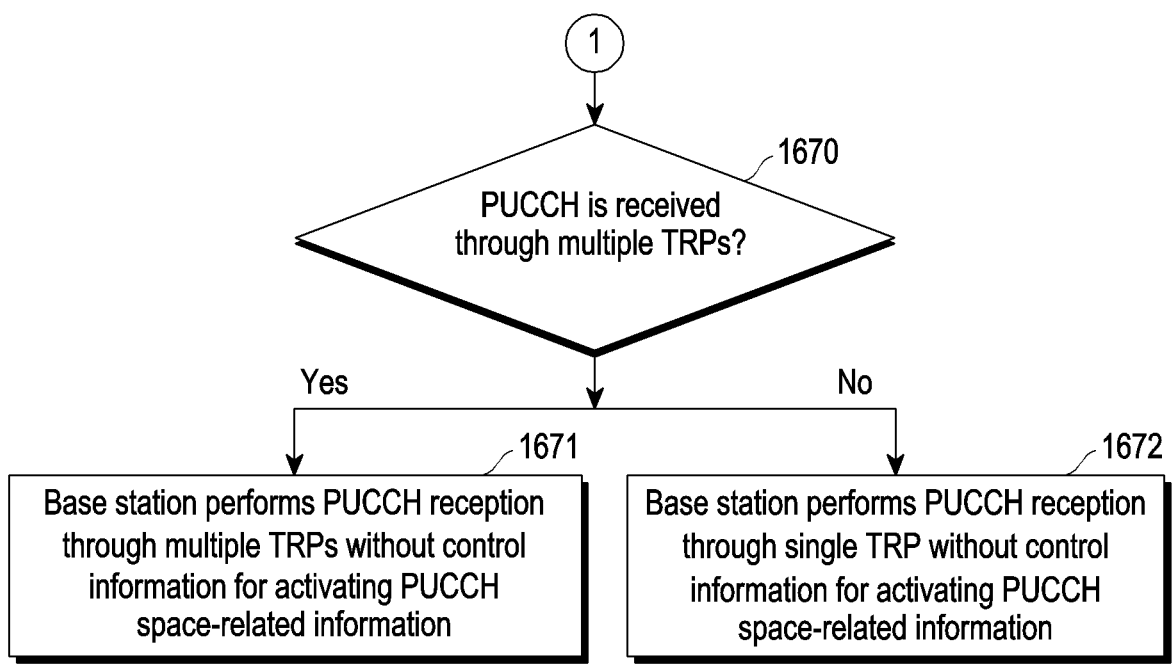

FIGS. 16C and 16D are flowcharts illustrating a base station method of receiving a PUCCH through one or more TRPs using PUCCH-SpatialRelationInfo in FR1 according to an embodiment.

Referring to FIG. 16C, in step 1645, the base station receives UE capability information for power control separated for each TRP in FR1 from the UE.

In step 1650, the base station transmits at least one PUCCH-SpatialRelationInfo (PUCCH space-related information) to the UE in FR1.

In step 1655, the base station identifies whether the number of PUCCH space-related information configured to the UE is greater than a predetermined number (e.g., 2 or more).

As a result of the identification, if the number of PUCCH space-related information configured to the UE is greater than the predetermined number in step 1655, the base station transmits control information (e.g., MAC CE) for activating the PUCCH space-related information to the UE in step 1660.

In step 1661, the base station identifies whether the number of activated PUCCH space-related information is greater than one.

If the number of activated PUCCH space-related information is greater than one in step 1661, the base station performs PUCCH reception through multiple TRPs based on multiple activated PUCCH space-related information in step 1662.

However, if the number of activated PUCCH space-related information is one in step 1661, the base station performs PUCCH reception through a single TRP based on one activated PUCCH space-related information in step 16663.

Referring to FIG. 16D, if the number of PUCCH space-related information configured to the UE in step 1655 is equal to a predetermined number (e.g., 2 or more), the base station identifies the condition for receiving the PUCCH through multiple TRPs described above in connection with the 2-1th embodiment in step 1670.

On the other hand, although not shown in FIG. 16D, if the number of PUCCH space-related information configured to the UE is less than a predetermined number (e.g., 2 or more), the base station performs a general PUCCH reception operation. The general PUCCH reception operation may be a single TRP PUCCH reception operation according to 3GPP Release 15/16 procedure.

In the case of a PUCCH reception through multiple TRPs in step 1670, the base station performs PUCCH reception through multiple TRPs without control information for activating the PUCCH space-related information in step 1671.

In the case of a PUCCH reception through a single TRP in step 1670, the base station performs PUCCH reception through a single TRP without control information for activating PUCCH space-related information in step 1672.

Figure 17A:
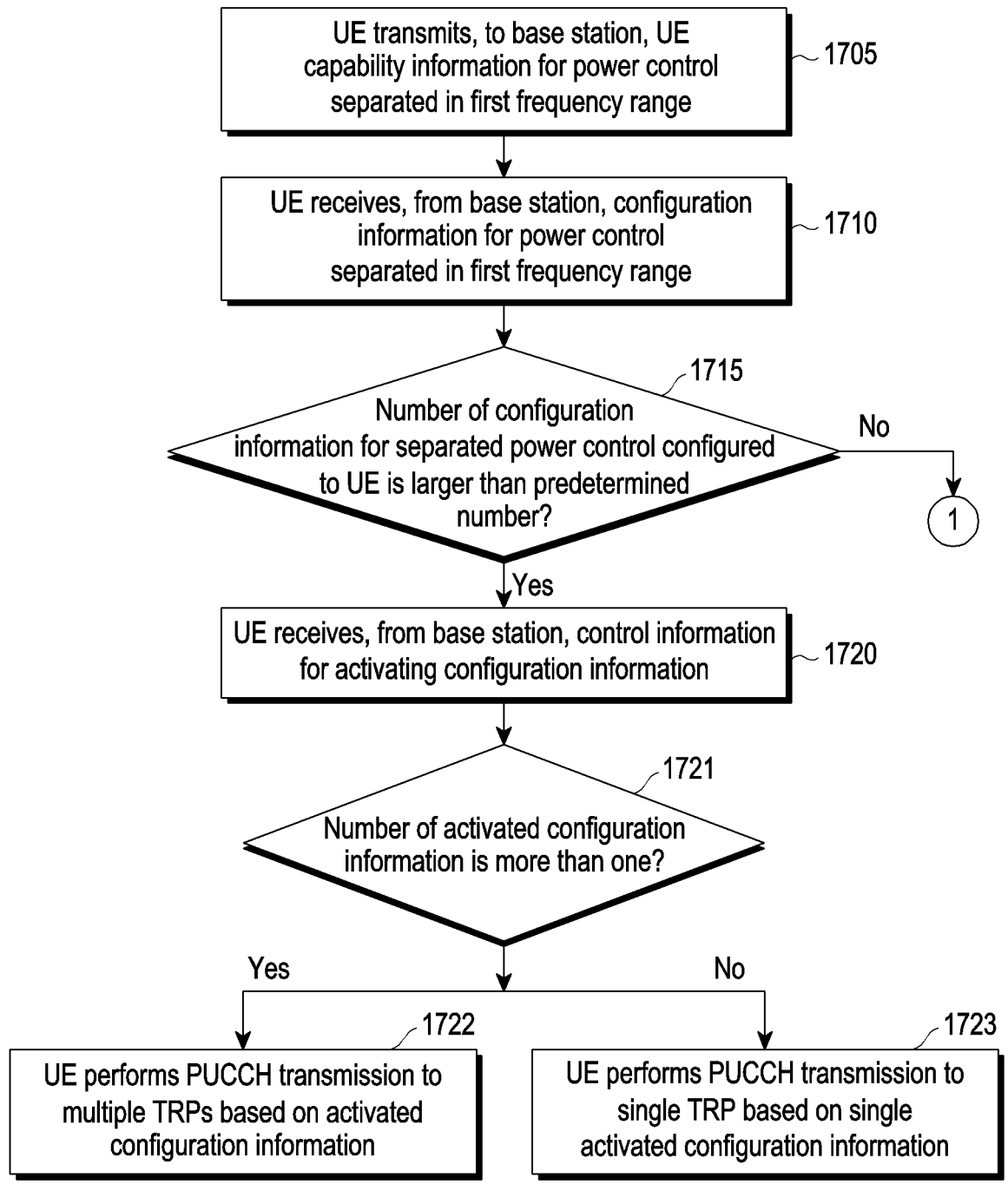
FIGS. 17A and 17B illustrate a UE method of transmitting a PUCCH signal to one or more TRPs using configuration information for controlling divided power control in FR1 according to an embodiment.
Figure 17B:
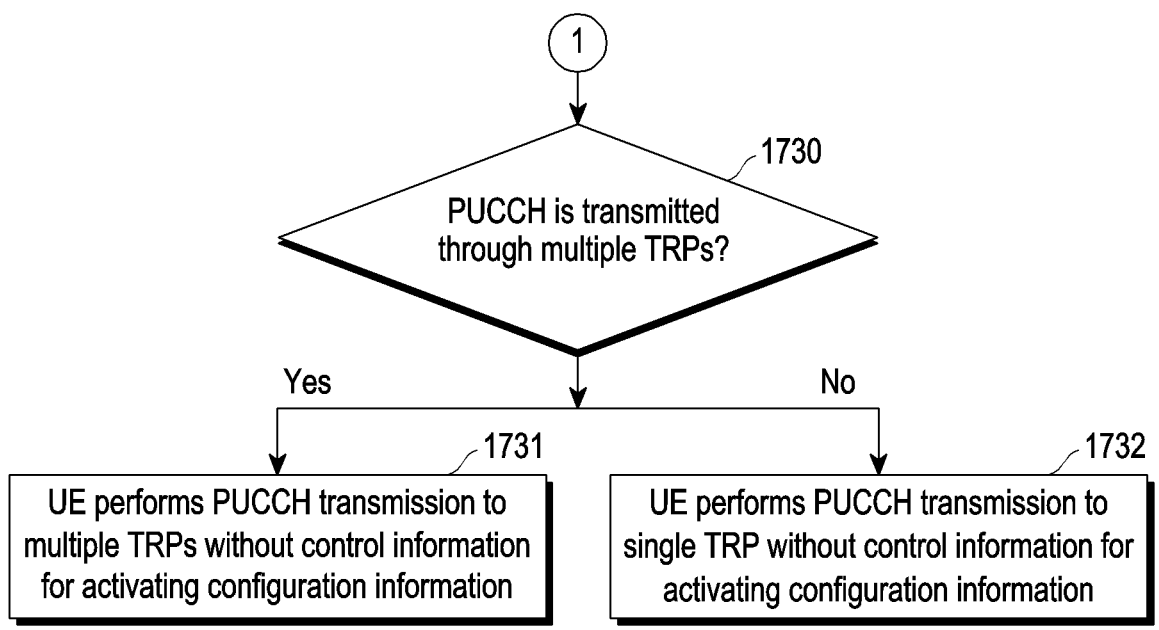

FIGS. 17A and 17B are flowcharts illustrating a UE method of transmitting a PUCCH signal to one or more TRPs using configuration information for controlling divided power control in FR1 according to an embodiment. Specifically, FIGS. 17A and 17B illustrate a method for transmitting the PUCCH through multiple TRPs using a new higher layer parameter for controlling transmit power for each TRP in FR1 and control information (MAC CE command) for activating the new higher layer parameter.

Referring to FIG. 17A, in step 1705, the UE reports, to the base station, the UE capability indicating whether the UE supports a transmit power control for each TRP, as UE capability information for power control separated for each TRP in FR1.

In step 1710, the UE is configured with a new higher layer parameter (configuration information for power control separated for each TRP) to support transmit power control for each TRP in FR1, by the base station. The UE may receive at least one configuration information. The new higher layer parameter may be defined as 'PUCCH-PowerControlInfo' as described above in connection with the detailed 2-2-2th embodiment.

In step 1715, the UE identifies whether the number of configured new higher layer parameters PUCCH-PowerControlInfos is greater than a predetermined number (e.g., 2 or more).

If the number of configured PUCCH-PowerControlInfos is greater than the predetermined number in step 1715, the UE receives control information (e.g., MAC CE command)

indicating the activation state of the configured PUCCH-PowerControlInfo from the base station in step 1720.

In step 1721, the UE identifies whether the number of PUCCH-PowerControlInfos activated by a MAC CE is greater than one.

If a plurality of (e.g., 2 or more) PUCCH-PowerControlInfos are activated in step 1721, the UE determines the transmit power of each TRP according to the plurality of PUCCH-PowerControlInfos, applies it, and transmits the PUCCH through a plurality of TRPs in step 1722. However, if one PUCCH-PowerControlInfo is activated in step 1721, the UE determines one transmit power according to one activated PUCCH-PowerControlInfo, applies it, and transmits the PUCCH in step 1723.

Referring to FIG. 17B, if the number of PUCCH-PowerControlInfos configured to and identified by the UE in step 1715 is equal to a predetermined number (e.g., 2 or more), the UE identifies the conditions for transmitting the PUCCH through multiple TRPs described above in connection with the 2-1th embodiment in step 1730. For example, a case where the predetermined number is 2 or more corresponds to a case where the number of TRPs is 2 or more.

As a result of the identification, if the UE transmits the PUCCH through multiple TRPs in step 1730, the UE determines the transmit power of each TRP according to a predetermined number of PUCCH-PowerControlInfos without control information (e.g., MAC CE command), applies it, and transmits the PUCCH through the multiple TRPs in step 1731.

If, as a result of identification in step 1730, the UE transmits the PUCCH through a single TRP in FR1, the UE determines the transmit power according to the default transmit power control method in the NR release 15/16 standard and applies the determined transmit power to transmit the PUCCH through the single TRP in step 1732.

On the other hand, although not shown in FIG. 17B, if the number of PUCCH-PowerControlInfos configured to the UE is less than a predetermined number (e.g., 2 or more), the UE performs a general PUCCH transmission operation. The general PUCCH transmission operation may be a single TRP PUCCH transmission operation according to 3GPP Release 15/16 procedure.

Figure 17C:
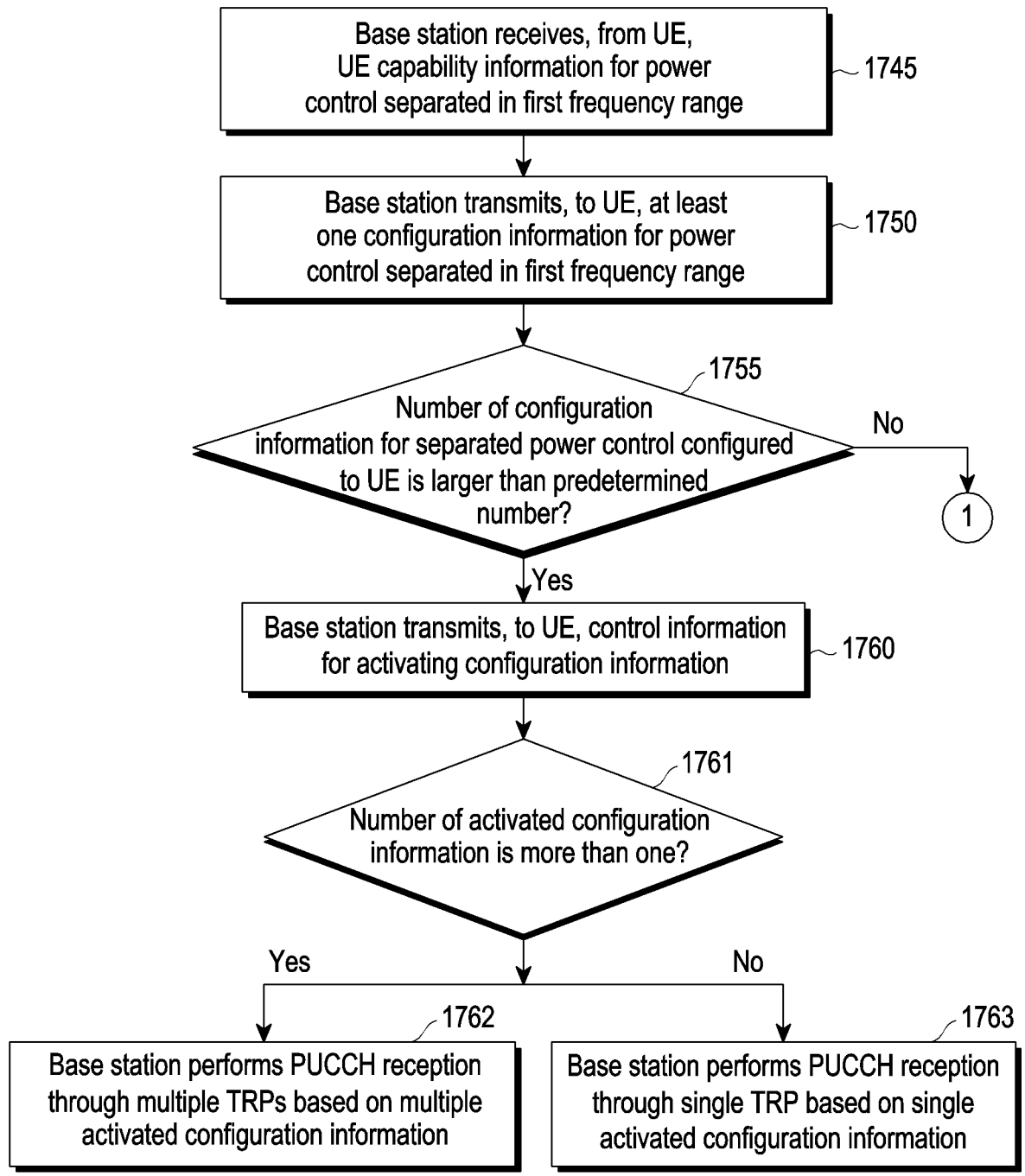
FIGS. 17C and 17D illustrate a base station method of receiving a PUCCH signal through one or more TRPs using configuration information for controlling divided power control in FR1 according to an embodiment.
Figure 17D:
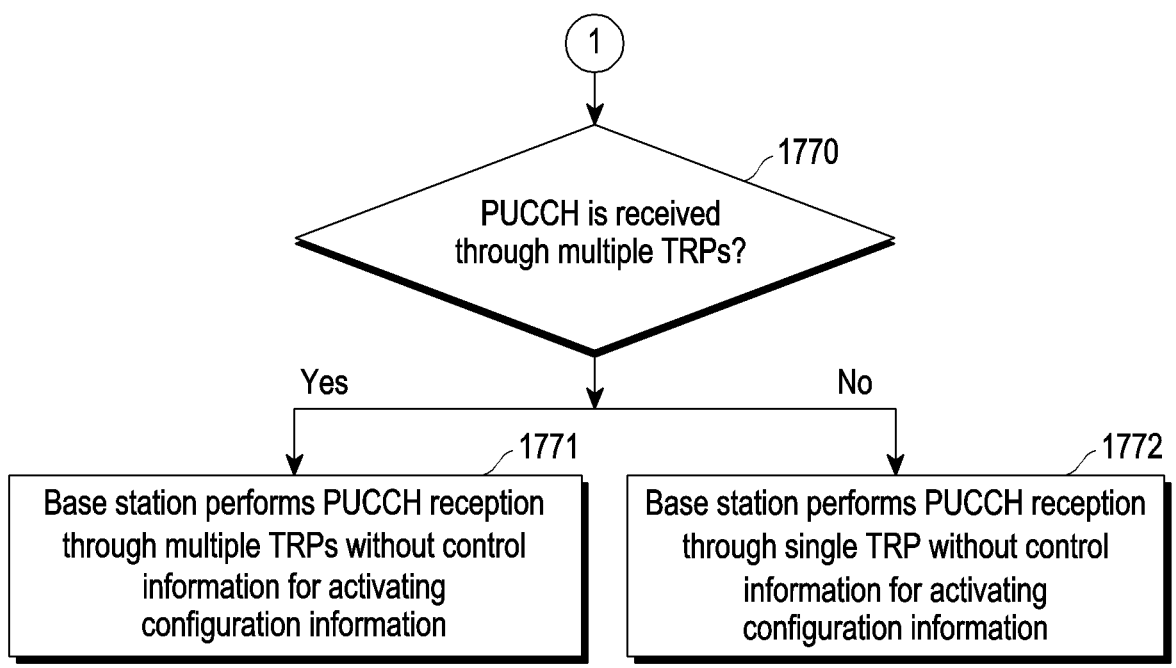

FIGS. 17C and 17D are flowcharts illustrating a base station method of receiving a PUCCH signal through one or more TRPs using configuration information for controlling divided power control in FR1 according to an embodiment.

Referring to FIG. 17C, in step 1745, the base station receives UE capability information for power control separated for each TRP in FR1 from the UE.

In step 1750, the base station transmits, to the UE, at least one PUCCH-PowerControlInfo (configuration information) for power control separated for each TRP in FR1.

In step 1755, the base station identifies whether the number of configuration information for separated power control configured to the UE is greater than a predetermined number (e.g., 2 or more).

As a result of the identification, if the number of configuration information for separated power control configured to the UE is greater than the predetermined number in step 1755, the base station transmits control information (e.g., a MAC CE) for activating the configuration information to the UE in step 1760.

In step 1761, the base station identifies whether the number of activated configuration information is greater than one.

If the number of activated configuration information is greater than one (e.g., two or more) in step 1761, the base station performs a PUCCH reception through multiple TRPs based on multiple activated configuration information in step 1762.

If the number of activated configuration information is one in step 1761, the base station performs a PUCCH reception through a single TRP based on one activated configuration information in step 1763.

Referring to FIG. 17D, if the number of PUCCH-PowerControlInfo (configuration information) configured to the UE in step 1755 is equal to a predetermined number (e.g., 2 or more), the base station identifies the condition for receiving the PUCCH through multiple TRPs described above in connection with the 2-1th embodiment in step 1770. For example, a case where the predetermined number is 2 or more corresponds to a case where the number of TRPs is 2 or more.

In the case of a PUCCH reception through multiple TRPs in step 1770, the base station performs a PUCCH reception through multiple TRPs without control information for activating the configuration information in step 1771. However, in the case of a PUCCH reception through a single TRP in step 1770, the base station performs PUCCH reception through a single TRP without control information for activating configuration information in step 1772.

On the other hand, although not shown in FIG. 17D, if the number of the configuration information configured to the UE is less than a predetermined number (e.g., 2 or more), the base station performs a general PUCCH reception operation. The general PUCCH reception operation may be a single TRP PUCCH reception operation according to 3GPP Release 15/16 procedure.

Figure 18A:
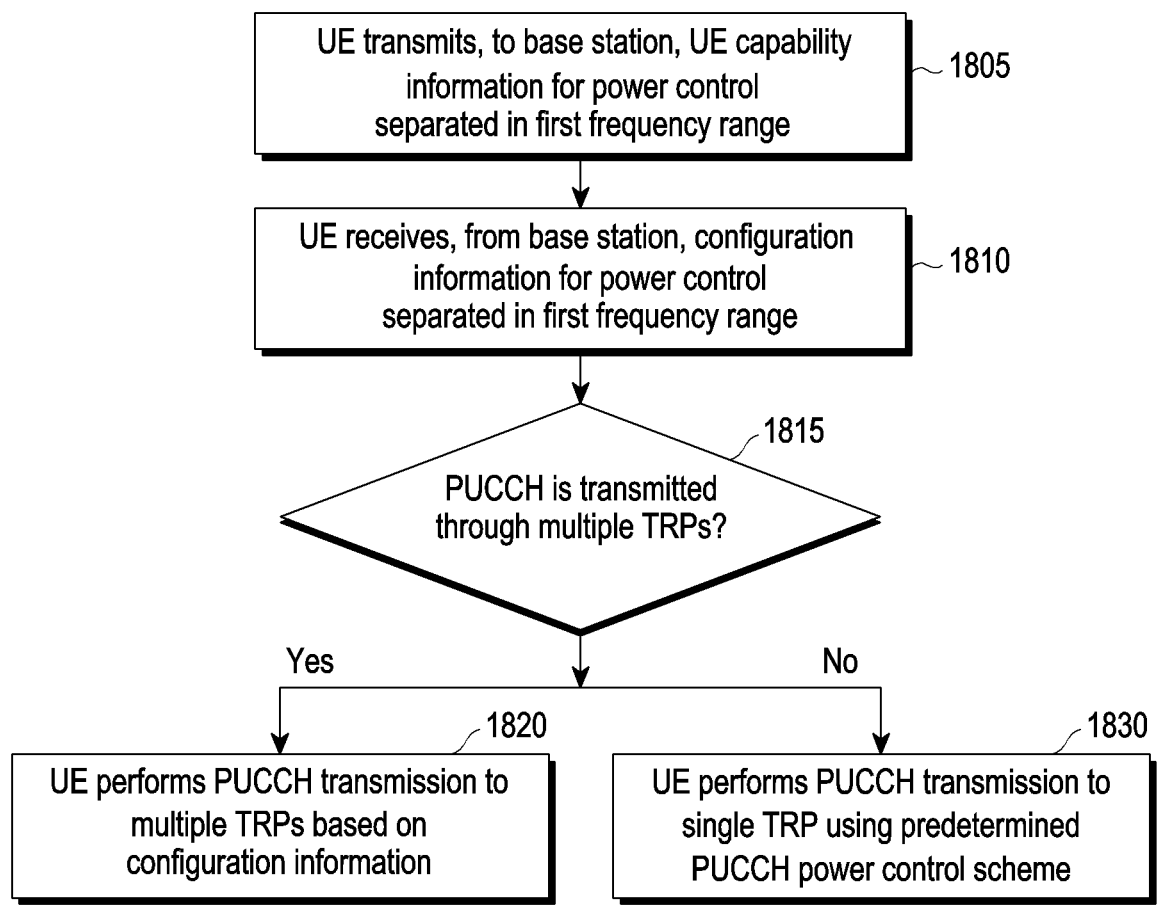
FIG. 18A illustrates a UE method of transmitting a PUCCH signal to one or more TRPs using configuration information for controlling divided power control in FR1 according to an embodiment.

FIG. 18A is a flowchart illustrating a UE method of transmitting a PUCCH signal to one or more TRPs using configuration information for controlling divided power control in FR1 according to an embodiment. Specifically, FIG. 8A illustrates a method for configuring a new higher layer parameter for controlling transmit power for each TRP in FR1 and transmitting PUCCH through multiple TRPs without signaling control information (MAC CE command) for activation is performed.

Referring to FIG. 18A, in step 1805, the UE reports, to the base station, the UE capability indicating whether a transmit power control may be performed for each TRP, as UE capability information for power control separated for each TRP in FR1.

In step 1810, the UE receives a new higher layer parameter (configuration information for power control separated for each TRP) to support transmit power control for each TRP in FR1, from the base station. The new higher layer parameter may be defined, e.g., as 'PUCCH-PowerControlInfo-r17' as described above in connection with the detailed 2-2-3th embodiment. The new higher layer parameter PUCCH-PowerControlInfo-r17 may include two or more of each parameter for a transmit power control for each TRP (refer to Table 34), and only one new higher layer parameter PUCCH-PowerControlInfo-r17 is configured to the UE.

In step 1815, the UE identifies a condition for transmitting the PUCCH through the plurality of TRPs described above in connection with the 2-1th embodiment.

If, as a result of the identification in step 1815, the UE transmits PUCCH through multiple TRPs, the UE determines the transmit power according to the parameter for a transmit power control for each TRP in the new higher layer parameter PUCCH-PowerControlInfo-r17, applies it, and transmits the PUCCH through the multiple TRPs in step 1820.

If, as a result of identification in step 1815, the UE transmits the PUCCH through a single TRP, the UE determines the transmit power according to a predetermined PUCCH power control scheme (e.g., the default transmit power control method in the NR release 15/16 standard) and applies the determined transmit power to transmit the PUCCH through the single TRP in step 1830.

Figure 18B:
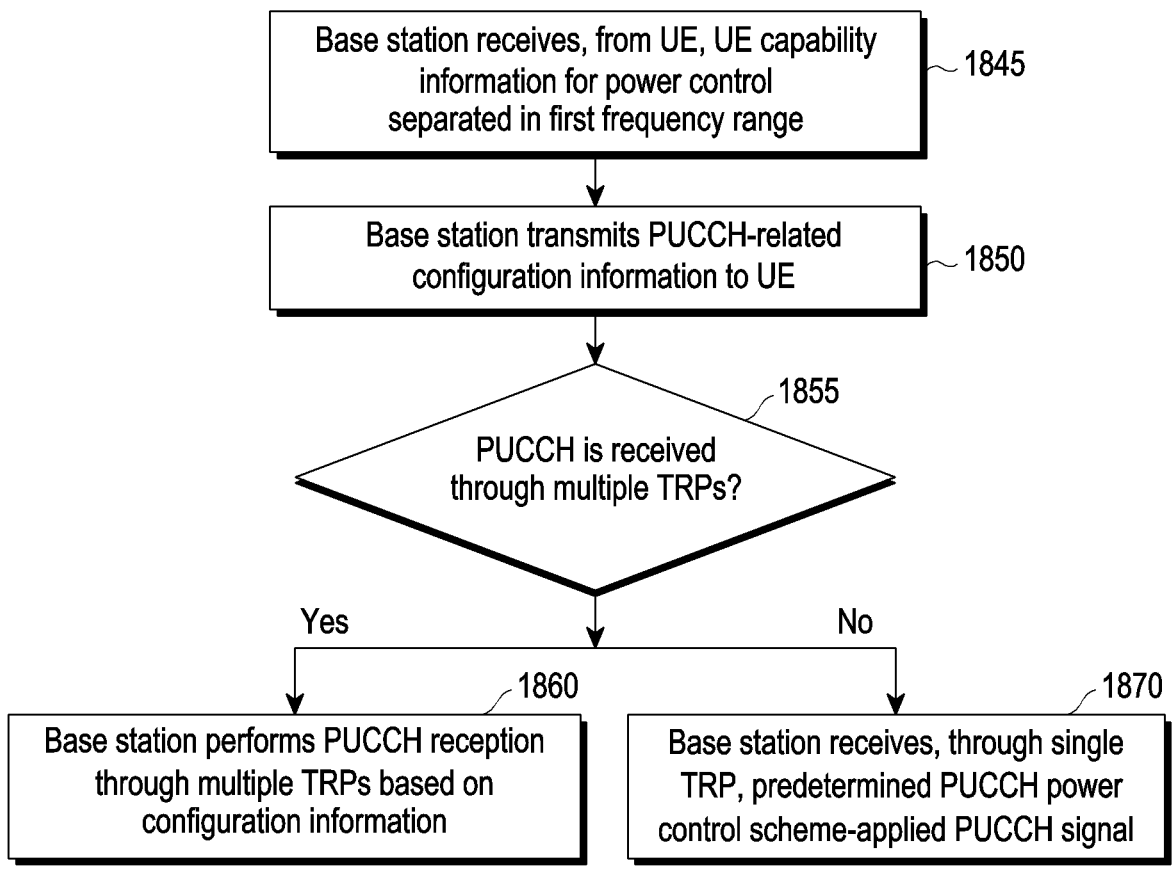
FIG. 18B illustrates a base station method of receiving a PUCCH signal through one or more TRPs using configuration information for controlling divided power control in FR1 according to an embodiment.

FIG. 18B is a flowchart illustrating a base station method of receiving a PUCCH signal through one or more TRPs using configuration information for controlling divided power control in FR1 according to an embodiment.

Referring to FIG. 18B, in step 1845, the base station receives UE capability information for power control separated for each TRP in FR1 from the UE.

In step 1850, the base station transmits, to the UE, configuration information (e.g., PUCCH-PowerControlInfo-r17) for power control separated for each TRP in FR1. The PUCCH-PowerControlInfo-r17 may include two or more of each parameter for transmit power control for each TRP (refer to Table 34), and only one is configured to the UE.

In step 1855, the base station identifies a condition for receiving the PUCCH through multiple TRPs described above in connection with the 2-1th embodiment. As a result of the identification in step 1855, if the UE receives the PUCCH through multiple TRPs, the base station performs PUCCH reception through multiple TRPs based on the configuration information in in step 1860. However, if it is identified that the base station receives the PUCCH through a single TRP in step 1855, the base station receives, through a single TRP, the PUCCH signal to which a predetermined PUCCH power control scheme (e.g., the default transmit power control method used in the NR release 15/16 standard) is applied, in step 1870.

Figure 19A:
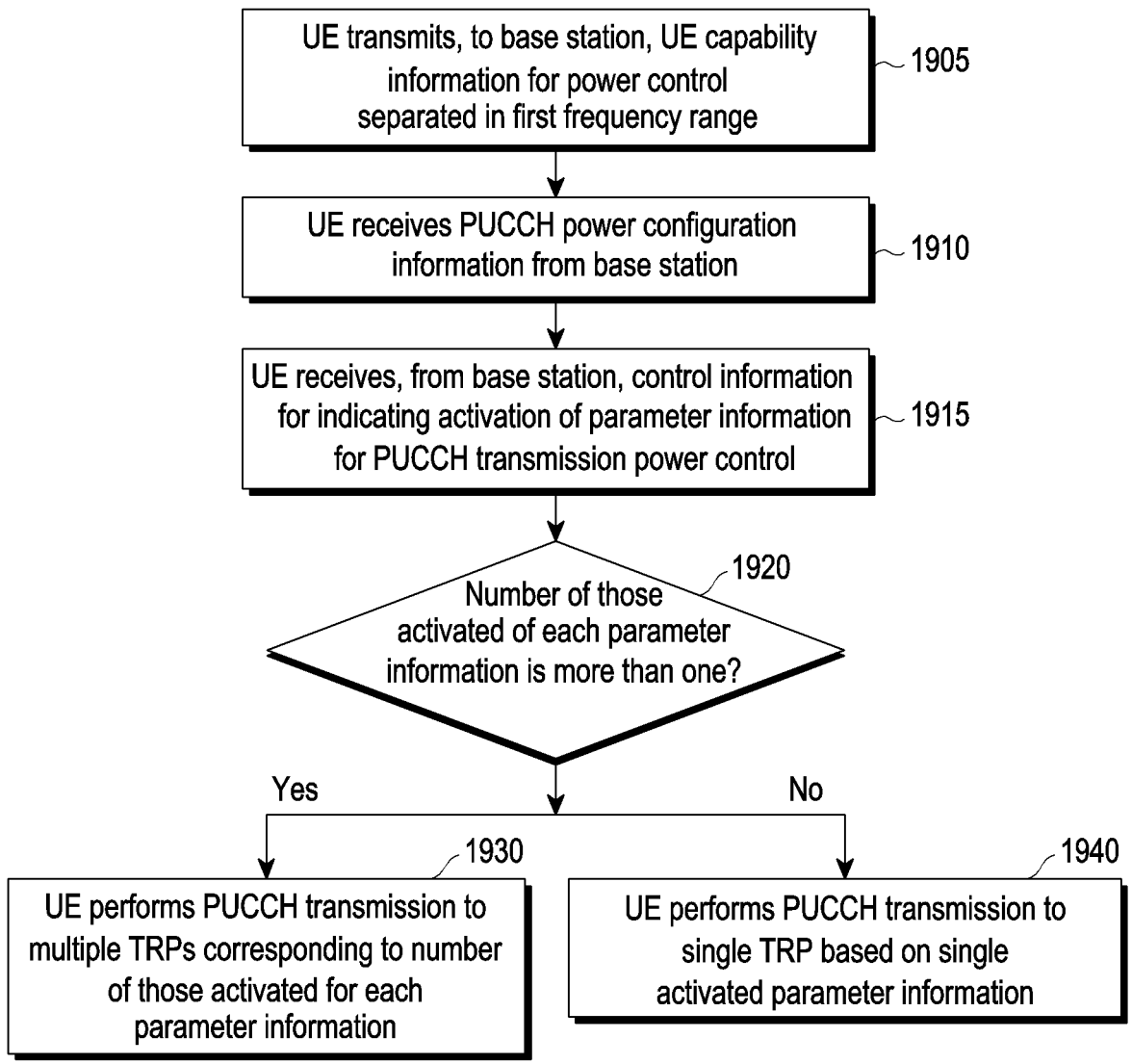
FIG. 19A illustrates a UE method of transmitting a PUCCH signal to one or more TRPs using PUCCH power configuration information and control information in FR1 according to an embodiment.

FIG. 19A is a flowchart illustrating a UE method of transmitting a PUCCH signal to one or more TRPs using PUCCH power configuration information and control information in FR1 according to an embodiment. Specifically, FIG. 19A illustrates a method of transmitting the PUCCH through a plurality of TRPs using the new MAC CE of FIG. 13A or 13B indicating the activation state of the parameter for PUCCH transmit power control in FR1 is performed.

Referring to FIG. 19A, in step 1905, the UE reports, to the base station, the UE capability indicating whether transmit power control may be performed for each TRP, as UE capability information for power control separated for each TRP in FR1.

In step 1910, the UE receives higher layer configuration information (e.g., PUCCH-PowerControl) for a PUCCH power control (hereinafter, PUCCH power configuration information) from the base station. The PUCCH power configuration information may include a plurality of parameter information as set forth in Table 29 above.

In step 1915, the UE receives, from the base station, control information (MAC CE command) for indicating the activation state of parameter information (e.g., ClosedLoop-Index, PathlossReferenceRS-Id, and/or P0-PUCCH-Id) for a PUCCH transmit power control. In this case, the control information (e.g., a MAC CE) may be configured in the format as in the example of FIG. 13A or 13B to indicate parameter information for determining the PUCCH transmit power to each TRP.

In step 1920, the UE identifies the number of activated parameter information for each parameter information (e.g., ClosedLoopIndex, PathlossReferenceRS-Id, and P0-PUCCH-Id). FIGS. 13A and 13B illustrate two activated states for each parameter information (e.g., ClosedLoopIndex, PathlossReferenceRS-Id, and P0-PUCCH-Id). For example, the activated parameter information denoted by reference numbers 1320, 1321, and 1322 may be applied to PUCCH transmission through TRP #1, and the activated parameter information denoted by reference numbers 1330, 1331, and 1332 may be applied to PUCCH transmission through TRP #2. As such, the UE may identify the number of those activated for each parameter information (corresponding to the number of TRPs through which the PUCCH is transmitted) based on the control information. FIG. 13A or 13B exemplify a case where the number of those activated for each parameter information is two for convenience, but the number of activated parameter information may be two or more.

If each parameter information is activated through two or more MAC CEs in step 1920, the UE determines the PUCCH transmit power for each TRP according to two or more activated parameter information, applies the determined PUCCH transmit power, and transmits the PUCCH through multiple TRPs corresponding to the number of those activated for each parameter information in step 1930. However, if only one parameter information is activated through MAC CE in step 1920, the UE determines one PUCCH transmit power according to one activated parameter information and applies it to transmit PUCCH through a single TRP in step 1940.

Figure 19B:
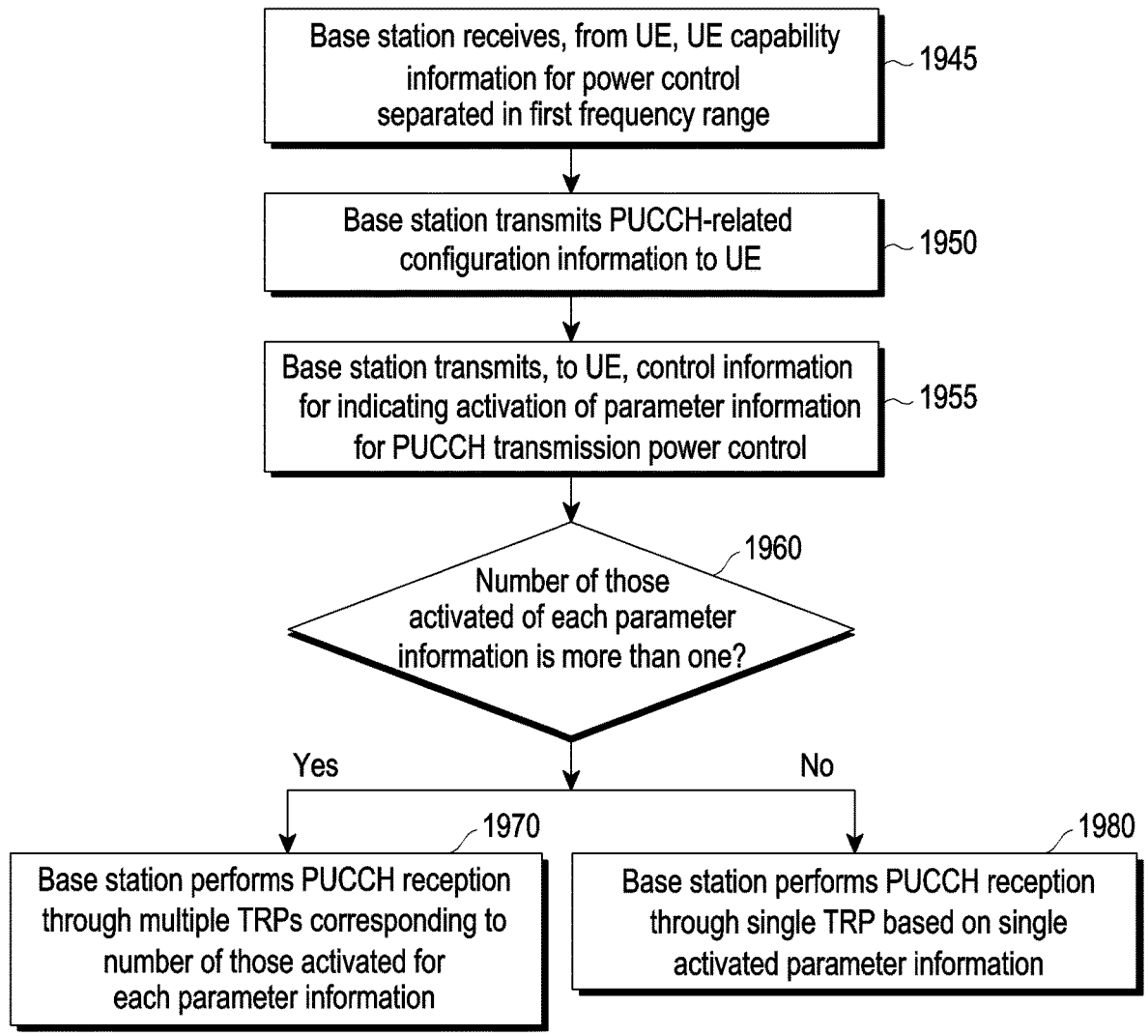
FIG. 19B illustrates a base station method of receiving a PUCCH signal through one or more TRPs using PUCCH power configuration information and control information in FR1 according to an embodiment.

FIG. 19B is a flowchart illustrating a base station method of receiving a PUCCH signal through one or more TRPs using PUCCH power configuration information and control information in FR1 according to an embodiment.

Referring to FIG. 19B, in step 1945, the base station receives UE capability information for power control separated for each TRP in FR1 from the UE.

In step 1950, the base station transmits the PUCCH power configuration information (e.g., PUCCH-PowerControl) to the UE. The PUCCH power configuration information may include a plurality of parameter information set forth in Table 29 above.

In step 1955, the base station transmits, to the UE, control information (e.g., a MAC CE command) for indicating the activation state of parameter information (e.g., ClosedLoop-Index, PathlossReferenceRS-Id, and/or P0-PUCCH-Id) for a PUCCH transmit power control.

In step 1960, the base station identifies the number of those activated for each parameter information (e.g., ClosedLoopIndex, PathlossReferenceRS-Id, P0-PUCCH-Id) and, if the number of those activated for each parameter information is two or more in step 1960, as shown in FIGS. 13A and 13B, the base station performs PUCCH reception through a plurality of TRPs corresponding to the number of those activated per each parameter information in step 1970. However, if only one parameter information is activated through a MAC CE in step 1960, the base station performs PUCCH reception through a single TRP based on the activated one parameter information in step 1980.

Figure 20:
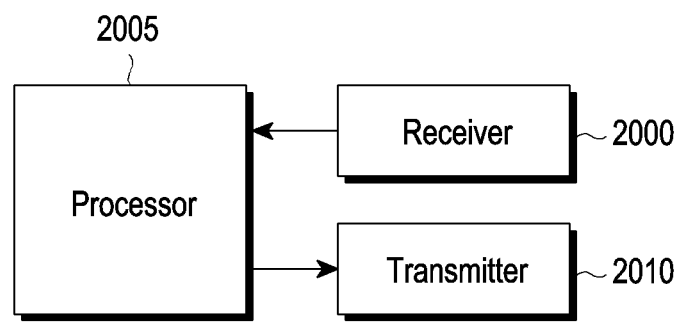
FIG. 20 illustrates a UE in a wireless communication system according to an embodiment.

FIG. 20 illustrates a UE according to an embodiment.

Referring to FIG. 20, the UE 2000 includes a receiver 2000, a transmitter 2010, and a processor 2005. The receiver 2000 and the transmitter 2010 may be collectively referred to as a transceiver. The UE may include a memory. The processor 2005 may control the operation of transmitting a UL signal, according to each or, a combination of at least one of, the above-described embodiments.

However, the components of the UE are not limited thereto. For example, the UE may include more or fewer components than the above-described components. The transceiver 2000 and 2010 and the processor 2005 may be implemented in the form of a single chip.

The transceiver 2000 and 2010 may transmit and receive signals to/from a base station. The signal may include control information and data. To that end, the transceiver 2000 and 2010 may include a radio frequency (RF) transmitter for frequency-up converting and amplifying signals transmitted and an RF receiver for low-noise amplifying signals received and frequency-down converting the frequency of the received signals. However, this is merely an example of the transceiver 2000 and 2010, and the components of the transceiver 2000 and 2010 are not limited to the RF transmitter and the RF receiver.

The transceiver 2000 and 2010 may receive signals via a radio channel, output the signals to the processor 2005, and transmit signals output from the processor 2005 via a radio channel.

The processor 2005 may store programs and data for the operation of the UE. The processor 2005 may store control information or data that is included in the signal obtained by the UE. The processor 2005 may include a memory configured of a storage medium, such as read only memory (ROM), random access memory (RAM), a hard disk, a compact disc ROM (CD-ROM), and a digital versatile disc (DVD), or a combination of storage media.

The processor 2005 may control a series of processes for the UE to be able to operate according to at least one or a combination of the above-described embodiments.

Figure 21:
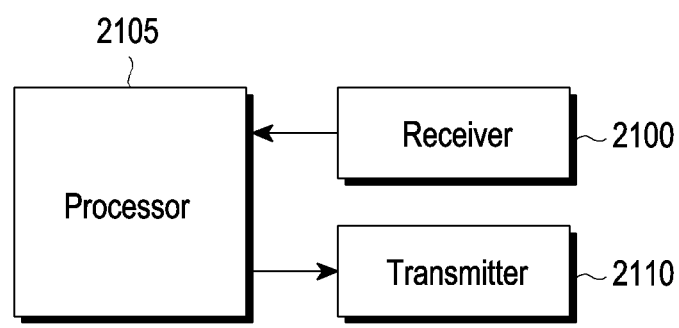
FIG. 21 illustrates a base station in a wireless communication system according to an embodiment.

FIG. 21 illustrates a base station according to an embodiment.

Referring to FIG. 21, the base station 2100 includes a receiver 2100, a transmitter 2110, and a processor 2105. The receiver 2100 and the transmitter 2110 may be collectively referred to as a transceiver. The UE may include a memory. The processor 2105 may control the operation of transmitting a UL signal, according to each or, a combination of at least one of, the above-described embodiments.

However, the components of the base station are not limited thereto. For example, the base station may include more or fewer components than the above-described components. The transceiver 2100 and 2110 and the processor 2105 may be implemented in the form of a single chip.

The transceiver 2100 and 2110 may transmit and receive signals to/from a UE. The signal may include control information and data. To that end, the transceiver 2100 and 2110 may include an RF transmitter for frequency-up converting and amplifying signals transmitted and an RF receiver for low-noise amplifying signals received and frequency-down converting the frequency of the received signals. However, this is merely an example of the transceiver 2100 and 2110, and the components of the transceiver 2100 and 2110 are not limited to the RF transmitter and the RF receiver.

The transceiver 2100 and 2110 may receive signals via a radio channel, output the signals to the processor 2105, and transmit signals output from the processor 2105 via a radio channel.

The processor 2105 may store programs and data for the operation of the base station. The processor 2105 may store control information or data that is included in the signal obtained by the base station. The processor 2105 may include a memory configured of a storage medium, such as ROM, RAM, hard disk, CD-ROM, and DVD, or a combination of storage media.

The processor 2105 may control a series of processes for the base station to be able to operate according to at least one or a combination of the above-described embodiments.

The methods according to the embodiments described in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in RAMs, non-volatile memories including flash memories, ROMs, electrically erasable programmable read-only memories (EEPROMs), magnetic disc storage devices, CD-ROMs, DVDs, or other types of optical storage devices, or magnetic cassettes. The programs may also be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments via an external port. A separate storage device over the communication network may be connected to the device that performs embodiments.

The embodiments herein are provided merely for better understanding of the disclosure, and the disclosure should not be limited thereto or thereby. In other words, it is apparent to one of ordinary skill in the art that various changes may be made thereto without departing from the scope of the disclosure. Further, the embodiments may be practiced in combination. For example, some of the first and second embodiments may partially be combined and be operated by the base station and the UE.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although certain embodiments have been described above, various changes may be made thereto without departing from the scope of the disclosure. Thus, the scope of the disclosure should not be limited to the above-described embodiments, but should be defined by the following claims and any equivalents thereof.

What is claimed is:

1. A method performed by a user equipment (UE) in a wireless communication system, the method comprising:
   receiving, from a base station, configuration information including information on sets of power control parameters configured for transmission reception points (TRPs) for a physical uplink control channel (PUCCH) transmission;
   receiving, from the base station, activation information for one or more of the sets of power control parameters; and performing repetition of the PUCCH transmission for one or more of the TRPs, based on the configuration information and the activation information, wherein the UE transmits, to the base station, UE capability information including information indicating that the UE supports a PUCCH power control associated with multiple TRPs, and wherein the UE performs the PUCCH power control by alternating between the sets of power control parameters per repetition of the PUCCH transmission based on a cyclic mapping pattern being configured for repetitions of the PUCCH transmission.

2. The method of claim 1, wherein the activation information is received through a medium access control (MAC) control element (CE) from the base station.

3. The method of claim 1, wherein the sets of power control parameters are configured for one or more PUCCH resources used in the PUCCH transmission per each of the one or more TRPs.

4. The method of claim 1, wherein the PUCCH transmission is performed for one of the TRPs based on the activation information activating one set among the sets of power control parameters, and wherein the PUCCH transmission is performed for two of the TRPs based on the activation information activating two sets among the sets of power control parameters.

5. A user equipment (UE) in a wireless communication system, the UE comprising:
a transceiver; and
a processor configured to:
receive, via the transceiver, from a base station, configuration information including information on sets of power control parameters configured for transmission reception points (TRPs) for a physical uplink control channel (PUCCH) transmission,
receive, via the transceiver, from the base station, activation information for one or more of the sets of power control parameters, and
perform repetition of the PUCCH transmission for one or more of the TRPs, based on the configuration information and the activation information, wherein the processor is configured to transmit, to the base station, via the transceiver, UE capability information including information indicating that the UE supports a PUCCH power control associated with multiple TRPs, and wherein the processor is configured to perform the PUCCH power control by alternating between the sets of power control parameters per repetition of the PUCCH transmission based on a cyclic mapping pattern being configured for repetitions of the PUCCH transmission.

6. The UE of claim 5, wherein the activation information is received through a medium access control (MAC) control element (CE) from the base station.

7. The UE of claim 5, wherein the sets of power control parameters are configured for one or more PUCCH resources used in the PUCCH transmission per each of the one or more TRPs.

8. The UE of claim 5, wherein the PUCCH transmission is performed for one of the TRPs based on the activation information activating one set among the sets of power control parameters, and wherein the PUCCH transmission is performed for two of the TRPs based on the activation information activating two sets among the sets of power control parameters.

9. A method performed by a base station in a wireless communication system, the method comprising:
transmitting, to a user equipment (UE), configuration information including information on sets of power control parameters configured for transmission reception points (TRPs) for a physical uplink control channel (PUCCH) reception;
transmitting, to the UE, activation information for one or more of the sets of power control parameters; and
receiving, from the UE, at least one PUCCH repetition through one or more of the TRPs, based on the configuration information and the activation information, wherein the base station receives, from the UE, UE capability information including information indicating that the UE supports a PUCCH power control associated with multiple TRPs, and wherein the at least one PUCCH repetition is received based on the PUCCH power control alternating between the sets of power control parameters per repetition of the PUCCH transmission based on a cyclic mapping pattern being configured for repetitions of the PUCCH transmission.

10. The method of claim 9, wherein the activation information is transmitted to the UE using a medium access control (MAC) control element (CE).

11. The method of claim 9, wherein the sets of power control parameters are configured for one or more PUCCH resources used in the at least one PUCCH repetition per each of the one or more TRPs.

12. The method of claim 9, wherein the at least one PUCCH repetition is received through one of the TRPs based on the activation information activating one set among the sets of power control parameters, and wherein the at least one PUCCH repetition is received through two of the TRPs based on the activation information activating two sets among the sets of power control parameters.

13. A base station in a wireless communication system, the base station comprising:
a transceiver; and
a processor configured to:
transmit, to a user equipment (UE), via the transceiver, configuration information including information on sets of power control parameters configured for transmission reception points (TRPs) for a physical uplink control channel (PUCCH) reception,
transmit, to the UE, via the transceiver, activation information for one or more of the sets of power control parameters, and
receive, via the transceiver, from the UE, at least one PUCCH repetition through one or more of the TRPs, based on the configuration information and the activation information, wherein the processor is configured to receive, via the transceiver from the UE, UE capability information including information indicating that the UE supports a PUCCH power control associated with multiple TRPs, and wherein the at least one PUCCH repetition is received based on the PUCCH power control alternating between the sets of power control parameters per repetition of the PUCCH transmission based on a cyclic mapping pattern being configured for repetitions of the PUCCH transmission.

14. The base station of claim 13, wherein the processor is configured to transmit, to the UE, via the transceiver, the activation information using a medium access control (MAC) control element (CE).

15. The base station of claim 13, wherein the sets of power control parameters are configured for one or more PUCCH resources used in the at least one PUCCH repetition per each of the one or more TRPs.

16. The base station of claim 13, wherein the at least one PUCCH repetition is received through one of the TRPs based on the activation information activating one set among the sets of power control parameters, and
  wherein the PUCCH repetition is received through two of the TRPs based on the activation information activating two sets among the sets of power control parameters.

* * * * *